(12) United States Patent
Konno et al.

(10) Patent No.: US 7,178,921 B2
(45) Date of Patent: Feb. 20, 2007

(54) IMAGE PROJECTION APPARATUS

(75) Inventors: Kenji Konno, Tucson, AZ (US); Soh Ohzawa, Toyonaka (JP); Jun Ishihara, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 11/233,049

(22) Filed: Sep. 22, 2005

(65) Prior Publication Data

US 2006/0109427 A1 May 25, 2006

Related U.S. Application Data

(63) Continuation of application No. 10/883,098, filed on Jul. 1, 2004, now Pat. No. 7,021,770, which is a continuation of application No. 10/151,342, filed on May 20, 2002, now Pat. No. 6,779,897.

(30) Foreign Application Priority Data

Nov. 29, 2001 (JP) ............................... 2001-363653

(51) Int. Cl.
*G03B 21/28* (2006.01)
(52) U.S. Cl. .......................................... 353/99; 353/78
(58) Field of Classification Search .................. 353/74, 353/77, 78, 98, 99
See application file for complete search history.

(56) References Cited

U.S. PATENT DOCUMENTS

| 5,191,472 | A | 3/1993 | Kurematsu et al. ......... 359/619 |
| 5,390,050 | A | 2/1995 | Yanagi et al. .............. 359/742 |
| 5,692,820 | A * | 12/1997 | Gale et al. ..................... 353/77 |
| 5,833,339 | A | 11/1998 | Sarayeddine ................. 353/20 |
| 5,871,266 | A | 2/1999 | Negishi et al. ............... 353/98 |
| 6,118,501 | A | 9/2000 | Ohzawa ........................ 349/5 |
| 6,220,712 | B1 * | 4/2001 | Ohzawa ....................... 353/70 |
| 6,450,648 | B1 * | 9/2002 | Ohzawa et al. ............... 353/70 |
| 6,513,935 | B2 | 2/2003 | Ogawa ........................ 353/30 |
| 6,542,204 | B1 * | 4/2003 | Ohzawa et al. ............... 349/5 |
| 6,626,541 | B2 | 9/2003 | Sunaga ........................ 353/69 |
| 6,631,994 | B2 * | 10/2003 | Suzuki et al. ................. 353/77 |
| 6,752,500 | B1 | 6/2004 | Yoshii et al. ................. 353/78 |

(Continued)

FOREIGN PATENT DOCUMENTS

JP 02-130543 A 5/1990

(Continued)

*Primary Examiner*—William C. Dowling
(74) *Attorney, Agent, or Firm*—Sidley Austin LLP

(57) ABSTRACT

An oblique projection optical system for leading rays of light from a display surface on which an image is displayed to a projection surface in such a way that the ray of light from the center of the display surface is obliquely incident on the projection surface in order to project a magnified image of the image displayed on the display surface onto the projection surface includes a plurality of reflecting surfaces having a power. At least two of the reflecting surfaces have a free-form curved surface, and, of all the reflecting surfaces, the one closest to the projection surface has a negative power and at least one of the other has a positive power. Alternatively, in a rear projection optical system having a projection optical system for projecting an image displayed on a panel display surface onto a screen surface, the projection optical system includes at least four curved-surface reflecting mirrors.

38 Claims, 52 Drawing Sheets

U.S. PATENT DOCUMENTS

| | | |
|---|---|---|
| 6,761,458 B2 | 7/2004 | Sakata et al. ............... 353/78 |
| 6,771,327 B2 | 8/2004 | Sekiguchi ................... 359/649 |
| 6,771,427 B1 | 8/2004 | Matsuo ....................... 359/649 |
| 6,779,897 B2 | 8/2004 | Konno et al. ................ 353/99 |
| 6,808,271 B1 | 10/2004 | Kurematsu .................. 353/70 |
| 2002/0057421 A1 | 5/2002 | Kurematsu et al. ......... 359/859 |
| 2003/0020886 A1 | 1/2003 | Sunaga ........................ 353/98 |
| 2003/0107716 A1 | 6/2003 | Owaga ........................ 353/99 |
| 2004/0032570 A1 | 2/2004 | Peterson et al. ............. 353/66 |

FOREIGN PATENT DOCUMENTS

| | | |
|---|---|---|
| JP | 02-146535 A | 6/1990 |
| JP | 02-153338 A | 4/1991 |
| JP | 03-087731 A | 4/1991 |
| JP | 04-27928 A | 1/1992 |
| JP | 2932609 B2 | 5/1999 |
| JP | 2002-221949 A | 8/2001 |
| WO | WO 97/01787 A1 | 1/1997 |

* cited by examiner

1

2

3

4

5

6

7

IMAGE PROJECTION APPARATUS

This application is a continuation of U.S. patent application Ser. No. 10/883,098, filed Jul. 1, 2004, now U.S. Pat. No. 7,021,770, which is a continuation of U.S. patent Ser. No. 10/151,342, filed May 20, 2002, now U.S. Pat. No. 6,779,897, which claimed priority from Japanese Patent Application No. 2001-363653 and is based on Japanese Application No. 2000-34319 filed on Nov. 29, 2001 and Feb. 7, 2000 respectively, the contents of which are hereby incorporated by reference.

BACKGROUND OF THE INVENTION

1. Field of the Invention

The present invention relates to a projection optical system for projecting a magnified image on a screen, and to a rear projection optical system provided with such a projection optical system. More specifically, the present invention relates to an oblique projection optical system and a rear projection optical system that shine a beam of light on a screen from an oblique direction.

2. Description of the Prior Art

From long ago, it has been common practice to project a magnified image of an image displayed on a small display surface onto a screen. Before, projection of an image on a screen was generally achieved through front projection, whereby the image is projected from in front of the screen, i.e. from the same side as the observer, for example as when a movie is shown in a movie theater. These days, projection of an image is achieved also through rear projection, whereby the image is projected from behind the screen by the use of a screen that transmits light. Today, large-screen television sets adopting rear projection are in practical use.

It is desired that, except in cases where a large facility like a movie theater itself constitutes a projection apparatus, a projection apparatus be provided with a large screen and be simultaneously compact. In particular, in a rear projection apparatus that projects an image from behind a screen, it is desired that the apparatus be slim, i.e. that its depth dimension in the direction perpendicular to the screen be small.

In early models of rear projection apparatus, to make them slim, a very common centered optical system is used as a projection optical system, and a flat-surface mirror is arranged behind a screen so as to turn the optical path of the light exiting from the powered part of the projection optical system. However, to prevent distortion in the image formed on the screen, the optical path along the optical axis turned by the flat-surface mirror needs to run through the center of the screen perpendicularly thereto. This makes it difficult to slim down the apparatus below a certain thickness. The optical path is turned vertically, because then the turned optical path is shorter than if it is turned horizontally, and usually all the parts, including the display surface on which an image is displayed, other than the flat-surface mirror for turning the optical path are arranged below the screen.

An effective way to further slim down rear projection apparatus is to adopt oblique projection, in which the ray of light striking the center of the screen, i.e. the ray representing the center of the image, is incident on the screen at a large angle of incidence. However, attempting to achieve oblique projection with a centered projection optical system necessitates making the optical path along the optical axis turned by the flat-surface mirror run off the center of the screen. Accordingly, the projection optical system needs to include a large-diameter wide-angle lens of which only part is used for projection. Such an optical system can be realized, but it entails high cost, and in addition makes the projection optical system itself larger, with little effect of slimming down the apparatus.

To overcome this, proposals have been made to use reflecting mirrors with curved surfaces as powered elements included in the projection optical system. For example, Re-published Patent Application No. WO 97/01787 proposes a projection optical system composed of four curved-surface mirrors. These curved-surface mirrors have, in order from the display surface side, a positive, a negative, a positive, and a negative power. The curved surface closest to the display surface is a spherical surface, and the other three curved surfaces are aspherical surfaces. The projection optical system that the applicant of the present invention proposes in Japanese Patent Application Laid-Open No. 2001-221949 also is composed of four curved-surface mirrors. In this projection optical system, the curved-surface mirrors have, in order from the display surface side, a positive, a positive, a negative, and a negative power, or a positive, a positive, a negative, and a positive power. All these surfaces are spherical or aspherical surfaces. In addition to these publications, there are more that propose projection optical systems composed of three curved-surface mirrors and of other types.

Conventionally, an oblique projection optical system composed of curved-surface mirrors is, to minimize the lowering of imaging performance, designed to have a large f-number, and has a long optical path length from the display surface on which an image is displayed to the projection surface at which a screen is arranged. Moreover, to slim down the apparatus incorporating it while securing a long optical path length, its optical path is turned many times with flat-surface mirrors. The optical path needs to be turned, except on the last occasion, around the screen, specifically below or above the screen, so as not to hinder the projection of the image on the screen. Thus, an oblique projection optical system composed of curved-surface mirrors helps slim down the apparatus incorporating it, but does not contribute to reducing the height dimension thereof. Moreover, in a conventional oblique projection optical system, only necessary parts of curved-surface mirrors are used so as not to hinder miniaturization. Anyway, all these mirrors have spherical or aspherical surfaces that are symmetric about an axis.

As long as a long optical path length is secured to prevent the lowering of imaging performance, it is difficult to reduce the height dimension of the screen without sacrificing the flatness of the apparatus. Thus, modern oblique projection optical systems are considered to have almost reached the limit in terms of the trade-off between the slimming-down of projection apparatus and the reduction of the height dimension thereof.

On the other hand, as described above, rear projection optical systems used in common rear projection apparatus achieve the slimming-down of the apparatus by turning the optical path of the light exiting from a projection optical system with a single reflecting mirror arranged behind a screen. However, the projection optical system used here is of a centered type, and therefore the ray striking the center of the screen surface needs to be substantially perpendicular to the screen surface. This makes it difficult to slim down rear projection optical systems below a certain thickness.

To overcome this, various optical arrangements have been proposed for further slimming-down. For example, Japanese Patent Registered No. 2932609 and Japanese Patent Applications Laid-Open No. H3-87731, H2-153338, H2-146535, and H2-130543 disclose rear projection optical systems in which the optical path of a projection optical system is turned with two flat-surface reflecting mirrors.

However, with conventional rear projection optical systems, sufficient slimming-down is difficult, or slimming them down poses new problems. For example, the rear projection optical system disclosed in Japanese Patent Registered No. 2932609 mentioned above adopts a method using a re-imaging projection optical system in which a displayed image is first imaged, and the resulting image is then projected on a screen surface so as to be imaged again. This inevitably makes the projection optical system large. In addition, this method requires an oblique projection optical system that permits the ray striking the center of the screen surface to be incident thereon at a large angle of incidence, but the publication describes no specific optical arrangement of such an optical system. The rear projection optical systems disclosed in Japanese Patent Applications Laid-Open No. H3-87731, H2-153338, H2-146535, and H2-130543 mentioned above also require oblique projection optical systems for slimming-down, but the publications do not make it clear what specific optical arrangement to use as a projection optical system.

An oblique projection optical system is usually realized by using part of a centered optical system. However, to slim down a rear projection optical system, the projection angle of the principal ray needs to be made very large. Thus, it is inevitable to use part of a very wide-angle centered optical system. In general, a wide-angle optical system requires a large number of lens elements, and their lens diameters are very large. This makes the optical system as a whole large.

Some display apparatus incorporate a rear projection optical system that is slimmed down by actually adopting an oblique projection optical system employing curved-surface reflecting mirrors. In these display apparatus, however, the light that has exited from the projection optical system is reflected directly by a flat-surface reflecting mirror arranged behind a screen, and thus the curved-surface reflecting mirror that constitutes the last surface of the projection optical system needs to be very large. A large curved-surface reflecting mirror like this is disadvantageous in terms of mass production and cost. Moreover, if the projection optical system includes only three curved-surface mirrors, it is highly sensitive to errors, and is thus difficult to manufacture.

SUMMARY OF THE INVENTION

An object of the present invention is to provide an oblique projection optical system that offers high imaging performance and that permits further miniaturization not only in the direction perpendicular to the screen but also in the direction along the screen.

Another object of the present invention is to provide a rear projection optical system that offers satisfactory optical performance but is nevertheless advantageous in terms of mass production and cost and that is slim and is composed of compact optical components.

To achieve the above objects, according to one aspect of the present invention, an oblique projection optical system for leading rays of light from a display surface on which an image is displayed to a projection surface in such a way that the ray of light from the center of the display surface is obliquely incident on the projection surface in order to project a magnified image of the image displayed on the display surface onto the projection surface includes a plurality of reflecting surfaces having a power. Here, at least two of the reflecting surfaces having a power have a free-form curved surface, and, of all the reflecting surfaces having a power, the one closest to the projection surface has a negative power and at least one of the other has a positive power.

According to another aspect of the present invention, in a rear projection optical system having a projection optical system for projecting an image displayed on a panel display surface onto a screen surface, the projection optical system includes at least four curved-surface reflecting mirrors.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
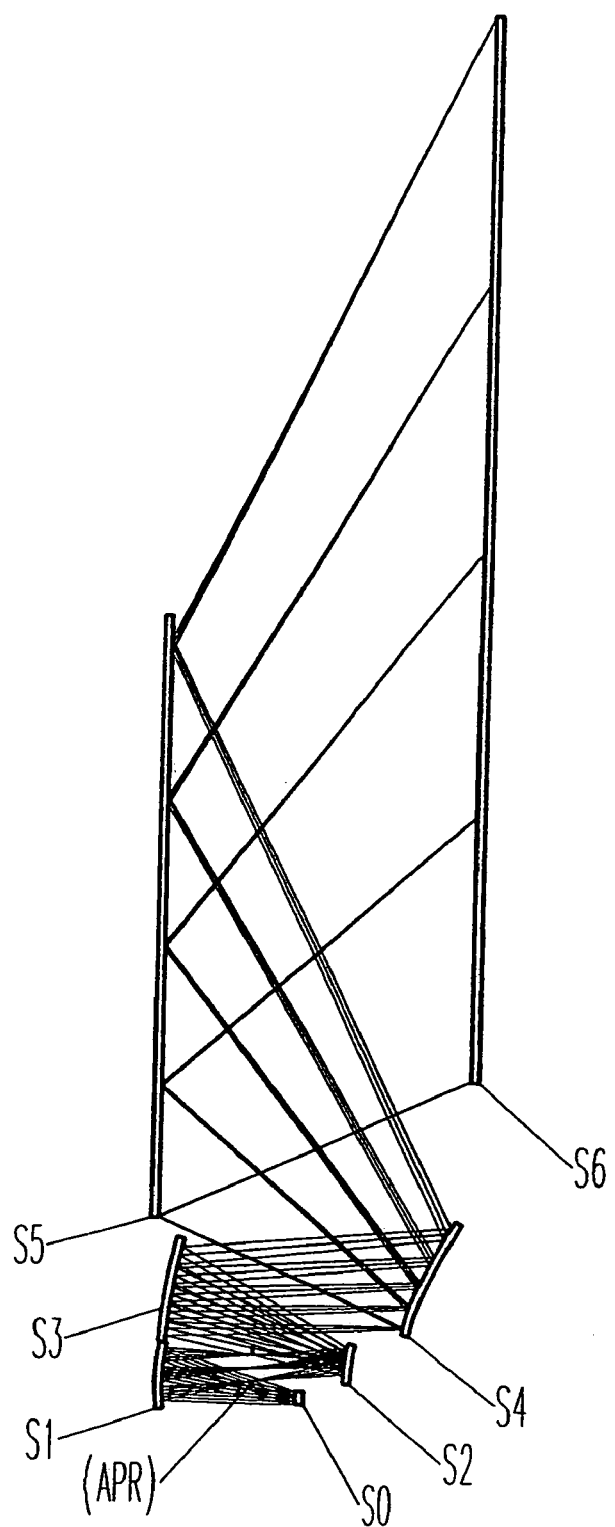
FIG. 1 is a sectional view, taken along the x-y plane, of the projection optical system of a first embodiment of the invention.

Hereinafter, embodiments of the present invention will be described with reference to the accompanying drawings and tables.

First to Seventh Embodiments

First, as a first to a seventh embodiment of the invention, practical examples (Examples 1 to 7, respectively) of oblique projection optical systems will be presented below with reference to their actual construction data and other data. The oblique projection optical systems 1 to 7 of Examples 1 to 7 are all composed of four powered curved-surface mirrors and one non-powered flat-surface mirror. These oblique projection optical systems 1 to 7 are all designed to lead rays of light from a rectangular display surface having longer sides in the width direction thereof to a projection surface by reflecting the rays with the individual mirrors in such a way as to deflect the rays in the height direction of the display surface and make the rays converge on the projection surface. As a result, a magnified image of the image displayed on the display surface is formed (projected) on the projection surface, in a rectangular area thereon that is substantially similar to the display surface.

In each example, the display surface is represented by S0, and the projection surface is represented by S6. The reflecting surfaces of the individual mirrors are represented by S1 to S5 in the order in which they receive light from the display surface S0 (i.e. in order of proximity to the display surface S0 along the optical path). The pupil plane (aperture stop) is represented by APR.

The oblique projection optical systems 1 to 7 of Examples 1 to 7 include, as all or part of the powered reflecting surfaces S1 to S4, free-form curved surfaces. Thus, any of these optical systems is symmetric about a plane, but has no optical axis that holds throughout the optical system. Accordingly, it is not proper to define the surfaces S0 to S6 in a coordinate system that uses an optical axis as a reference. Instead, in an absolute coordinate system, local coordinate systems are defined one for each of the surface S0 to S6, so that the surfaces S0 to S6 are represented by their respective coordinate systems. Then, the optical system as a whole is defined in terms of the positions and directions of the individual local coordinate systems in the absolute coordinate system.

Here, Cartesian coordinate systems are used as the absolute and local coordinate systems. The coordinate axes of the absolute coordinate systems are referred to as the x-axis, y-axis, and z-axis, and the coordinate axes of a local coordinate system are referred to as the X-axis, Y-axis, and Z-axis. All lengths are given in mm. The absolute coordinate system has its origin at the center of the display surface S0, and has its x-, y-, and z-axes respectively in the direction normal to the projection surface S6, in the height direction thereof, and in the width direction thereof. Each local coordinate system has its origin on the x-y plane of the absolute coordinate system. For each local coordinate system, the unit vectors along its X-, Y-, and Z-axes are represented respectively by VX, VY, and VZ, and these unit vectors VX, VY, and VZ are defined in the absolute coordinate system to define the direction of the local coordinate system in the absolute coordinate system. The Z-axis of each local coordinate system is parallel to the z-axis of the absolute coordinate system, and therefore the X-Y plane coincides with the x-y plane. The surfaces S0 to S6 are symmetric about the X-Y plane of their respective local coordinate systems, and the optical system as a whole is symmetric about the x-y plane of the absolute coordinate system.

The surfaces S0 to S6 are each defined by the formula of an extended aspherical surface ES below.

$$X = \frac{C0 \cdot H^2}{1 + (1 - \varepsilon \cdot C0^2 \cdot H^2)^{1/2}} + \sum_i Ai \cdot H^i + \sum_{j,k} Bjk \cdot Y^j \cdot Z^k \quad \text{(ES)}$$

In this formula, C0 represents the curvature at the vertex (the intersection with the X-axis); $\varepsilon$ represents the conic constant; i, j, and k each represent an integer number equal to or greater than 0; and $H^2 = Y^2 + Z^2$. Ai represents the coefficient for the term that includes H to the power of i, and Bjk represents the coefficient for the term that includes Y to the power of j and Z to the power of k. In each example, terms including H to the power i of up to 12 are considered, and terms including Y and Z to the power j+k of 10 are considered. In the presentation of each example, the values of the coefficients Ai and Bjk are given, but those of which the value equals 0 are omitted unless necessary.

EXAMPLE 1

FIGS. 1 to 4 show the construction and optical path of the oblique projection optical system 1 of Example 1, and Tables 3 to 10 show the construction data thereof. Tables 3 to 10 each list the data of the surface referred to by the symbol noted at the top of the table. N0 and N1 respectively represent the refractive indices of the media before incidence and after incidence (i.e. after reflection) on a surface. "Position" indicates the position of the origin of the corresponding local coordinate system in the absolute coordinate system. In Table 5, which lists the data of the pupil plane APR, R represents the radius of the pupil (aperture stop).

It is to be noted that, also in the other examples described later, what their construction data represents is the same as with Tables 3 to 10.

Figure 2:
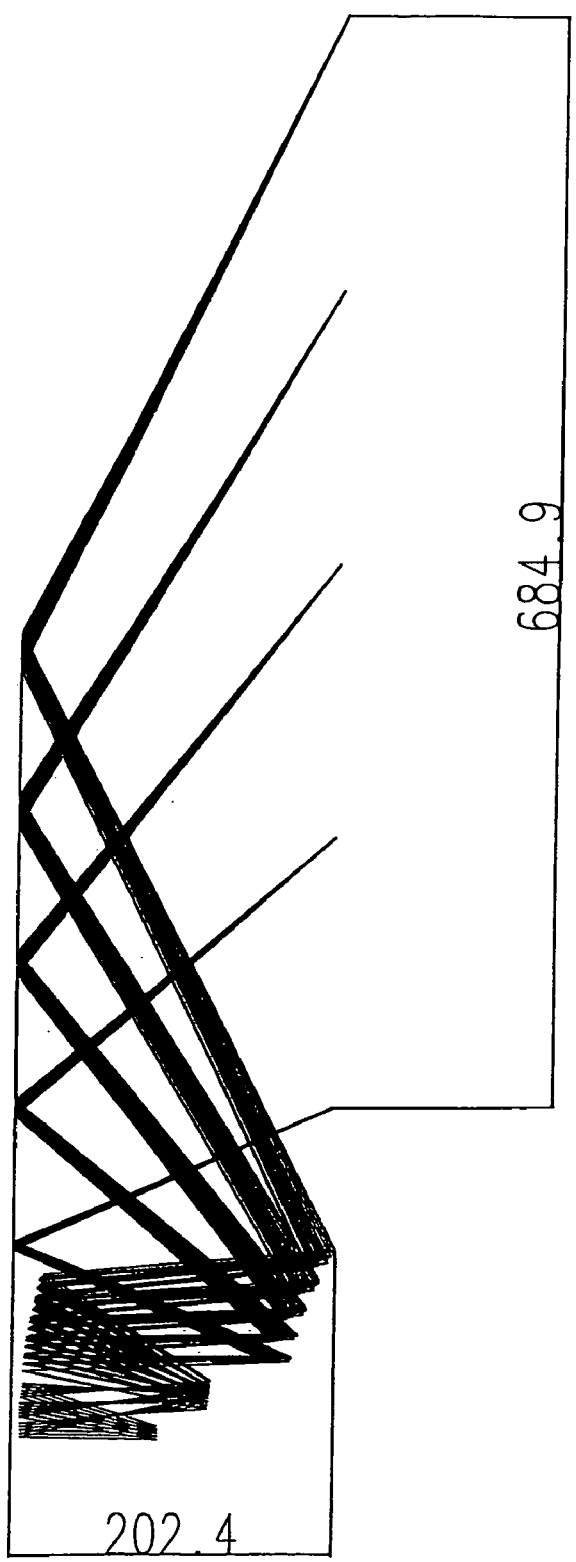
FIG. 2 is a side view, as seen from the z direction, of the projection optical system of the first embodiment.

FIG. 1 is a sectional view taken along the x-y plane, and shows the surfaces S0 to S6 together with, among the rays emanating from the center in the width direction of the display surface S0, five rays, i.e. two emanating from both ends (end points) in the height direction of the display surface S0 and three emanating from the three points that divide the line between those ends into four equal parts. FIG. 2 is a side view as seen from the z direction, and shows, in a form superposed on the five rays mentioned above, among the rays emanating from both ends in the width direction of the display surface S0, those emanating from the same points in the height direction of the display surface S0 as described above. Here, the surfaces are not marked with their symbols S0 to S6.

Figure 3:
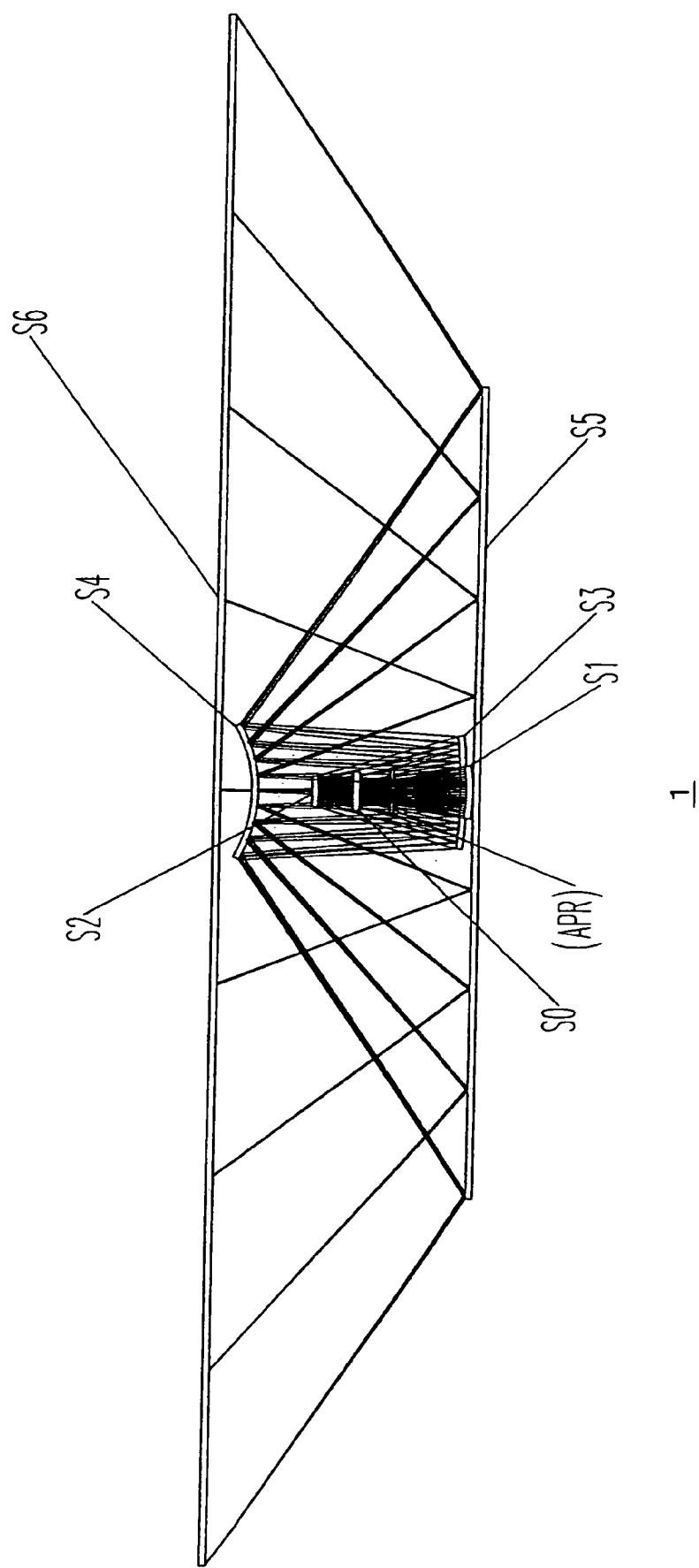
FIG. 3 is a top view, as seen from the y direction, of the projection optical system of the first embodiment.
Figure 4:
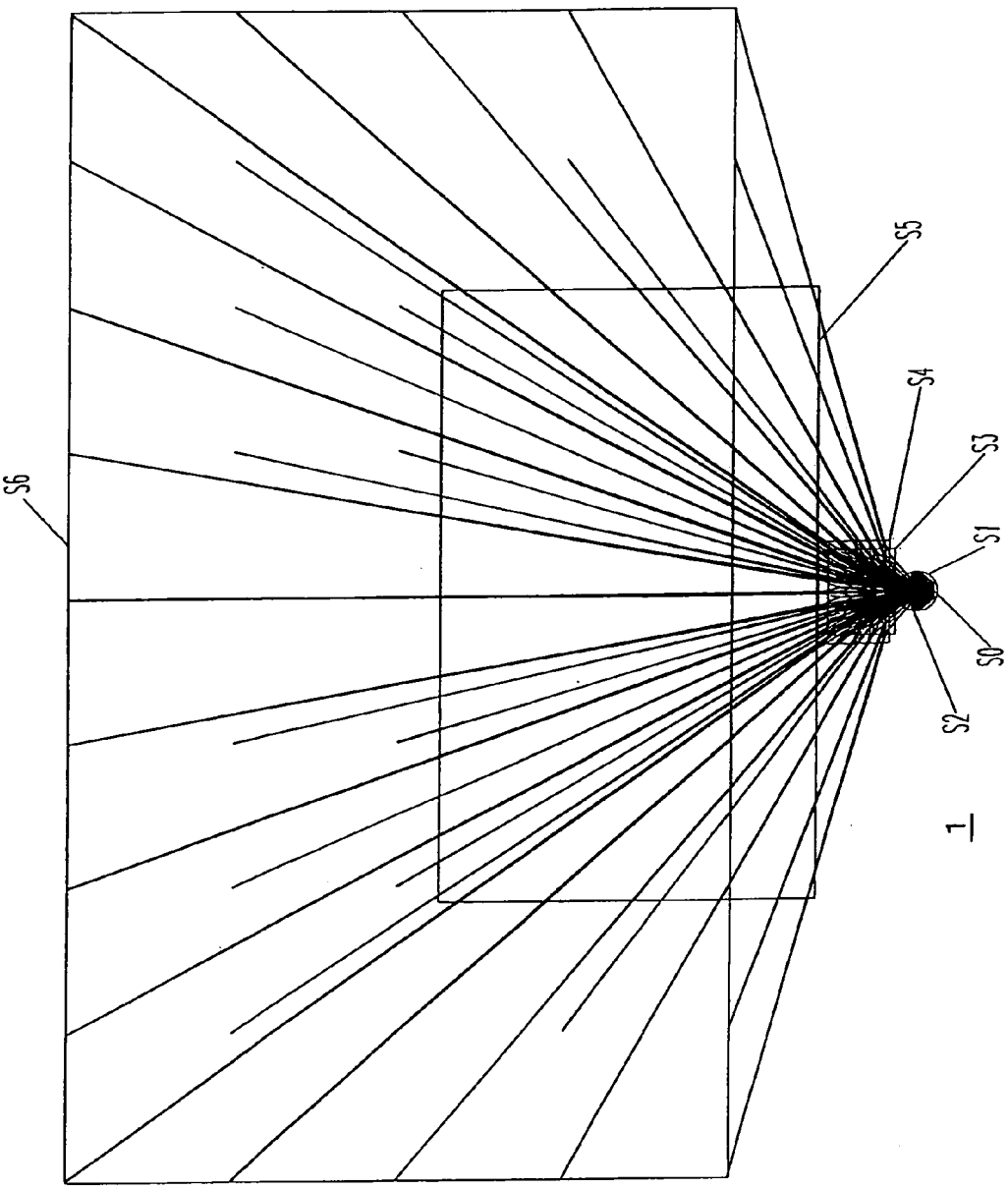
FIG. 4 is a front view, as seen from the x direction, of the projection optical system of the first embodiment.

FIG. 3 is a top view as seen from the y direction, and shows the surfaces S0 to S6 together with, among the rays emanating from the center in the height direction of the display surface S0, nine rays, i.e. two emanating from both ends in the width direction of the display surface S0 and seven emanating from the seven points that divide the line between those ends into eight equal parts. FIG. 4 is a front view as seen from the x direction, and shows the surfaces S0 to S6 together with, among the rays emanating from both ends (end lines) in the height direction of the display surface S0 and from three lines that divide the area between those ends into four equal parts, 45 rays in total, i.e., for each of these five lines, two emanating from both ends in the width direction of the display surface S0 and seven emanating from the seven points that divide the line between those ends into eight equal parts.

Figure 5:
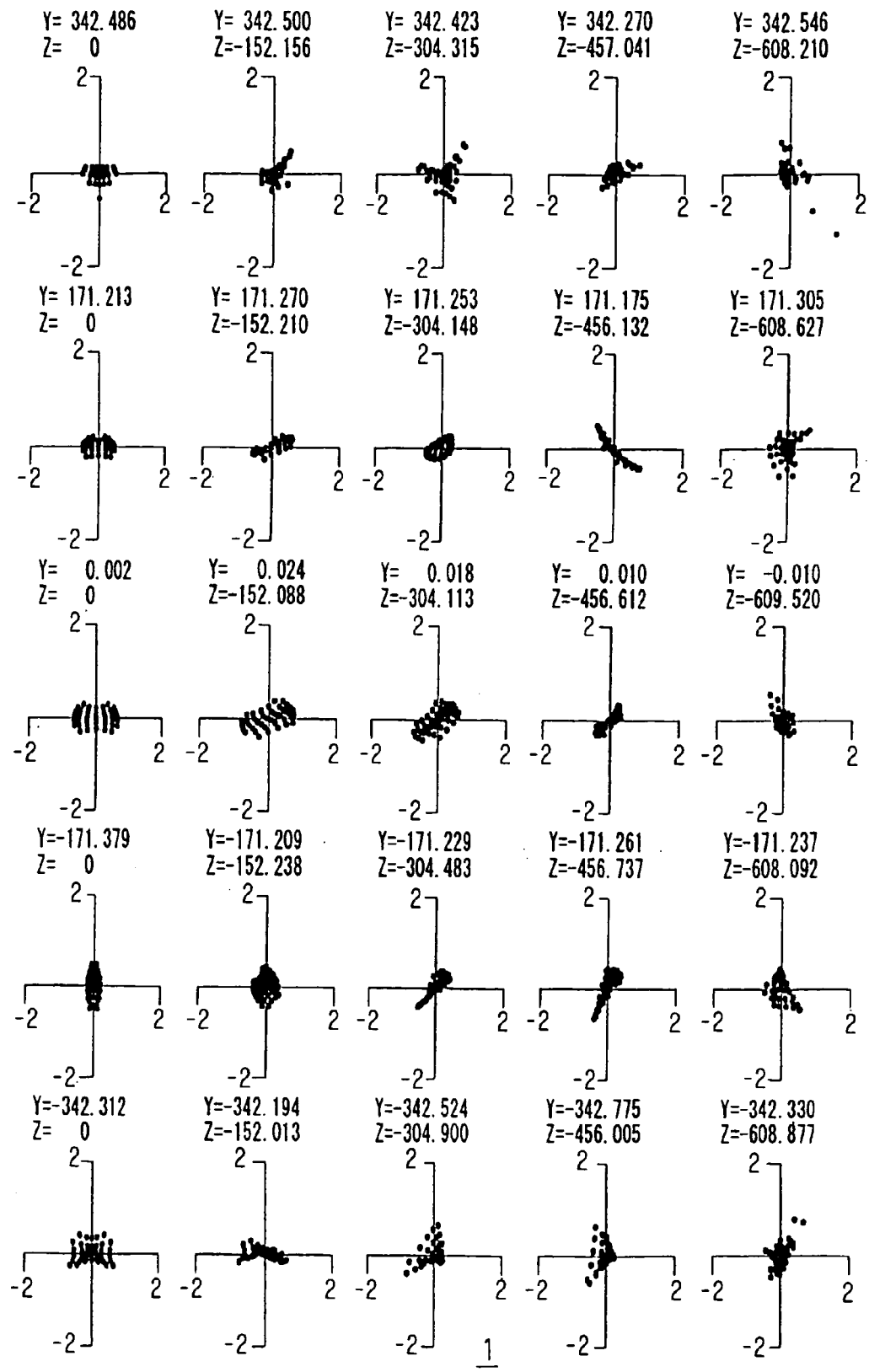
FIG. 5 is a spot diagram obtained on the projection surface of the projection optical system of the first embodiment.

FIG. 5 shows a spot diagram obtained on the projection surface S6, more specifically, near the intersections between, on the one hand, both ends (end lines) in the height direction of the projection surface S6 and the lines that divide the area between those ends into four equal parts and, on the other hand, both ends (end lines) in the width direction of the projection surface S6 and the lines that divide the area between those ends into eight equal parts. These intersections correspond to the origins of the coordinate axes shown in the individual sections of the diagram. Since the optical system is symmetric in the width direction (the z direction), the obtained results are shown for only half of the projection surface S6. That is, FIG. 5 is a diagram for 25 among the 45 rays shown in FIG. 4, and the third-from-the-above, leftmost section of the diagram shows the results obtained near the center of the projection surface S6. In each section of the diagram, spots represent the positions in which different rays belonging to an identical beam of light are incident. Above each section of the diagram are noted the coordinates (in the local coordinate system) of the center of the incident positions of all the rays belonging to an identical beam. The values ±2 noted by the coordinate axes in each section of the diagram represent the distances from the origin of those coordinate axes.

Figure 6:
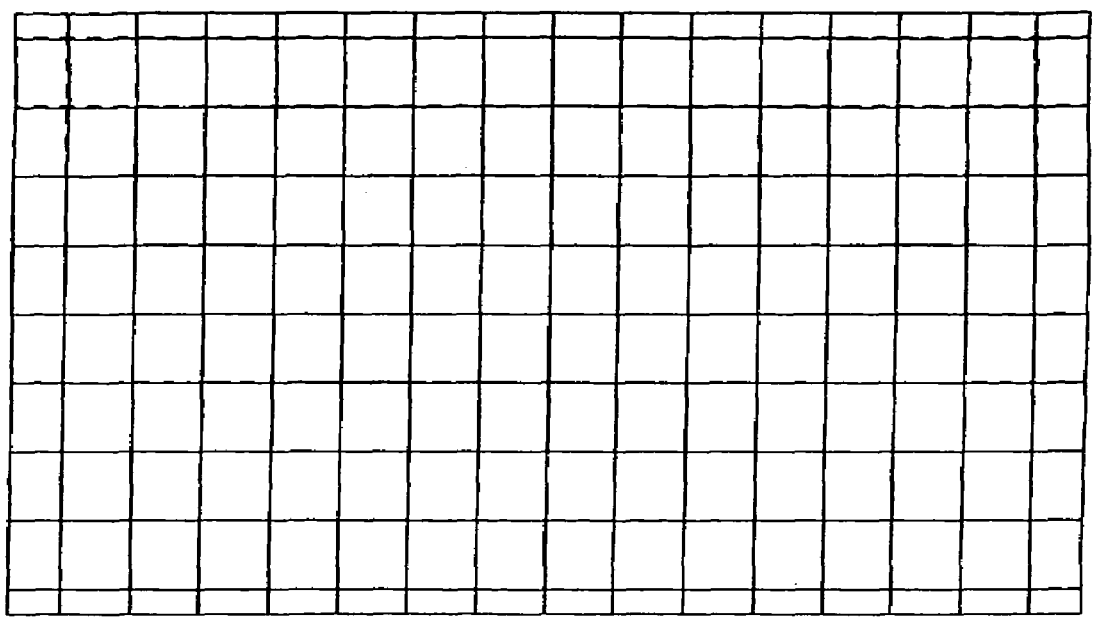
FIG. 6 is a diagram showing the distortion observed on the projection surface of the projection optical system of the first embodiment.

FIG. 6 shows the distortion of the image observed on the projection surface S6. In this figure, solid lines represent the results obtained with the oblique projection optical system 1, and broken lines represent the ideal result without distortion.

It is to be noted that, also in the modified examples and the other examples described later, what their sectional view, top view, side view, spot diagram, and distortion diagram represent is the same as with FIGS. 1 to 3, 5, and 6.

As shown in Tables 4 to 8, in the oblique projection optical system 1 of this example, the reflecting surface S1 is a spherical surface, the reflecting surface S2 is an aspherical surface, the reflecting surface S3 is a free-form curved surface, and the reflecting surface S4 is a free-form curved surface. The pupil plane APR is located between the reflecting surface S1 and the reflecting surface S2. As shown in Tables 3, 9, and 10, the display surface S0, the reflecting surface S5, and the projection surface S6 are flat surfaces, which are parallel to one another.

Table 1 shows the magnifications factors (the projection magnification factors) by which an image is magnified when projected, the sizes of the display surface S0 and the projection surface S6 (i.e. the sizes of the areas in which an image is displayed or projected), the angles of incidence at which rays are incident on the projection surface S6, and the position of the entrance pupil of the beam from the display surface S0 as observed in this example, together with the same data as observed in the other examples. Here, the sizes of the display surface S0 and the projection surface S6 are given in half values. The position of the entrance pupil is given as values of X and Y in the local coordinate system of the display surface S0, with Y given as a length when X has a finite value, and with Y given as an angle when X is infinite.

The magnification factors are those obtained from the center of the display surface S0 to the center of the projection surface S6, with β(Y) representing the magnification factor in the height direction (the Y, and thus y, direction), and with β(Z) representing the magnification factor in the width direction (the Z, and thus z, direction). The magnification factor β calculated as the ratio of the size of the projection surface S6 to the size of the display surface S0 is approximately equal to those listed in the table. The magnification factors β(Y) and β(Z) in the height and width directions are almost equal to each other, and the slight difference between them is given under "Anamo(Y/Z)." It is to be noted that the reason that the magnification factor β(Z) in the width direction takes a negative value is that the Z-axis of the local coordinate system points in the opposite direction from one of the reflecting surfaces S1 to S5 to the next.

In the oblique projection optical system 1, the magnification factors β(Y) and β(Z) in the height and width directions are 78.57 and 78.56 respectively. Rays are incident on the projection surface S6 at the minimum angle of incidence (24.0°) at the lower end in the height direction at the center in the width direction, at the maximum angle of incidence (67.3°) at the upper end in the height direction at both ends in the width direction, and at an angle of incidence of 52.1° at the center. Thus, the angle of view, which is defined as the difference between the maximum and minimum angles of incidence, is 43.3°. The entrance pupil is located at infinity, making the optical system an oblique telecentric optical system.

Table 2 shows the f-numbers, the thickness D of the optical path, the length H in the height direction of the projection surface S6, the ratio of the thickness D of the optical path to the length H of the projection surface S6, the shapes of the powered reflecting surfaces S1 to S4, and the signs of their powers as observed in this example, together with the same data as observed in the other example. Here, the f-numbers are effective f-numbers calculated from the diameter and position of the entrance pupil. Fnoy represents the f-number in the height direction of the display surface S0, and Fnoz represents the f-number in the width direction thereof. The thickness D of the optical path is the maximum length, in the direction normal to the projection surface S6 (i.e. in the X, and thus x, direction), of the space through which light travels from the display surface S0 to projection surface S6.

The symbols "sp," "asp," and "exasp" respectively denote spherical, aspherical, and free-form curved surfaces. The symbol (+) denotes a concave surface having a positive power, and the symbol (−) denotes a convex surface having a negative power. Here, the powers of the reflecting surfaces S1 to S4 depend on the surface shape thereof at the point at which the ray that travels from the center of the display surface S0 through the center of the pupil plane APR to the projection surface S6 passes therethrough, and not on the sign of the curvature C0 in formula (ES) noted earlier by which the curved surfaces are defined.

In the oblique projection optical system 1, the f-numbers Fnoy and Fnoz in the height and width directions are 3.5 and 3.4 respectively, and the ratio D/H of the thickness of the optical path to the length in the height direction of the projection surface S6 is 0.30. The four reflecting surfaces S1 to S4 have, from the display surface S0 side, a positive, a negative, a positive, and a negative power. Thus, the reflecting surface S4 closest to the projection surface S6 has a negative power.

Whereas the length H in the height direction of the projection surface S6 is about 685 mm, the length in the height direction of the part of the optical system that is located below the lower end of the projection surface S6 is about 210 mm, which is about 23% of the length in the height direction of the optical system as a whole. The distance between the projection surface S6 and the flat-surface reflecting surface S5 is 200 mm, which is almost equal to the thickness D of the optical path. The ratio of the length of the projection surface S6 in the height direction to that in the width direction is about 9:16.

MODIFIED EXAMPLE 1 OF EXAMPLE 1

Figure 7:
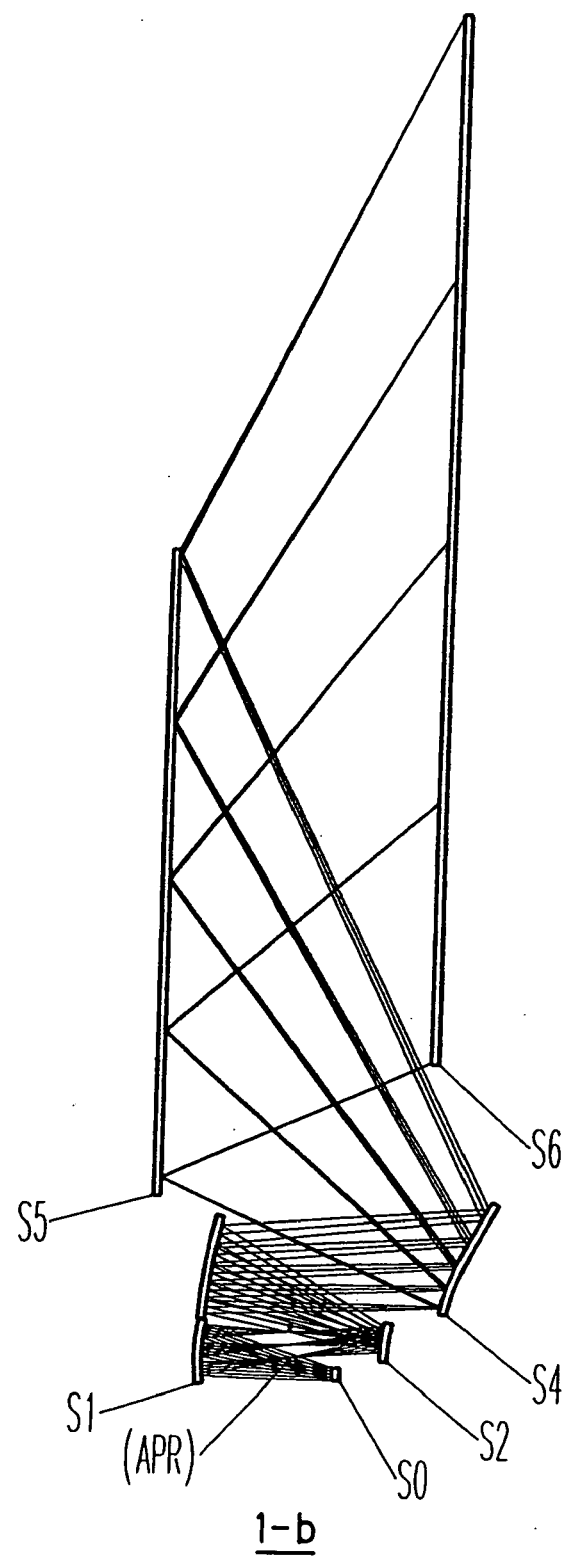
FIG. 7 is a sectional view, taken along the x-y plane, of the projection optical system of a modified example of the first embodiment.
Figure 8:
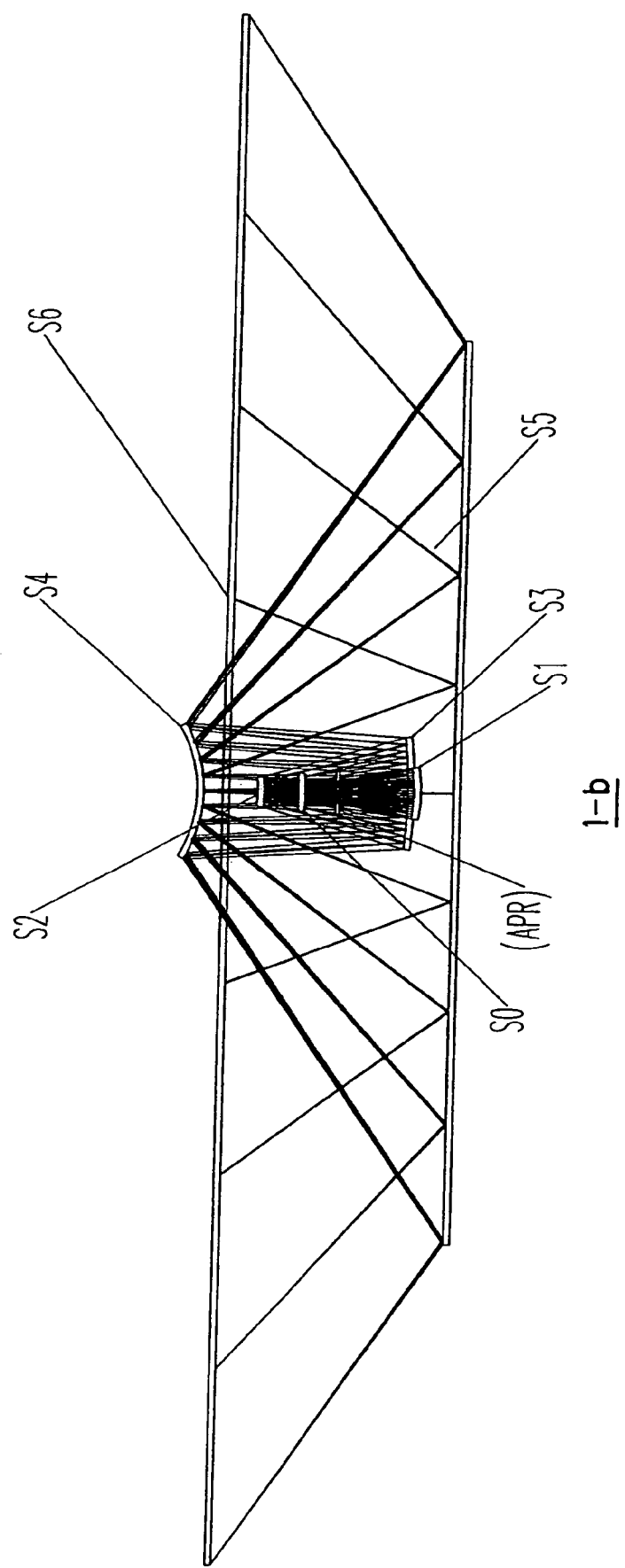
FIG. 8 is a top view, as seen from the y direction, of the projection optical system of the modified example of the first embodiment.

FIGS. 7 and 8 show a sectional view and a top view, respectively, of the oblique projection optical system 1-b of a modified example of the oblique projection optical system 1 of Example 1. The oblique projection optical system 1-b differs from its base model in that the surfaces starting with the display surface S0 and ending with the flat-surface reflecting surface S5 are shifted toward the projection surface S6.

As will be clear from FIG. 7, the greater part of the reflecting surface S4 is located opposite to the flat-surface reflecting surface S5 with respect to the projection surface S6, and thus a lower central portion of the oblique projection optical system 1-b protrudes a little from the projection surface S6. As a result, as shown in Table 2 described earlier, the thickness D of the optical path in the optical system as a whole is larger, but, as will be understood through comparison between FIGS. 7 and 1, the distance between the projection surface S6 and the flat-surface reflecting surface S5 is shorter than in the oblique projection optical system 1.

MODIFIED EXAMPLE 2 OF EXAMPLE 1

Figure 9:
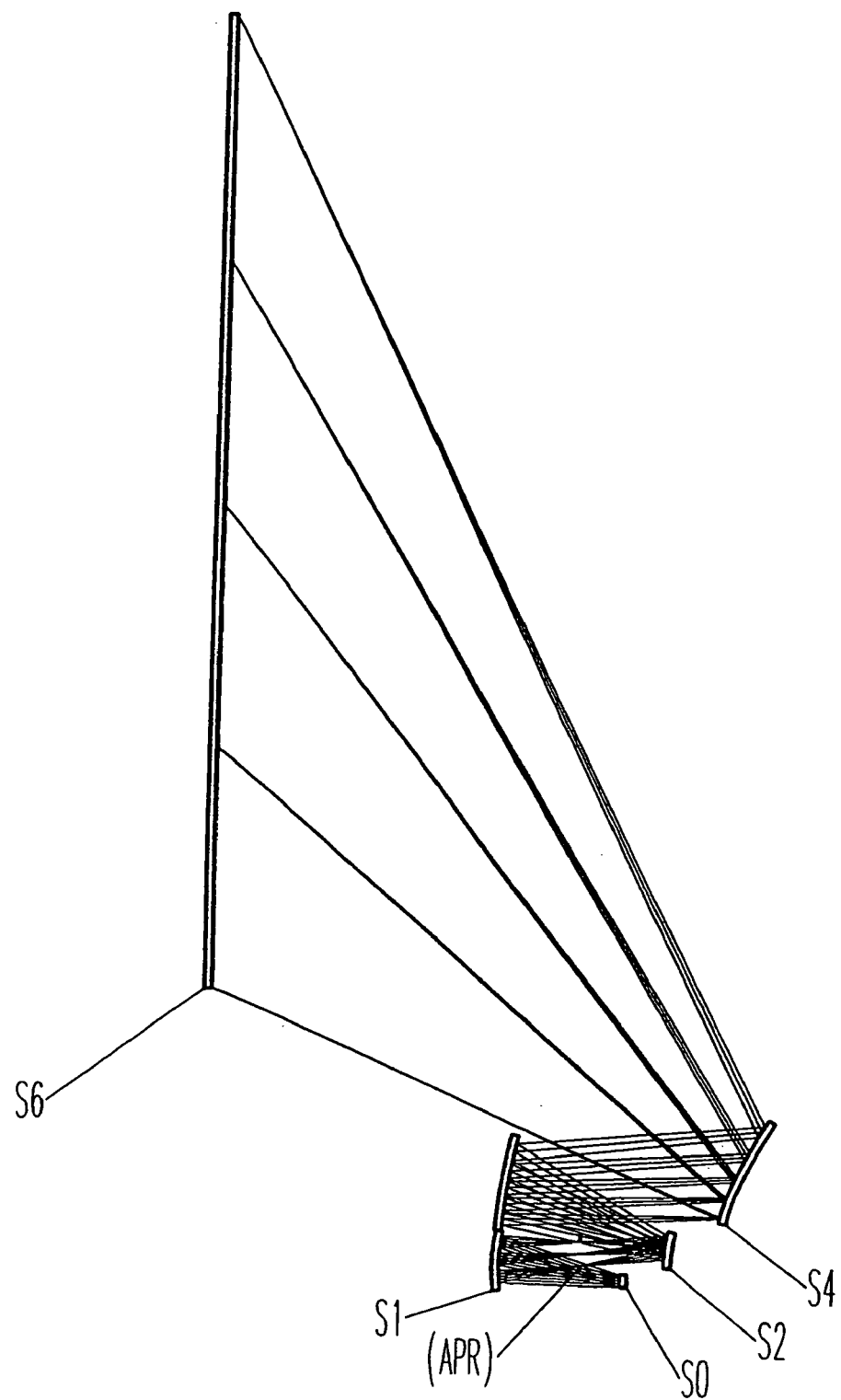
FIG. 9 is a sectional view, taken along the x-y plane, of the projection optical system of another modified example of the first embodiment.

FIG. 9 shows a sectional view of the oblique projection optical system 1-c of another modified example of the oblique projection optical system 1 of Example 1. This oblique projection optical system 1-c differs from its base model in that the flat-surface reflecting surface S5 is omitted. As a result of the omission of the reflecting surface S5, as shown in Table 2, the thickness D of the optical path in the optical system as a whole doubles. Still, the thickness D of the optical path is about 59% of the length H in the height direction of the projection surface S6.

Whereas the oblique projection optical system 1 provided with the reflecting surface S5 is suitable only for rear projection, the oblique projection optical system 1-c is suitable for both rear projection and front projection. It is to be understood that, in the oblique projection optical systems of the examples described below, the reflecting surface S5 may be omitted as in this modified example.

EXAMPLE 2

Figure 10:
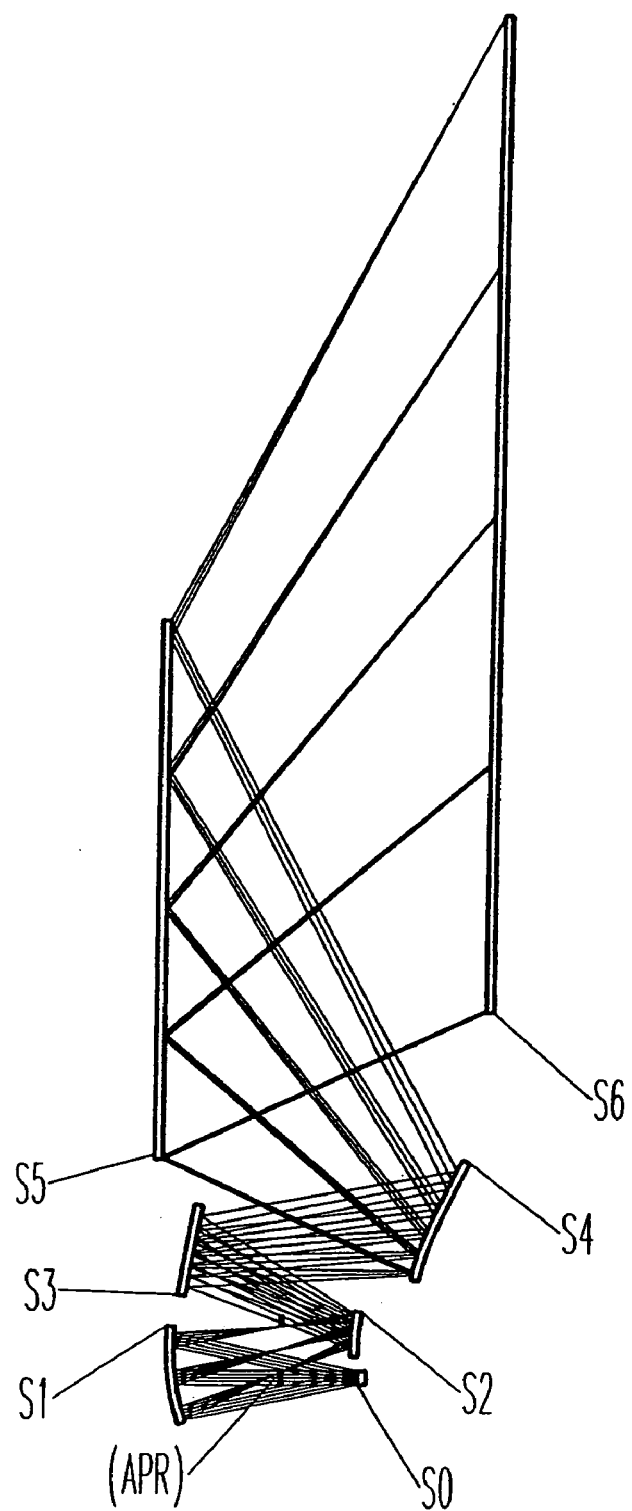
FIG. 10 is a sectional view, taken along the x-y plane, of the projection optical system of a second embodiment of the invention.
Figure 11:
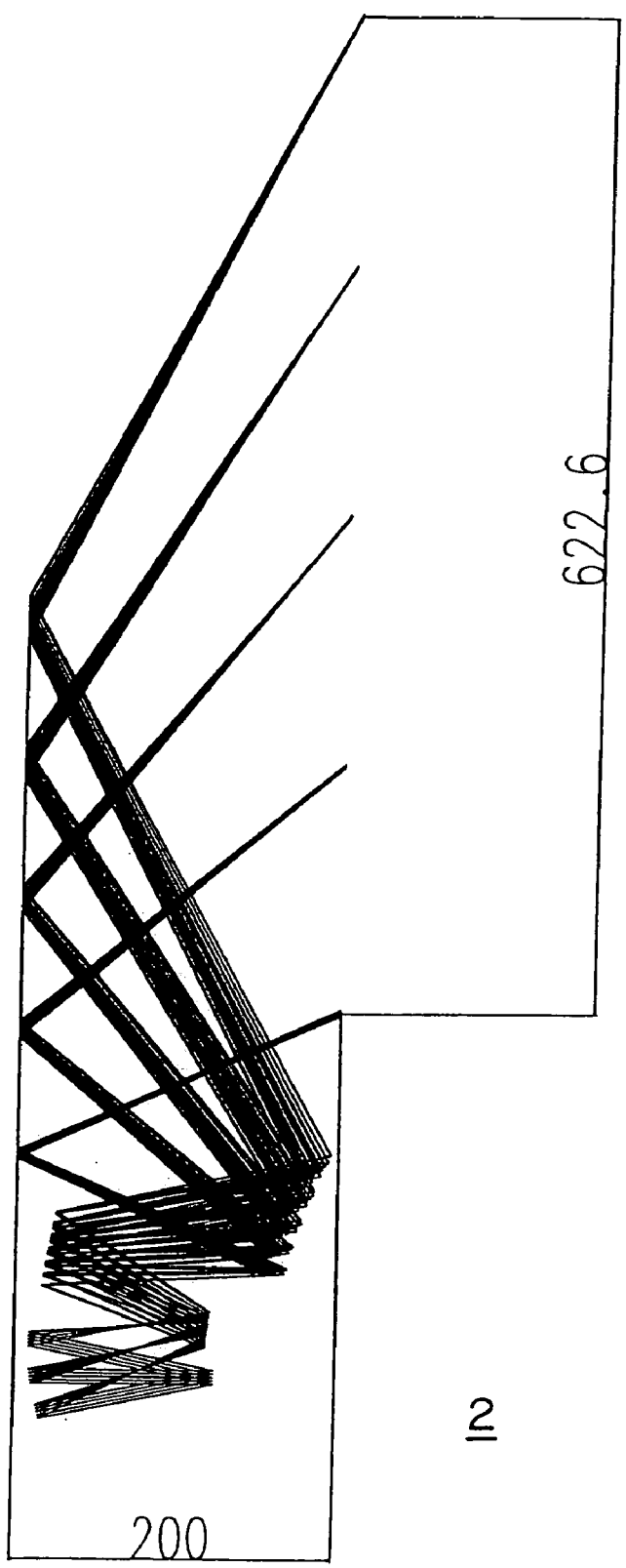
FIG. 11 is a side view, as seen from the z direction, of the projection optical system of the second embodiment.
Figure 12:
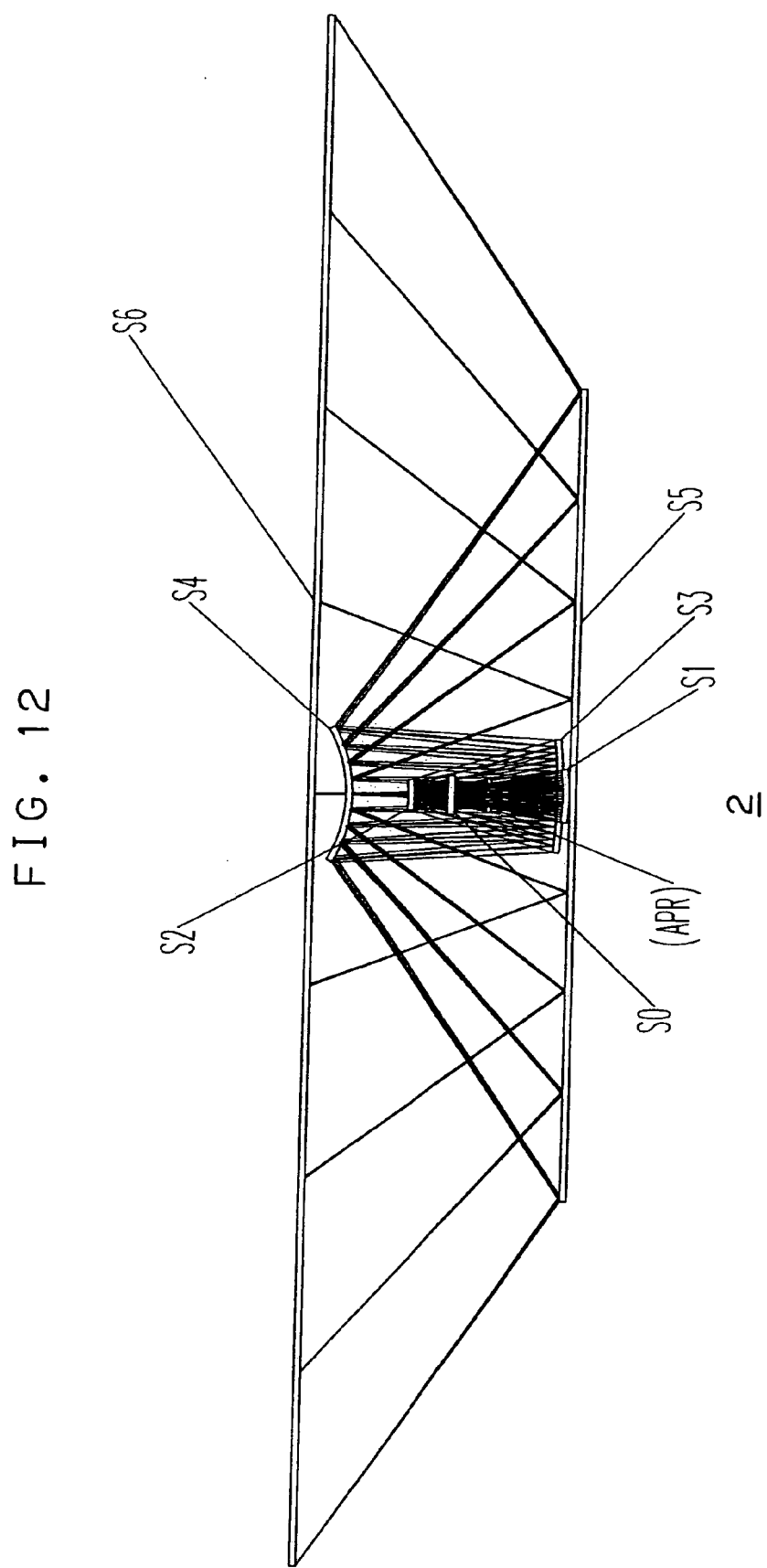
FIG. 12 is a top view, as seen from the y direction, of the projection optical system of the second embodiment.
Figure 13:
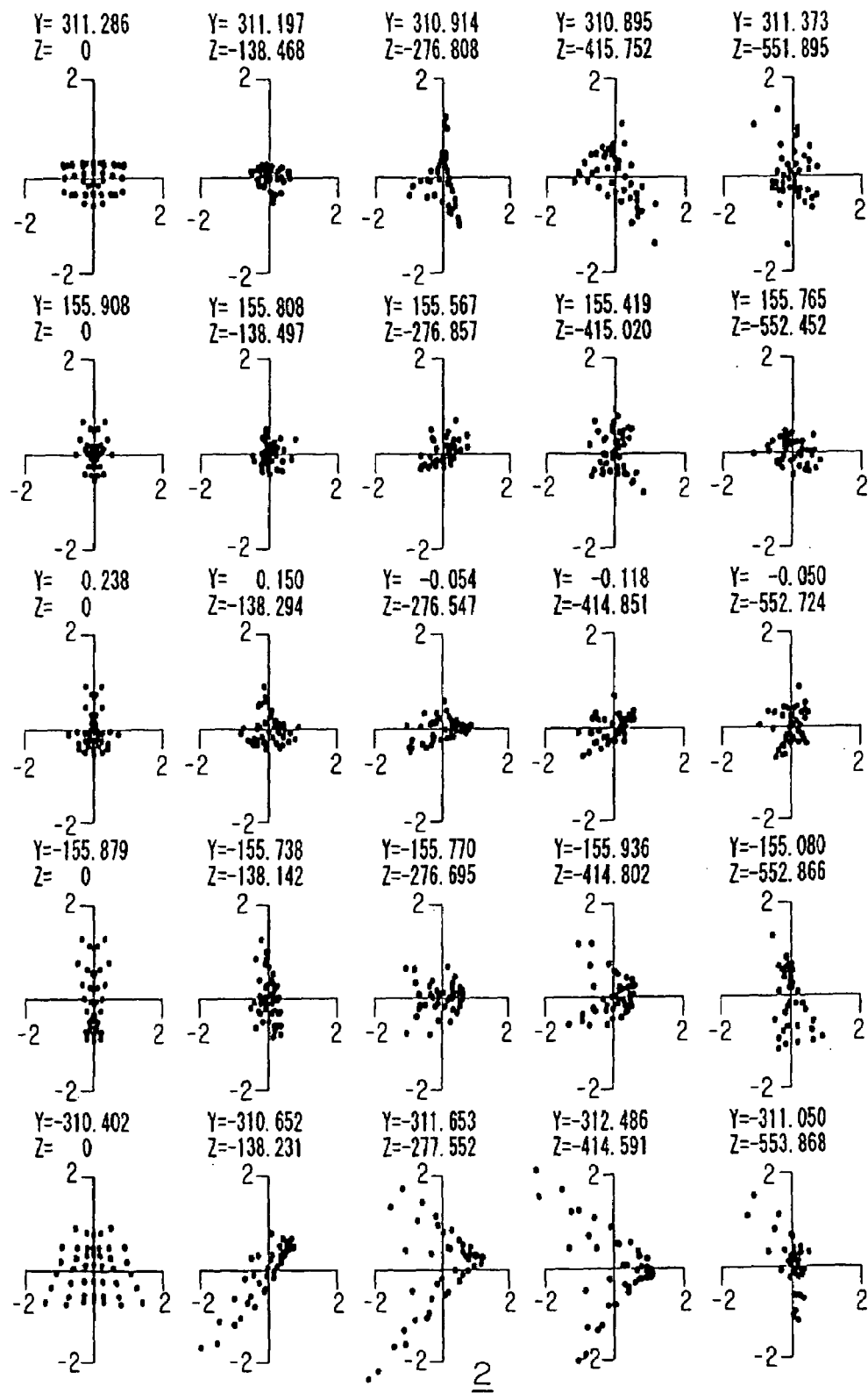
FIG. 13 is a spot diagram obtained on the projection surface of the projection optical system of the second embodiment.
Figure 14:
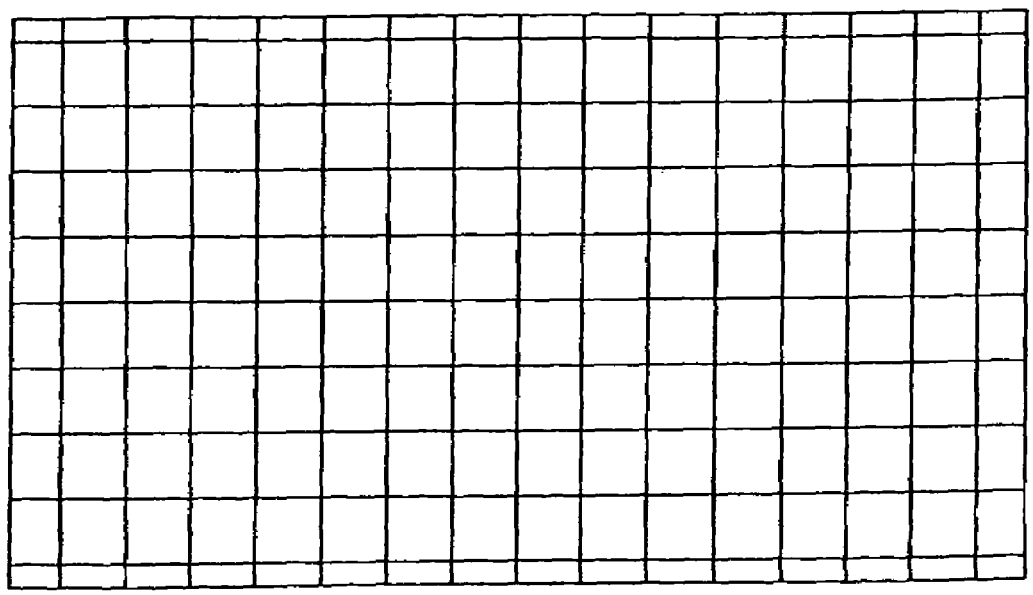
FIG. 14 is a diagram showing the distortion observed on the projection surface of the projection optical system of the second embodiment.

FIGS. 10 to 12 show a sectional view, a side view, and a top view, respectively, of the oblique projection optical system 2 of Example 2, and Tables 11 to 18 show the construction data thereof. FIG. 13 shows a spot diagram obtained on the projection surface S6, and FIG. 14 shows the distortion of the image observed on the projection surface S6.

As shown in Table 1, the magnification factors β(Y) and β(Z) in the height and width directions are 71.41 and 71.39 respectively. Rays are incident on the projection surface S6 at the minimum angle of incidence (24.7°) at the lower end in the height direction at the center in the width direction, at the maximum angle of incidence (65.8°) at the upper end in the height direction at both ends in the width direction, and at an angle of incidence of 50.9° at the center. Thus, the angle of view is 41.1°. The entrance pupil is located at infinity on the normal to the center of the display surface S0, making the optical system a telecentric optical system.

As shown in Table 2, the f-numbers Fnoy and Fnoz in the height and width directions are 2.5 and 2.5 respectively, and the ratio D/H of the thickness of the optical path to the length in the height direction of the projection surface S6 is 0.32. The four reflecting surfaces S1 to S4 have, from the display surface S0 side, a positive, a negative, a positive, and a negative power. Thus, the reflecting surface S4 closest to the projection surface S6 has a negative power. The two reflecting surfaces S1 and S2 close to the display surface S0 are aspherical surfaces, and the two reflecting surfaces S3 and S4 close to the projection surface S6 are free-form curved surfaces.

Whereas the length H in the height direction of the projection surface S6 is about 623 mm, the length in the height direction of the part of the optical system that is located below the lower end of the projection surface S6 is about 233 mm, which is about 27% of the length in the height direction of the optical system as a whole. The distance between the projection surface S6 and the flat-surface reflecting surface S5 is 200 mm, which is almost equal to the thickness D of the optical path. The ratio of the length of the projection surface S6 in the height direction to that in the width direction is about 9:16.

EXAMPLE 3

Figure 15:
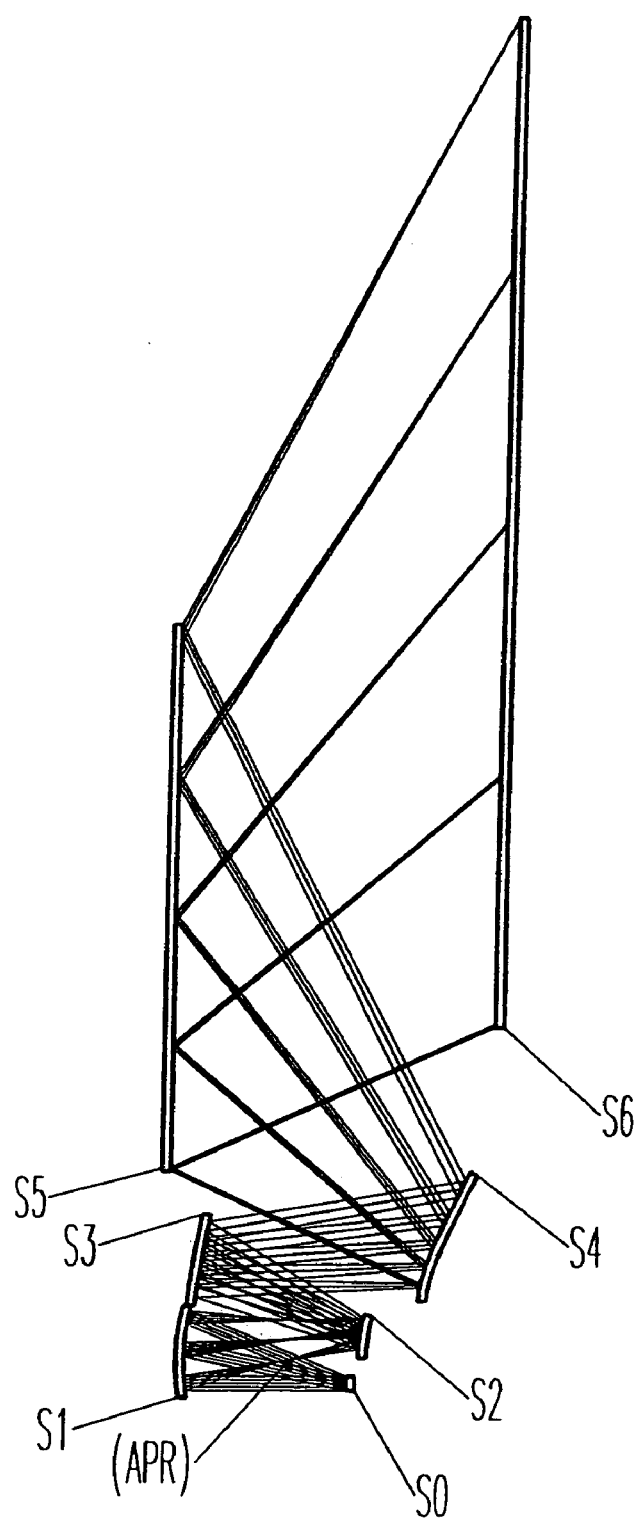
FIG. 15 is a sectional view, taken along the x-y plane, of the projection optical system of a third embodiment of the invention.
Figure 16:
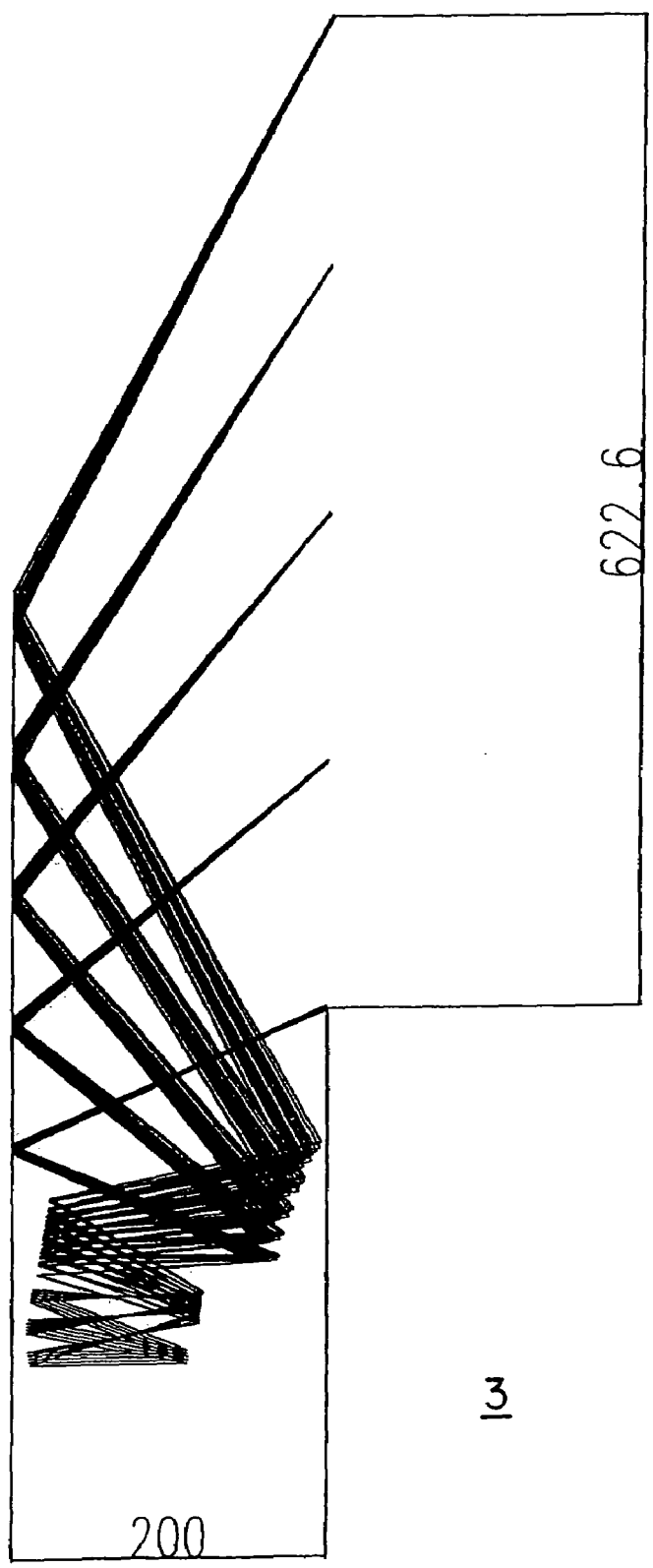
FIG. 16 is a side view, as seen from the z direction, of the projection optical system of the third embodiment.
Figure 17:
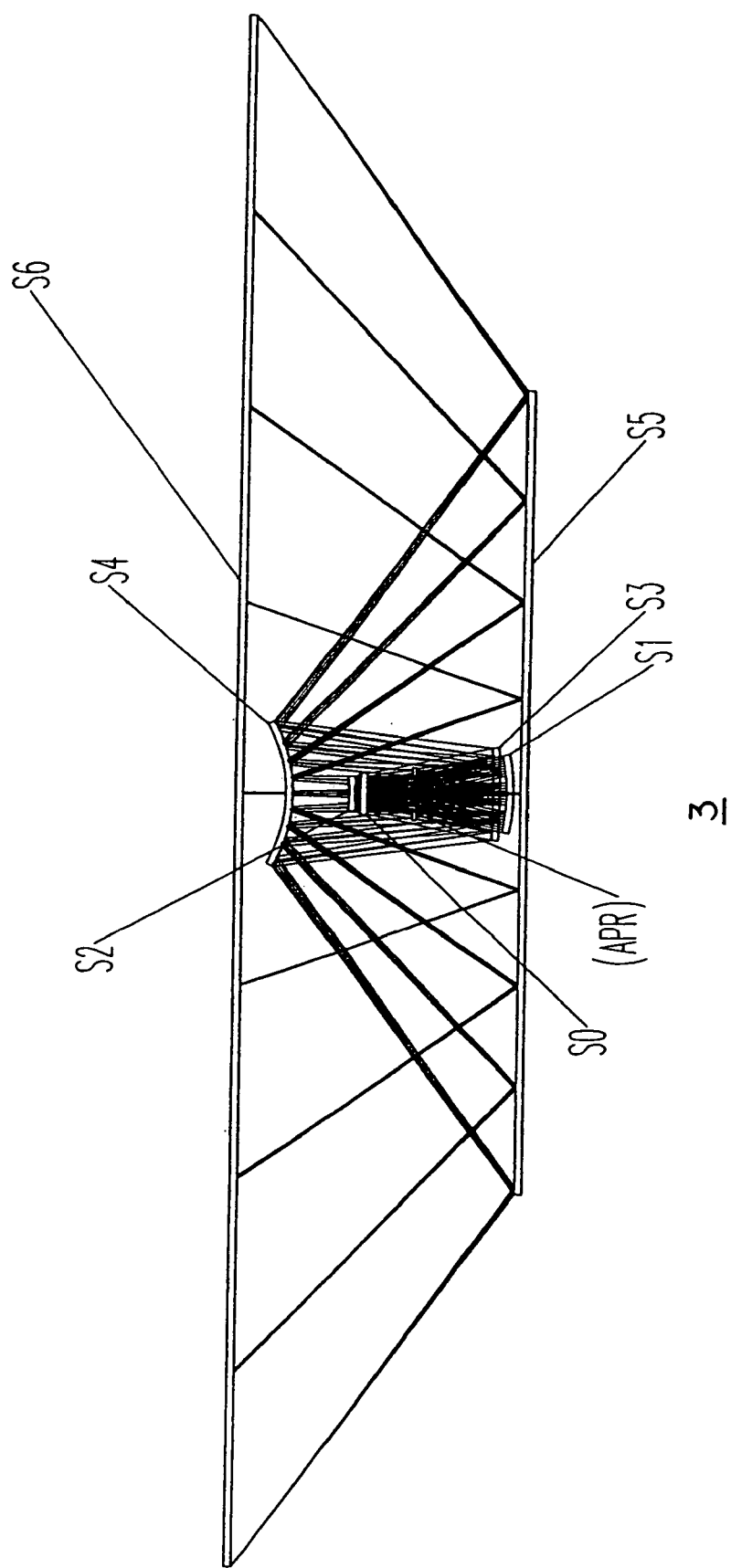
FIG. 17 is a top view, as seen from the y direction, of the projection optical system of the third embodiment.
Figure 18:
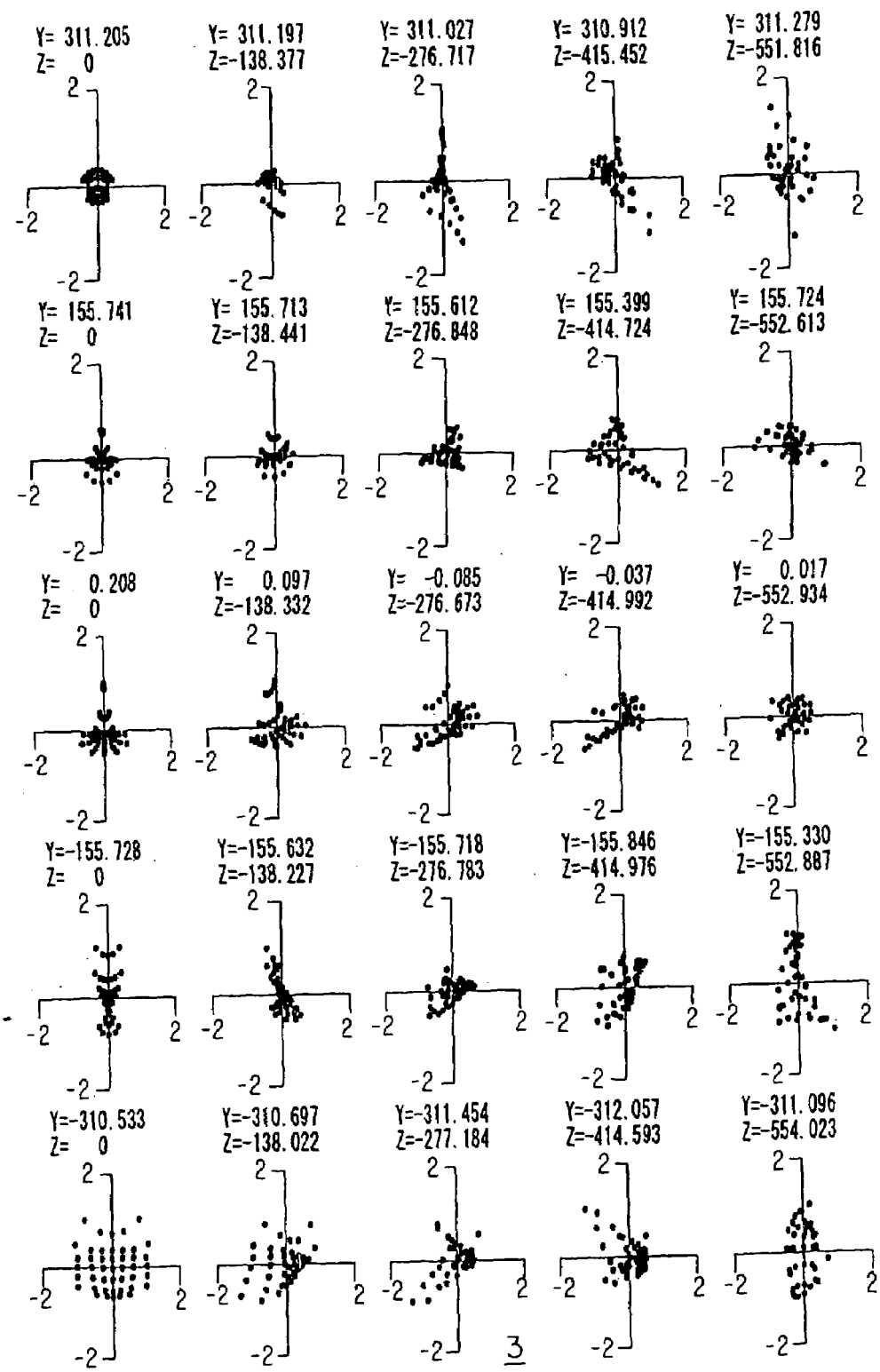
FIG. 18 is a spot diagram obtained on the projection surface of the projection optical system of the third embodiment.
Figure 19:
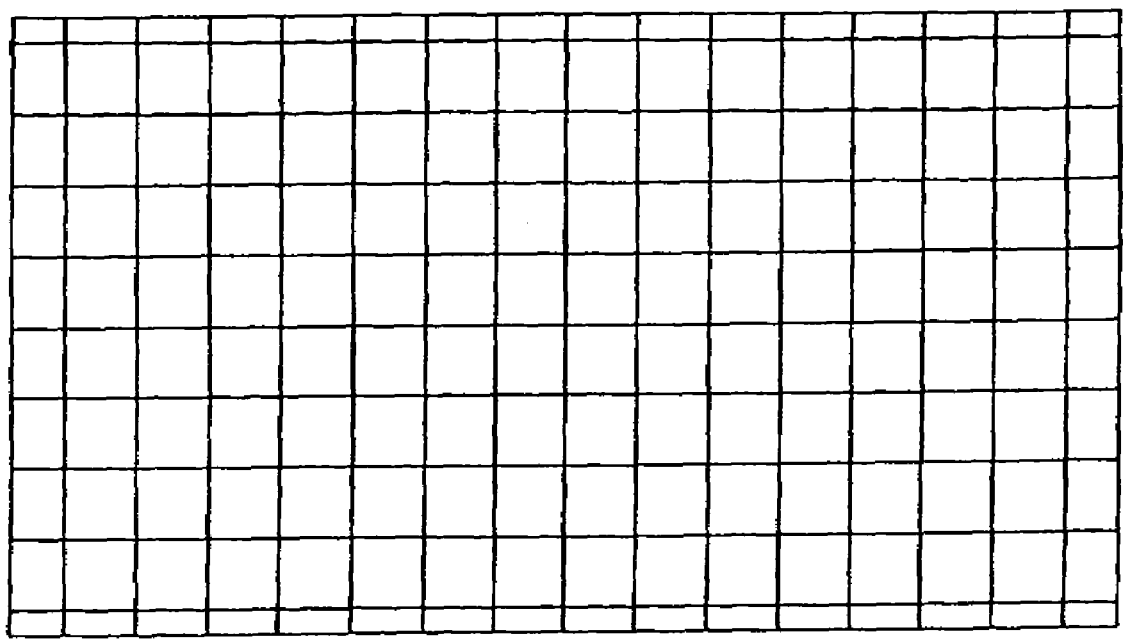
FIG. 19 is a diagram showing the distortion observed on the projection surface of the projection optical system of the third embodiment.

FIGS. 15 to 17 show a sectional view, a side view, and a top view, respectively, of the oblique projection optical system 3 of Example 3, and Tables 19 to 26 show the construction data thereof. FIG. 18 shows a spot diagram obtained on the projection surface S6, and FIG. 19 shows the distortion of the image observed on the projection surface S6.

As shown in Table 1, the magnification factors β(Y) and β(Z) in the height and width directions are 71.40 and 71.39 respectively. Rays are incident on the projection surface S6 at the minimum angle of incidence (24.3°) at the lower end in the height direction at the center in the width direction, at the maximum angle of incidence (65.7°) at the upper end in the height direction at both ends in the width direction, and at an angle of incidence of 50.7° at the center. Thus, the angle of view is 41.4°. The entrance pupil is located at infinity, making the optical system an oblique telecentric optical system.

As shown in Table 2, the f-numbers Fnoy and Fnoz in the height and width directions are 2.6 and 2.5 respectively, and the ratio D/H of the thickness of the optical path to the length in the height direction of the projection surface S6 is 0.32. The four reflecting surfaces S1 to S4 have, from the display surface S0 side, a positive, a negative, a positive, and a negative power. Thus, the reflecting surface S4 closest to the projection surface S6 has a negative power. The two reflecting surfaces S1 and S2 close to the display surface S0 are aspherical surfaces, and the two reflecting surfaces S3 and S4 close to the projection surface S6 are free-form curved surfaces.

Whereas the length H in the height direction of the projection surface S6 is about 623 mm, the length in the height direction of the part of the optical system that is located below the lower end of the projection surface S6 is about 225 mm, which is about 27% of the length in the height direction of the optical system as a whole. The distance between the projection surface S6 and the flat-surface reflecting surface S5 is 200 mm, which is almost equal to the thickness D of the optical path. The ratio of the length of the projection surface S6 in the height direction to that in the width direction is about 9:16.

EXAMPLE 4

Figure 20:
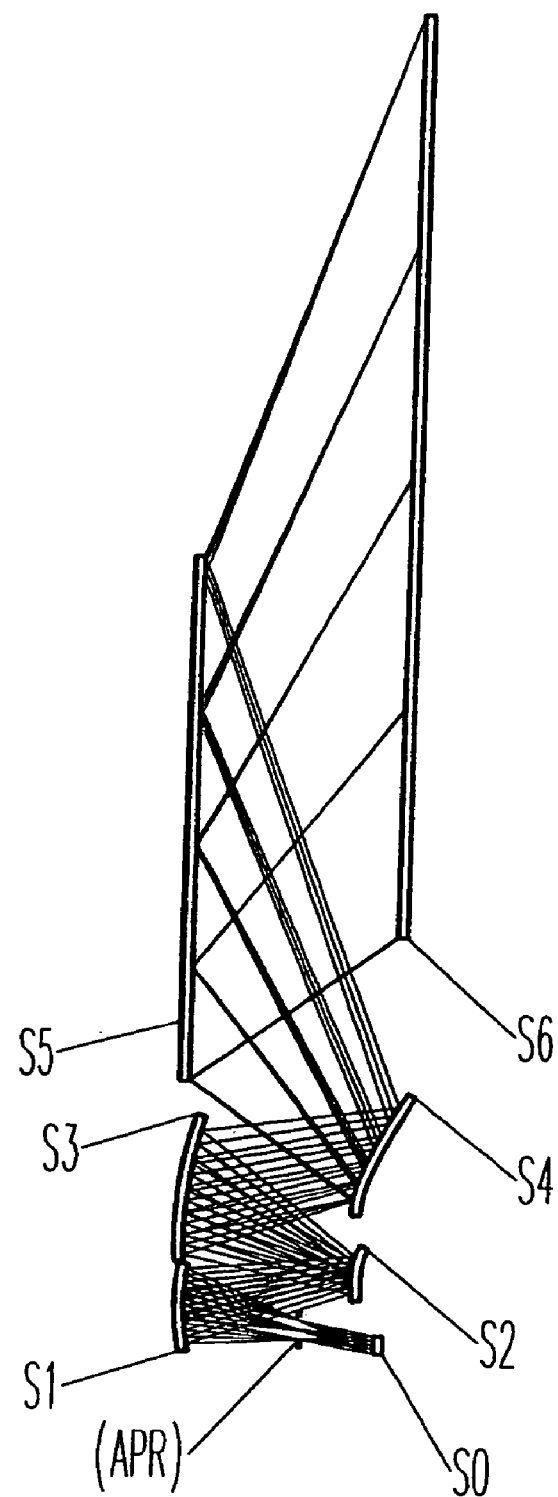
FIG. 20 is a sectional view, taken along the x-y plane, of the projection optical system of a fourth embodiment of the invention.
Figure 21:
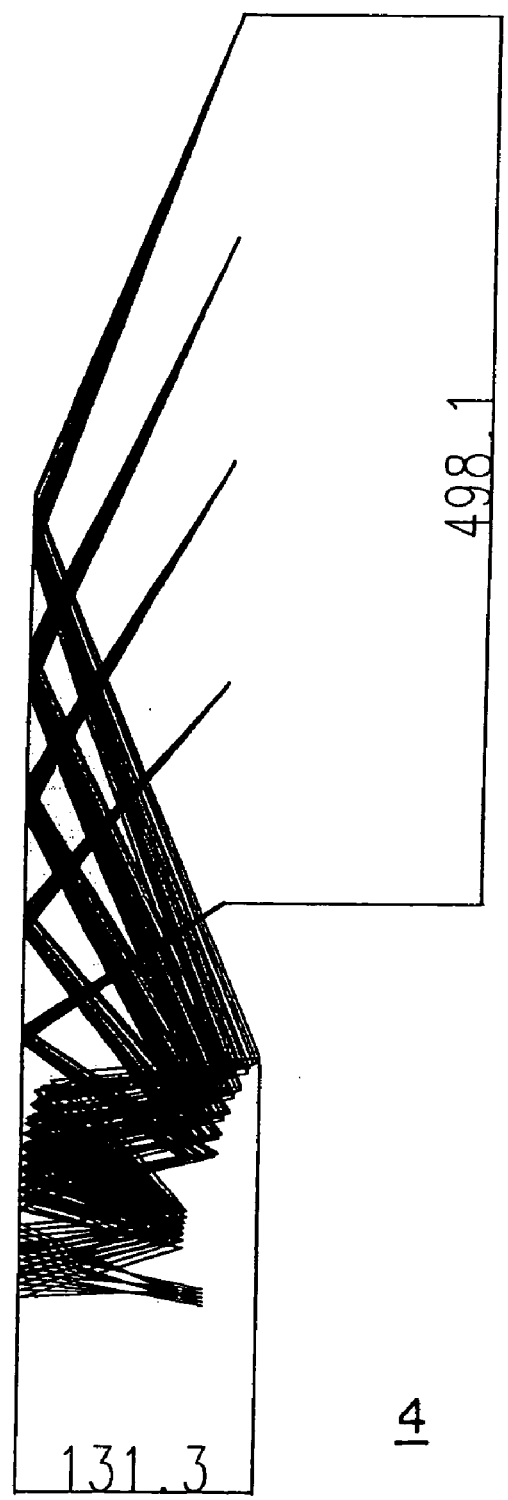
FIG. 21 is a side view, as seen from the z direction, of the projection optical system of the fourth embodiment.
Figure 22:
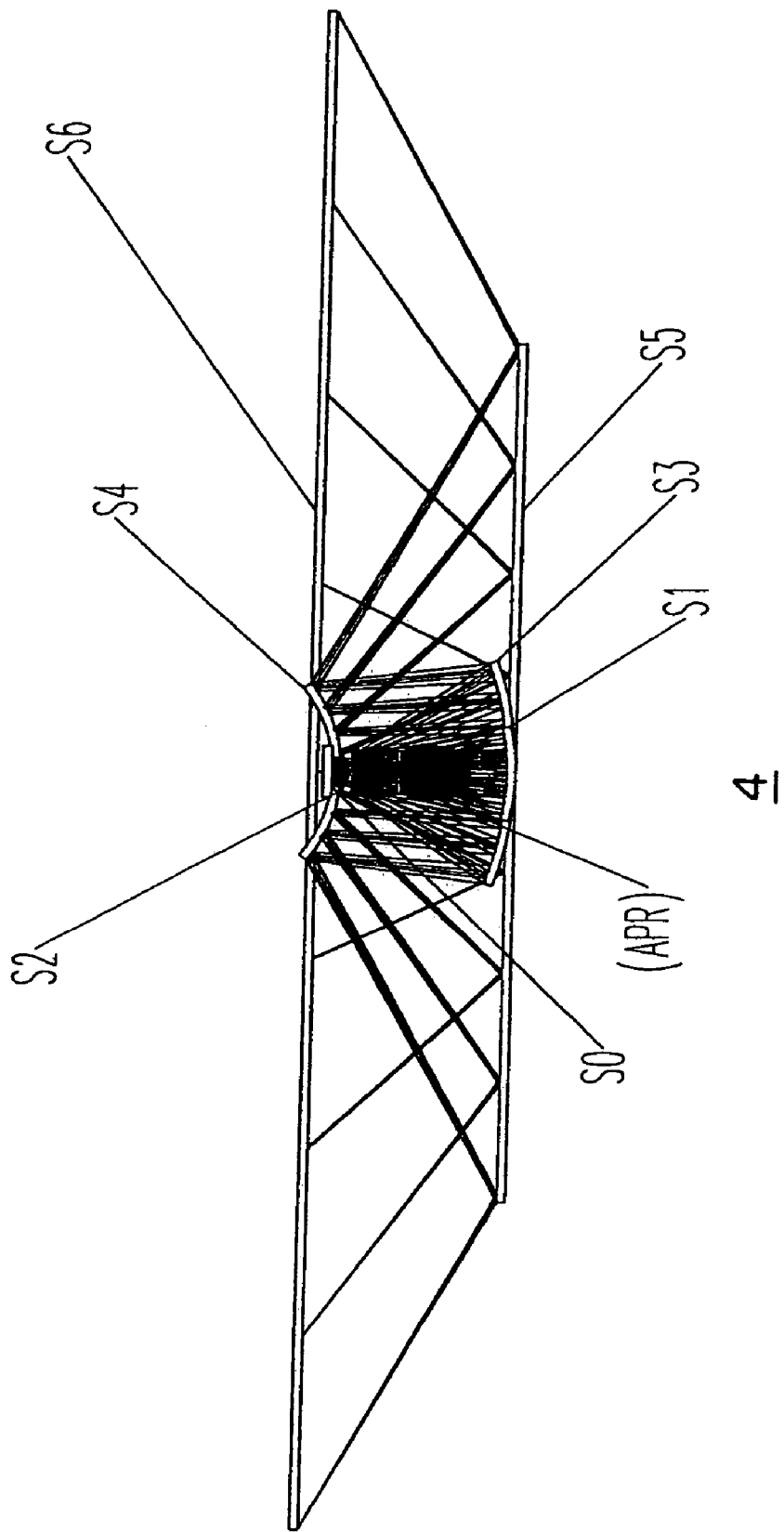
FIG. 22 is a top view, as seen from the y direction, of the projection optical system of the fourth embodiment.
Figure 23:
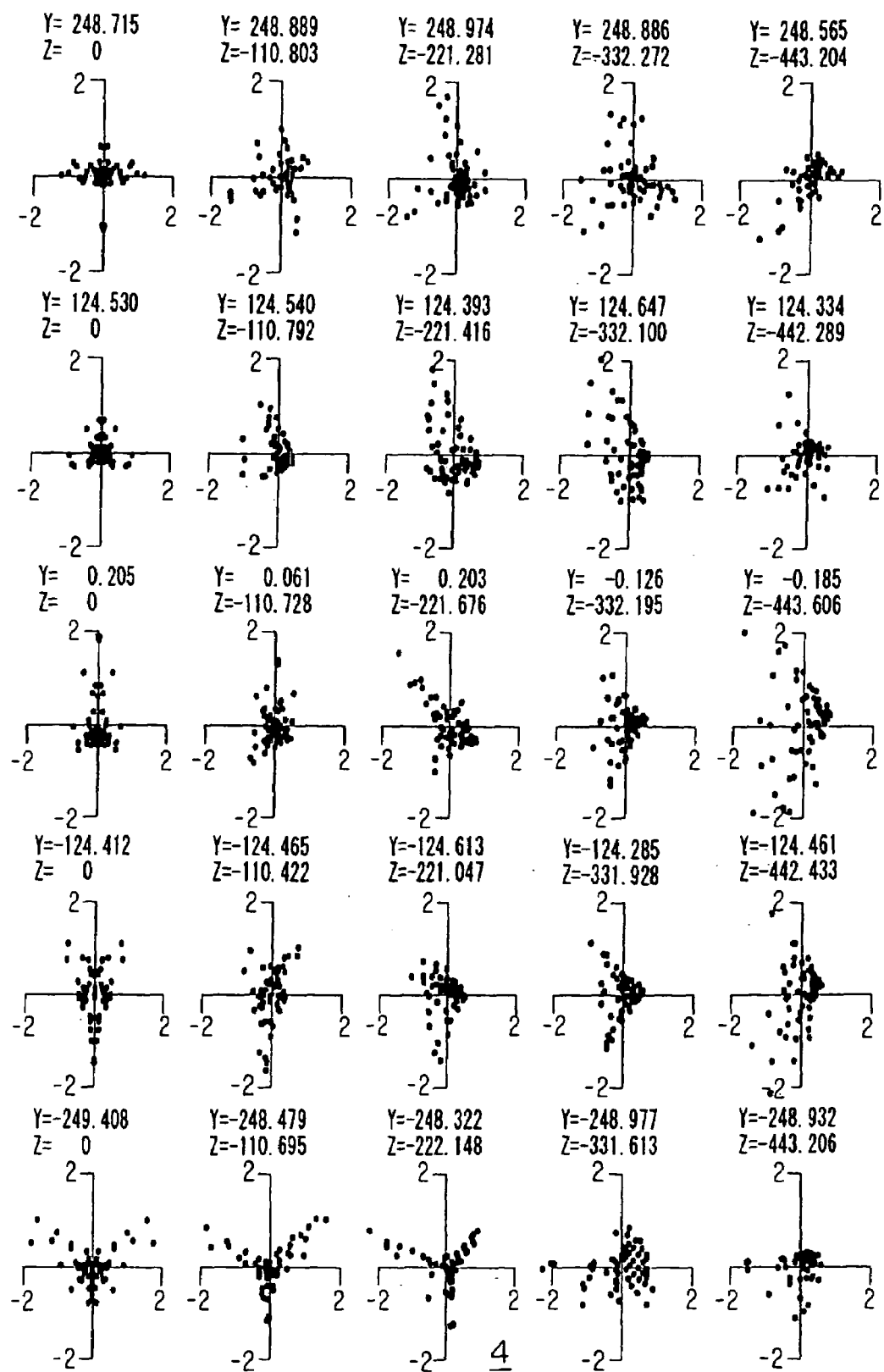
FIG. 23 is a spot diagram obtained on the projection surface of the projection optical system of the fourth embodiment.
Figure 24:
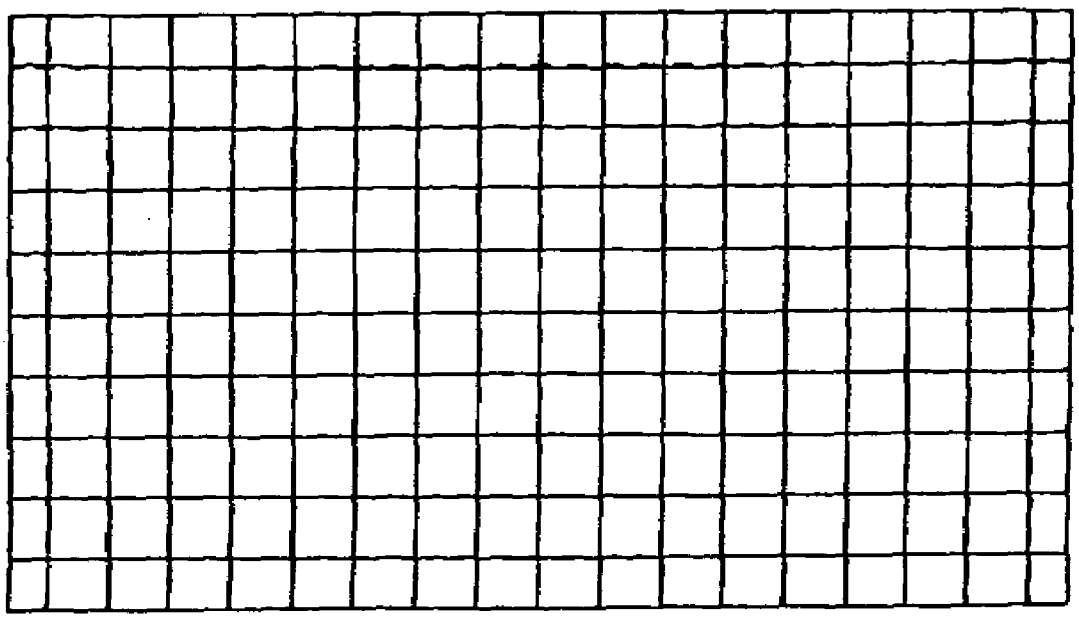
FIG. 24 is a diagram showing the distortion observed on the projection surface of the projection optical system of the fourth embodiment.

FIGS. 20 to 22 show a sectional view, a side view, and a top view, respectively, of the oblique projection optical system 4 of Example 4, and Tables 27 to 34 show the construction data thereof. FIG. 23 shows a spot diagram obtained on the projection surface S6, and FIG. 24 shows the distortion of the image observed on the projection surface S6.

The pupil plane APR is located between the reflecting surface S1 closest to the display surface S0 and the display surface S0, making the oblique projection optical system 4 a rear-aperture-type optical system. The aperture stop may be located between the reflecting surfaces S1 and S2 so as not to obstruct the beam traveling therebetween.

As shown in Table 1, the magnification factors β(Y) and β(Z) in the height and width directions are 51.23 and 51.27 respectively. Rays are incident on the projection surface S6 at the minimum angle of incidence (35.9°) at the lower end in the height direction at the center in the width direction, at the maximum angle of incidence (71.4°) at the upper end in the height direction at both ends in the width direction, and at an angle of incidence of 61.3° at the center. Thus, the angle of view is 35.5°. The entrance pupil is located at a finite distance from the display surface S0, making the optical system a non-telecentric optical system.

As shown in Table 2, the f-numbers Fnoy and Fnoz in the height and width directions are 3.6 and 3.5 respectively, and the ratio D/H of the thickness of the optical path to the length in the height direction of the projection surface S6 is 0.26. The four reflecting surfaces S1 to S4 have, from the display surface S0 side, a positive, a negative, a positive, and a negative power. Thus, the reflecting surface S4 closest to the projection surface S6 has a negative power. All these four reflecting surfaces S1 to S4 are free-form curved surfaces.

Whereas the length H in the height direction of the projection surface S6 is about 498 mm, the length in the height direction of the part of the optical system that is located below the lower end of the projection surface S6 is about 228 mm, which is about 31% of the length in the height direction of the optical system as a whole. The distance between the projection surface S6 and the flat-surface reflecting surface S5 is 110 mm, which is about 31 mm less than the thickness D of the optical path. Thus, a lower central portion of the optical system protrudes a little from the projection surface S6. The ratio of the length of the projection surface S6 in the height direction to that in the width direction is about 9:16.

In the oblique projection optical systems 1 to 3 of Examples 1 to 3 described earlier, the beam traveling from the display surface S0 to the reflecting surface S1 has a high degree of symmetry in the height direction of the display surface S0. Therefore, it is difficult to illuminate the panel that displays the image on the display surface S0 from the reflecting surface S1 side. Thus, the oblique projection optical systems 1 to 3 are suitable for use with a transmissive image display panel, such as a transmissive liquid crystal panel, is used.

By contrast, in the oblique projection optical system 4 of this example, the beam traveling from the display surface S0 to the reflecting surface S1 shows striking asymmetry in the height direction of the display surface S0. Therefore, it is possible to illuminate the image display panel from the reflecting surface S1 side. Thus, the oblique projection optical system 4 is suitable for use with both a transmissive panel and a reflective panel. As a reflective panel, it is possible to use a reflective liquid crystal panel, or a mirror device composed of a large number of minute mirror elements which modulates illumination light by varying the direction of the individual mirror elements.

EXAMPLE 5

Figure 25:
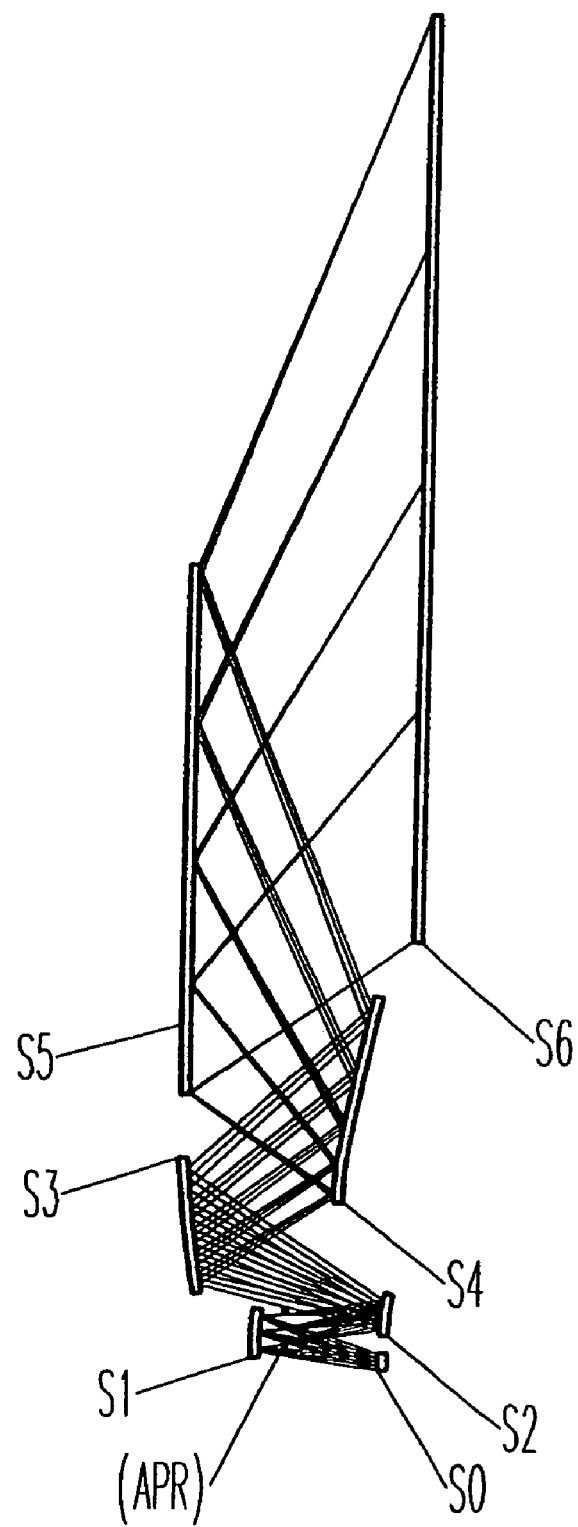
FIG. 25 is a sectional view, taken along the x-y plane, of the projection optical system of a fifth embodiment of the invention.
Figure 26:
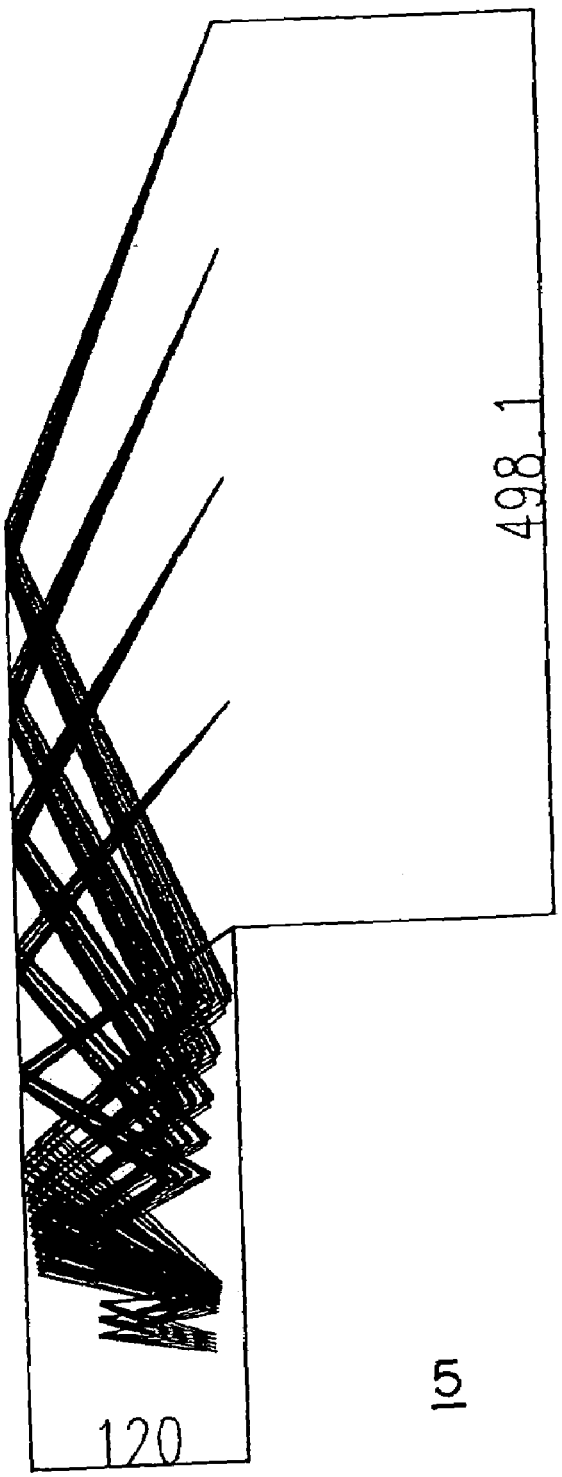
FIG. 26 is a side view, as seen from the z direction, of the projection optical system of the fifth embodiment.
Figure 27:
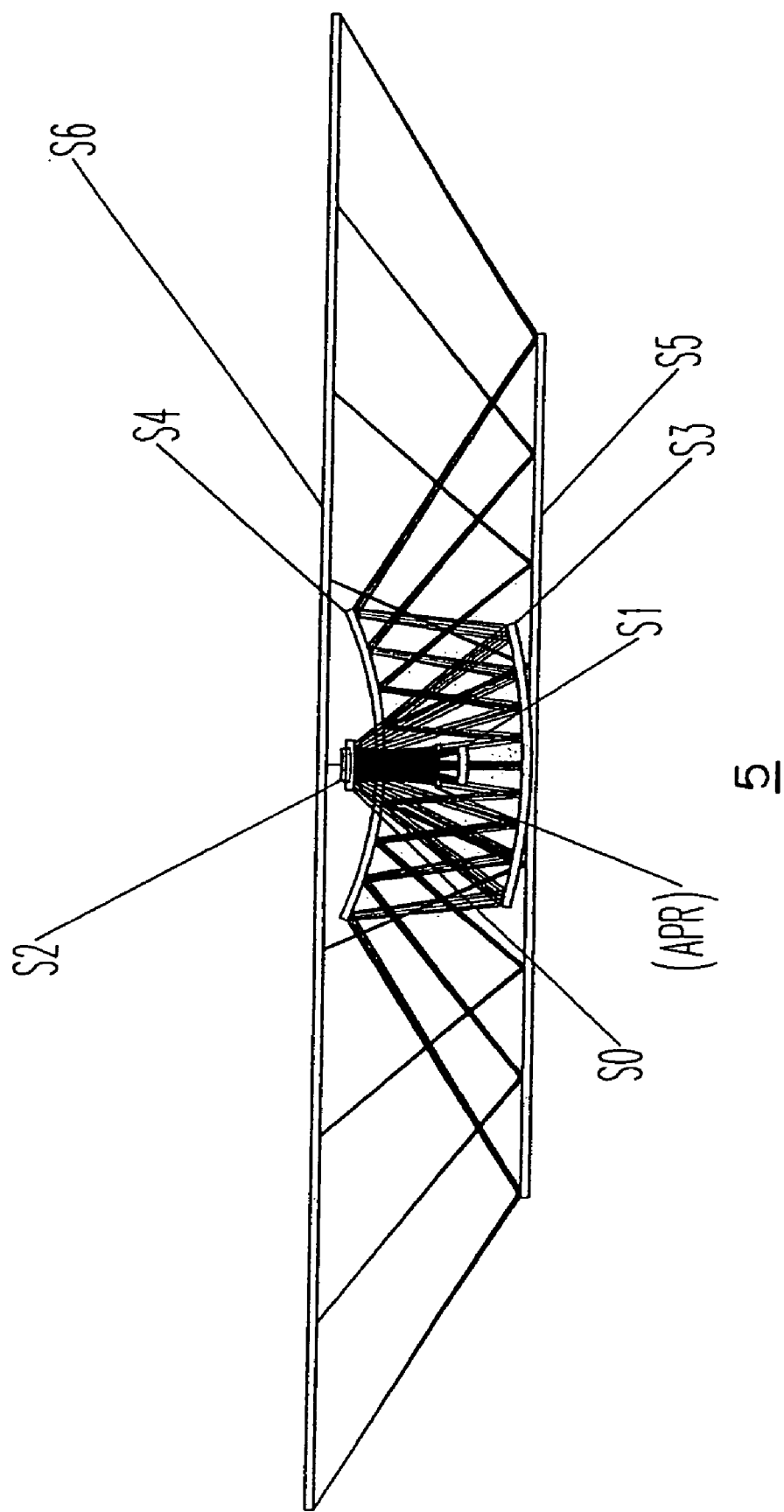
FIG. 27 is a top view, as seen from the y direction, of the projection optical system of the fifth embodiment.
Figure 28:
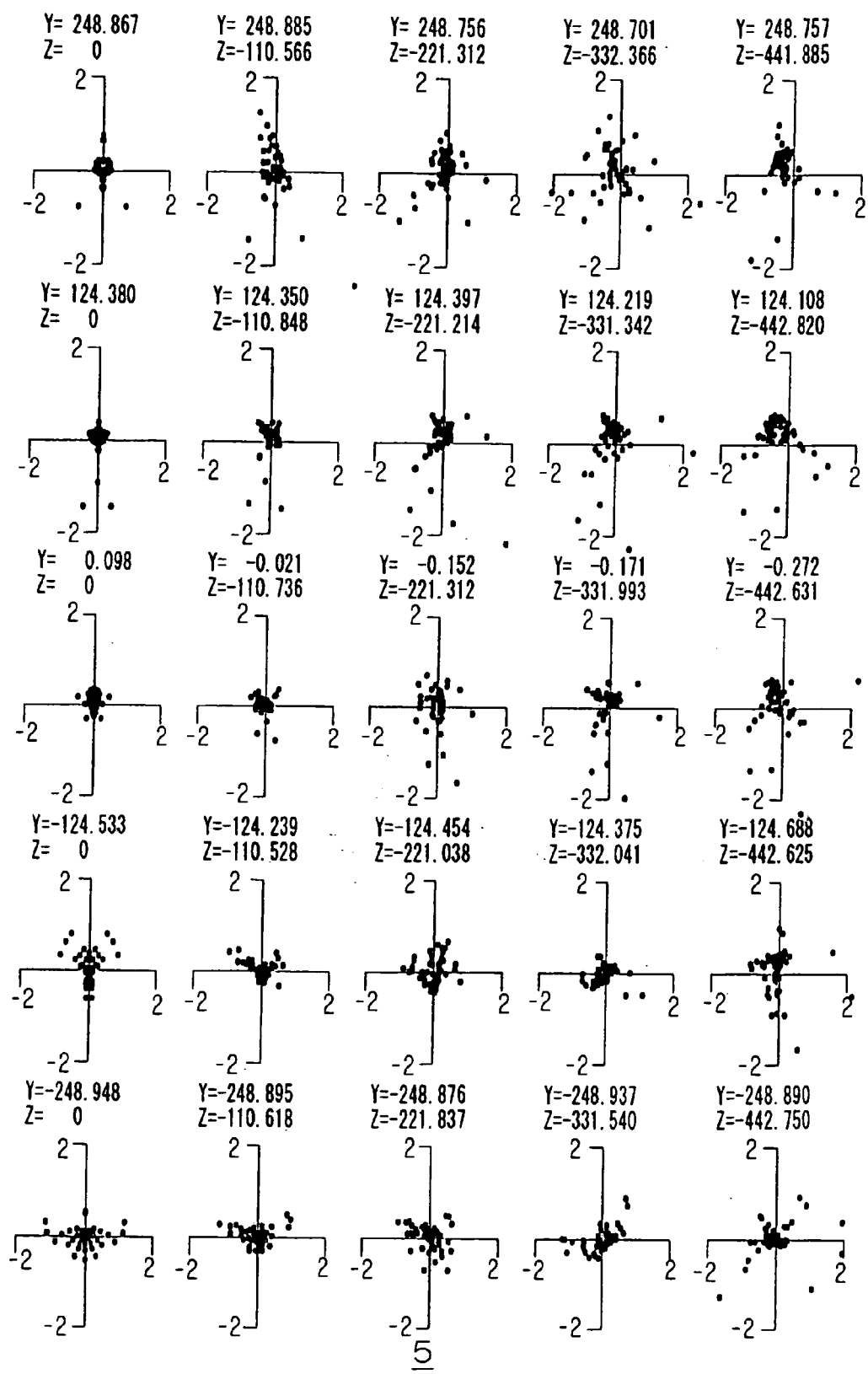
FIG. 28 is a spot diagram obtained on the projection surface of the projection optical system of the fifth embodiment.
Figure 29:
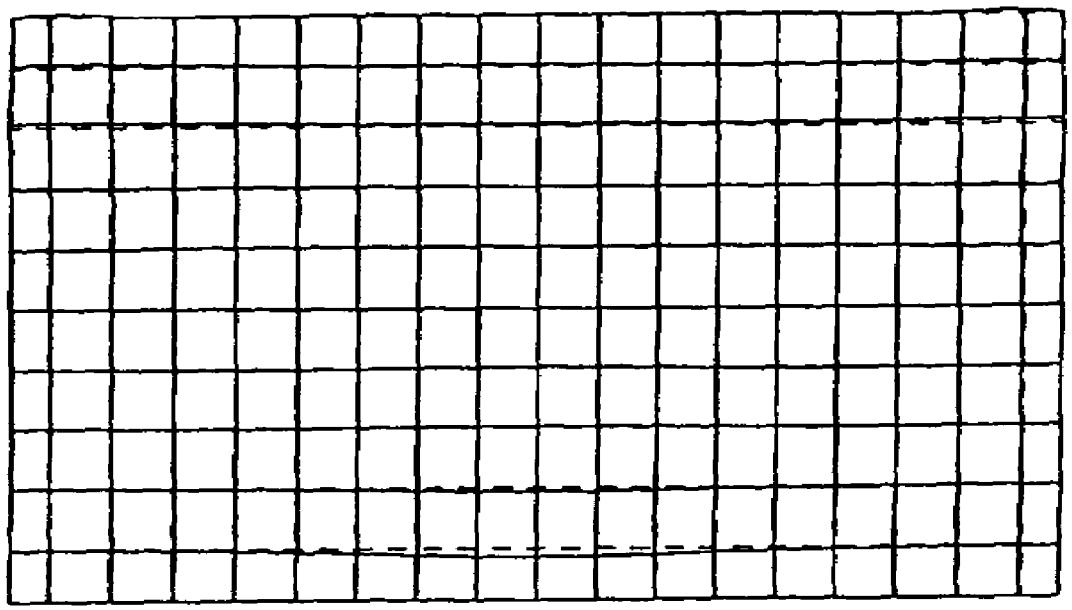
FIG. 29 is a diagram showing the distortion observed on the projection surface of the projection optical system of the fifth embodiment.

FIGS. 25 to 27 show a sectional view, a side view, and a top view, respectively, of the oblique projection optical system 5 of Example 5, and Tables 35 to 42 show the construction data thereof. FIG. 28 shows a spot diagram obtained on the projection surface S6, and FIG. 29 shows the distortion of the image observed on the projection surface S6.

As shown in Table 1, the magnification factors $\beta(Y)$ and $\beta(Z)$ in the height and width directions are 51.25 and 51.27 respectively. Rays are incident on the projection surface S6 at the minimum angle of incidence (34.8°) at the lower end in the height direction at the center in the width direction, at the maximum angle of incidence (69.7°) at the upper end in the height direction at both ends in the width direction, and at an angle of incidence of 59.8° at the center. Thus, the angle of view is 34.9°. The entrance pupil is located at a finite distance from the display surface S0, making the optical system a non-telecentric optical system.

As shown in Table 2, the f-numbers Fnoy and Fnoz in the height and width directions are 3.7 and 3.5 respectively, and the ratio D/H of the thickness of the optical path to the length in the height direction of the projection surface S6 is 0.24. The four reflecting surfaces S1 to S4 have, from the display surface S0 side, a positive, a negative, a positive, and a negative power. Thus, the reflecting surface S4 closest to the projection surface S6 has a negative power. All these four reflecting surfaces S1 to S4 are free-form curved surfaces.

Whereas the length H in the height direction of the projection surface S6 is about 498 mm, the length in the height direction of the part of the optical system that is located below the lower end of the projection surface S6 is about 234 mm, which is about 32% of the length in the height direction of the optical system as a whole. The distance between the projection surface S6 and the flat-surface reflecting surface S5 is 120 mm, which is equal to the thickness D of the optical path. The ratio of the length of the projection surface S6 in the height direction to that in the width direction is about 9:16.

EXAMPLE 6

Figure 30:
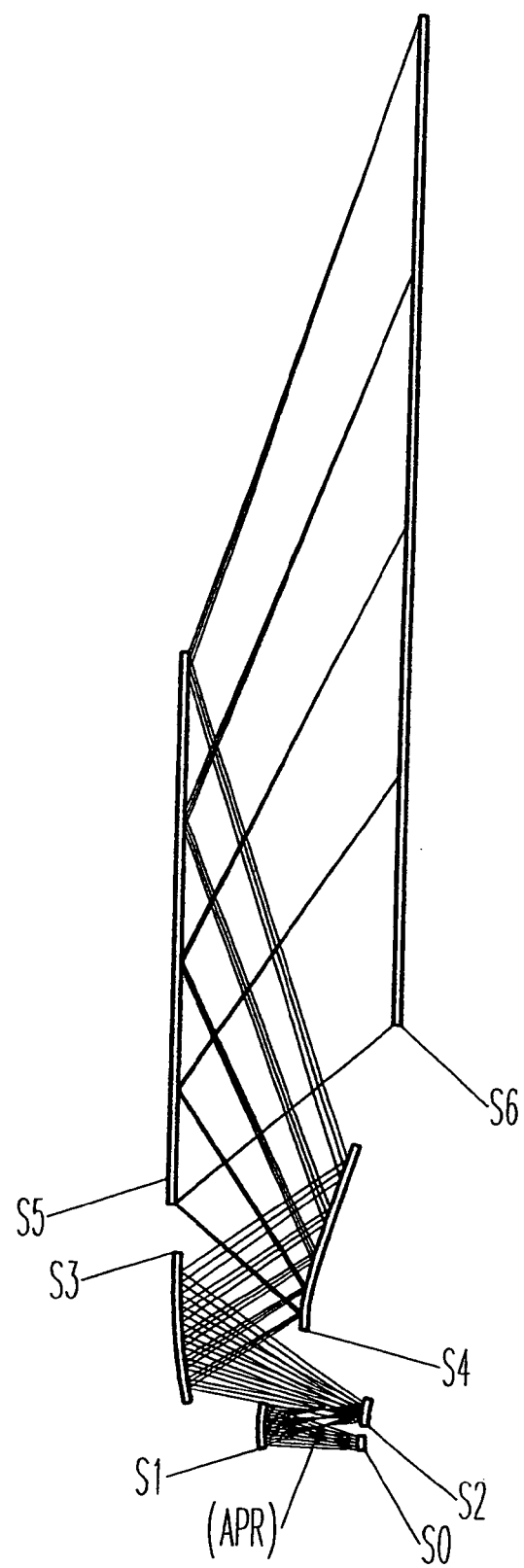
FIG. 30 is a sectional view, taken along the x-y plane, of the projection optical system of a sixth embodiment of the invention.
Figure 31:
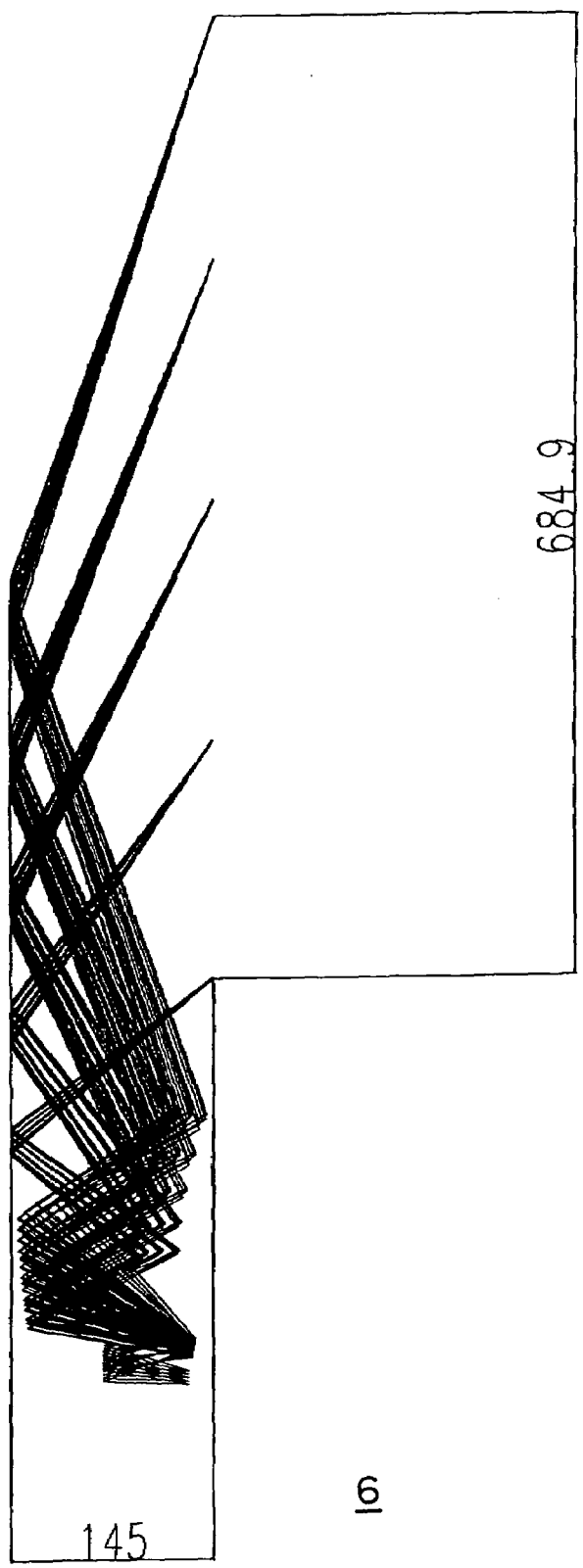
FIG. 31 is a side view, as seen from the z direction, of the projection optical system of the sixth embodiment.
Figure 32:
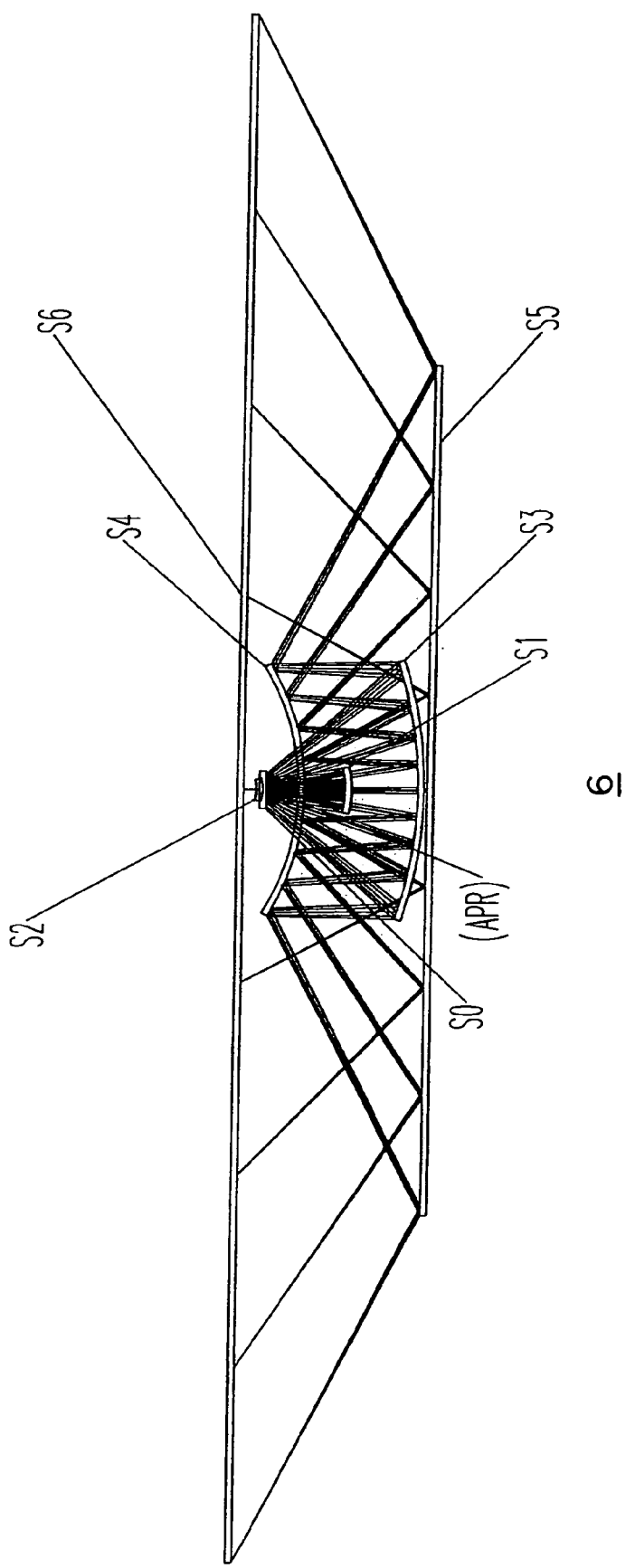
FIG. 32 is a top view, as seen from the y direction, of the projection optical system of the sixth embodiment.
Figure 33:
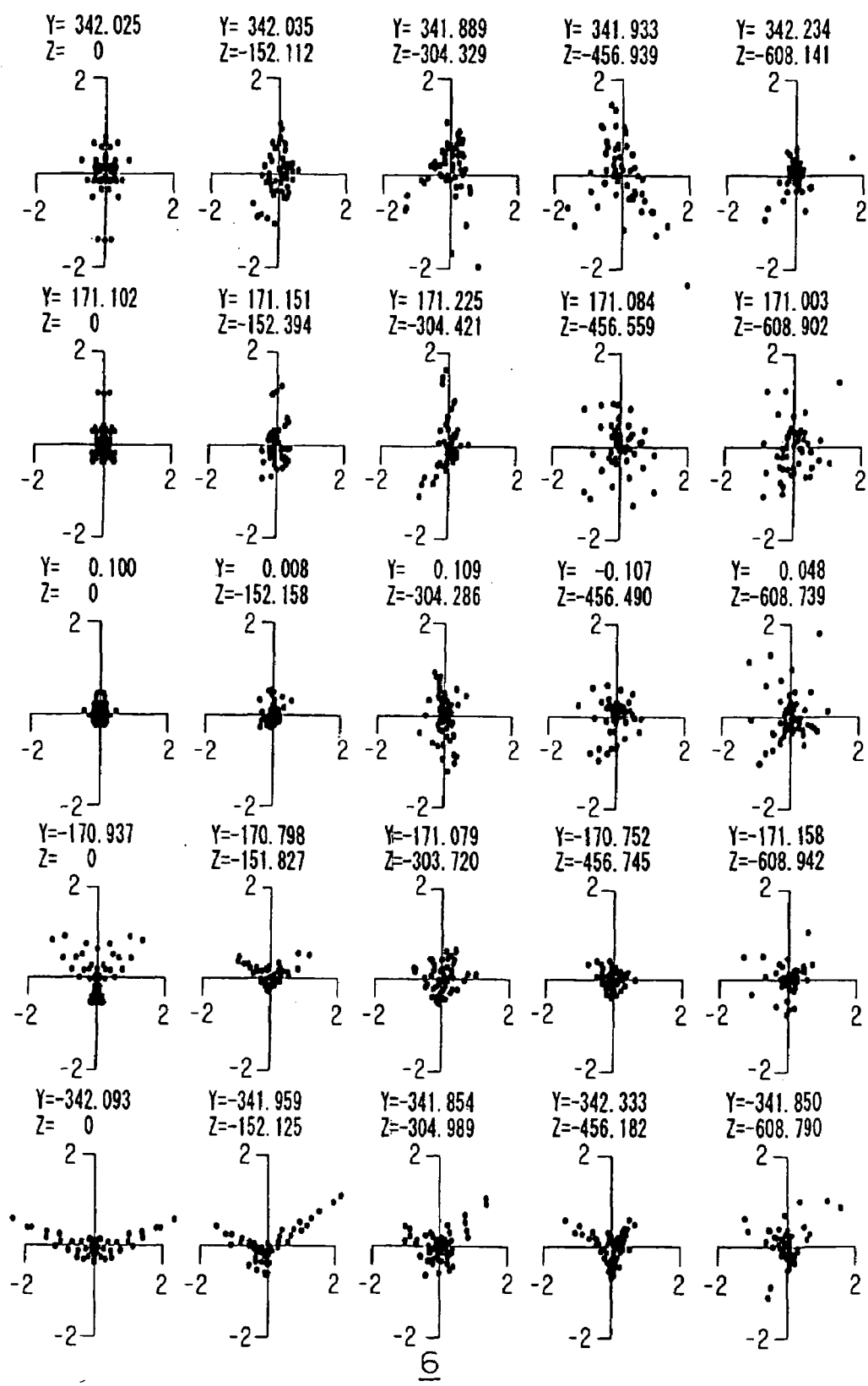
FIG. 33 is a spot diagram obtained on the projection surface of the projection optical system of the sixth embodiment.
Figure 34:
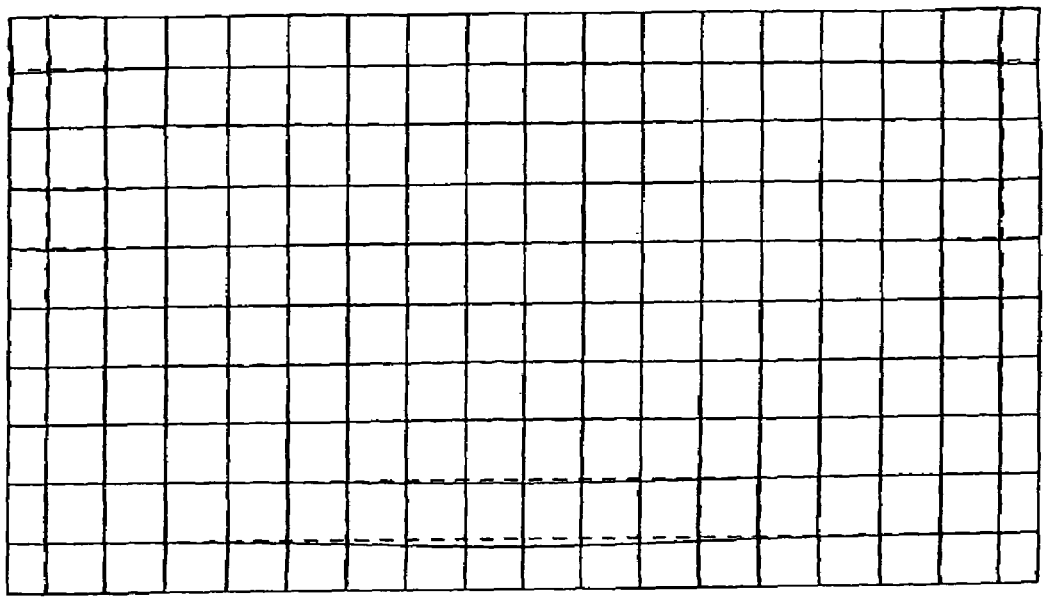
FIG. 34 is a diagram showing the distortion observed on the projection surface of the projection optical system of the sixth embodiment.

FIGS. 30 to 32 show a sectional view, a side view, and a top view, respectively, of the oblique projection optical system 6 of Example 6, and Tables 43 to 50 show the construction data thereof. FIG. 33 shows a spot diagram obtained on the projection surface S6, and FIG. 34 shows the distortion of the image observed on the projection surface S6.

As shown in Table 1, the magnification factors $\beta(Y)$ and $\beta(Z)$ in the height and width directions are 70.45 and 70.50 respectively. Rays are incident on the projection surface S6 at the minimum angle of incidence (40.2°) at the lower end in the height direction at the center in the width direction, at the maximum angle of incidence (73.2°) at the upper end in the height direction at both ends in the width direction, and at an angle of incidence of 64.3° at the center. Thus, the angle of view is 33.0°. The entrance pupil is located very far away from the display surface S0, making the optical system a non-telecentric optical system close to a telecentric optical system.

As shown in Table 2, the f-numbers Fnoy and Fnoz in the height and width directions are 3.4 and 3.3 respectively, and the ratio D/H of the thickness of the optical path to the length in the height direction of the projection surface S6 is 0.21. The four reflecting surfaces S1 to S4 have, from the display surface S0 side, a positive, a negative, a positive, and a negative power. Thus, the reflecting surface S4 closest to the projection surface S6 has a negative power. All these four reflecting surfaces S1 to S4 are free-form curved surfaces.

Whereas the length H in the height direction of the projection surface S6 is about 685 mm, the length in the height direction of the part of the optical system that is located below the lower end of the projection surface S6 is about 289 mm, which is about 30% of the length in the height direction of the optical system as a whole. The distance between the projection surface S6 and the flat-surface reflecting surface S5 is 145 mm, which is equal to the thickness D of the optical path. The ratio of the length of the projection surface S6 in the height direction to that in the width direction is about 9:16.

EXAMPLE 7

Figure 35:
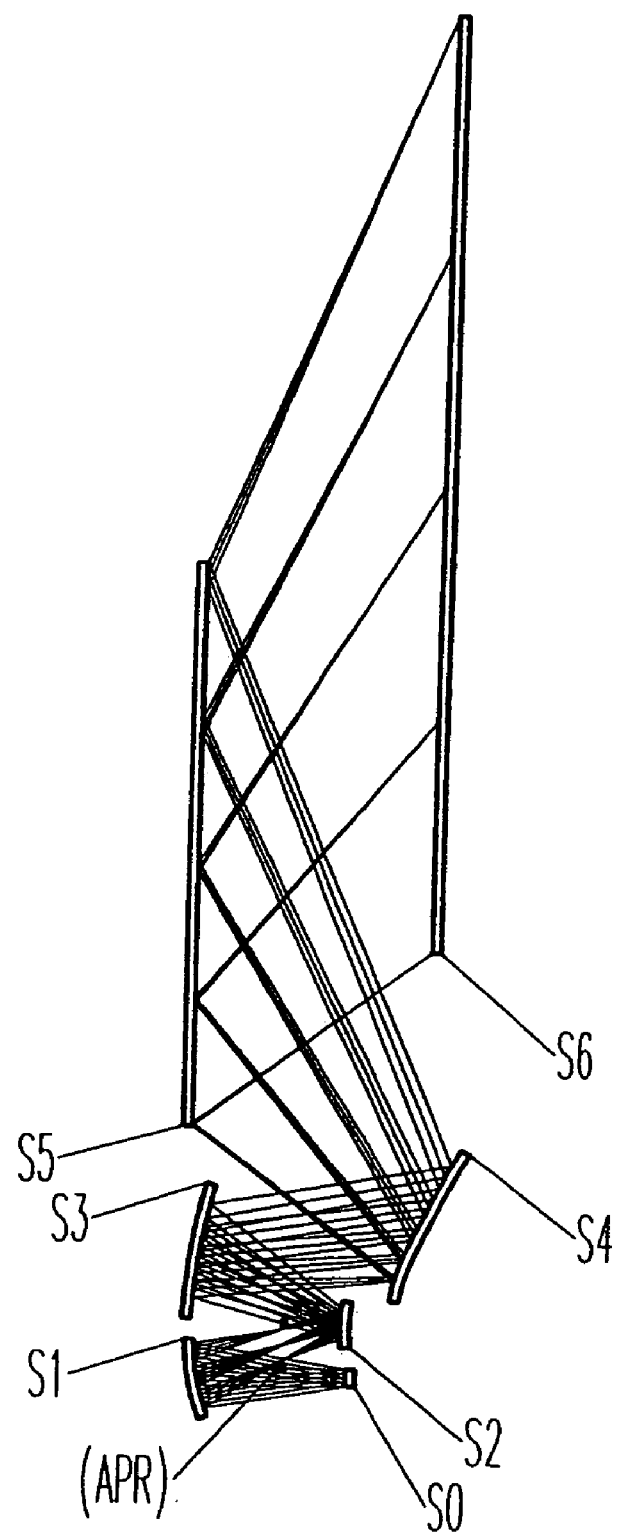
FIG. 35 is a sectional view, taken along the x-y plane, of the projection optical system of a seventh embodiment of the invention.
Figure 36:
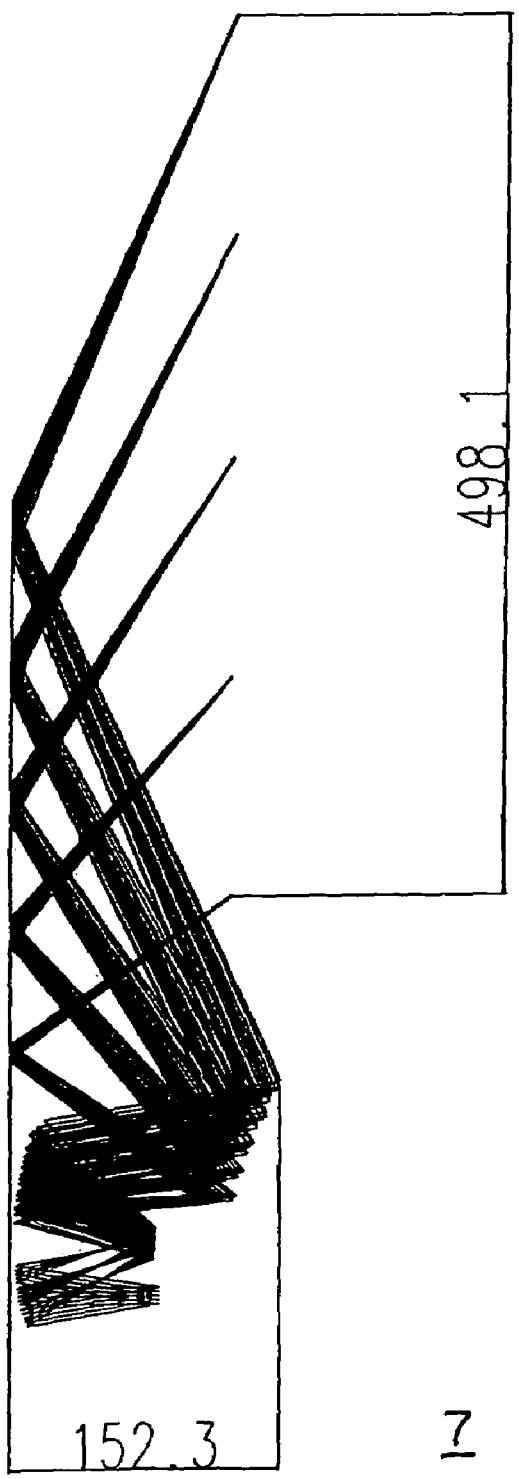
FIG. 36 is a side view, as seen from the z direction, of the projection optical system of the seventh embodiment.
Figure 37:
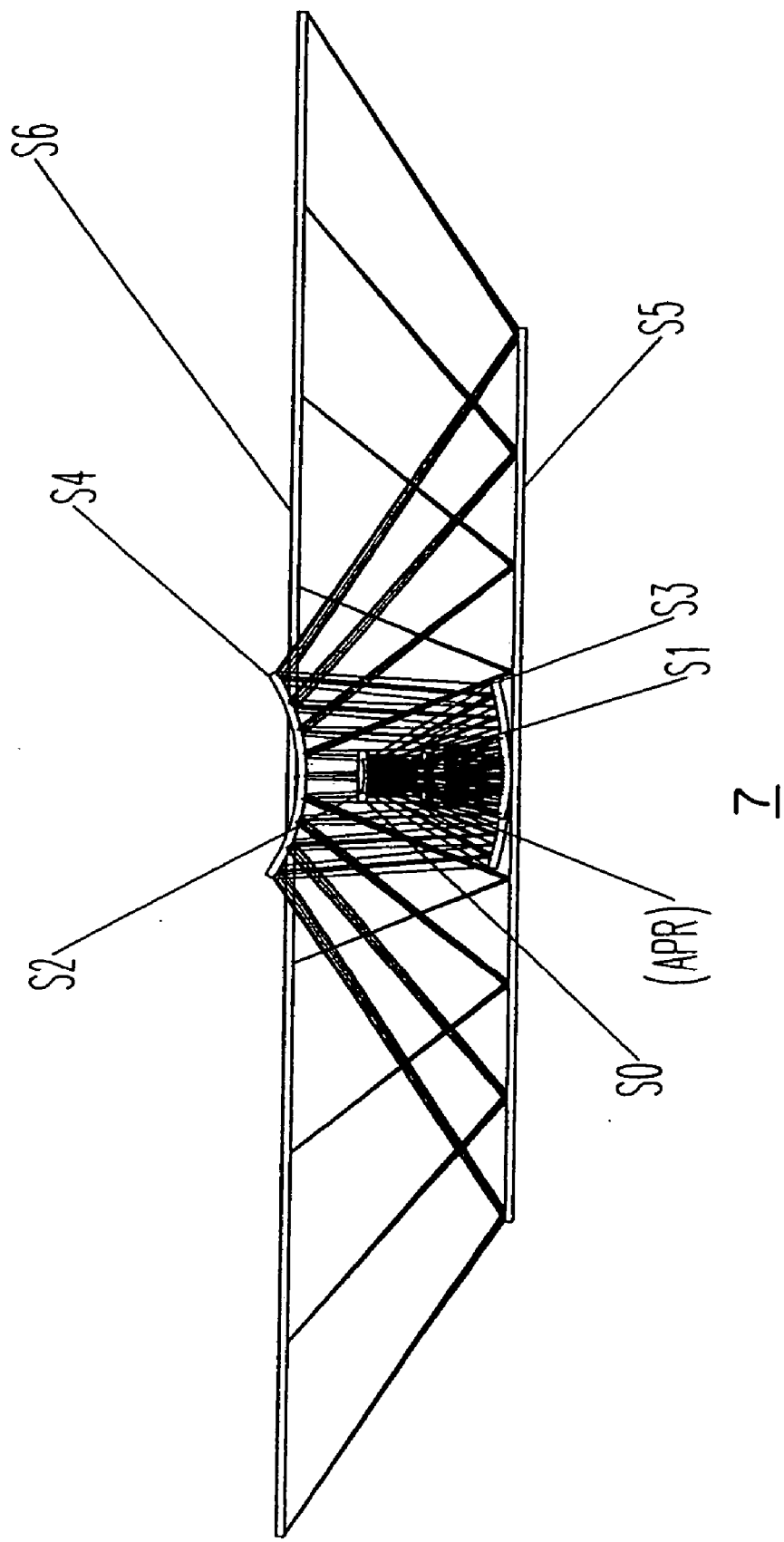
FIG. 37 is a top view, as seen from the y direction, of the projection optical system of the seventh embodiment.
Figure 38:
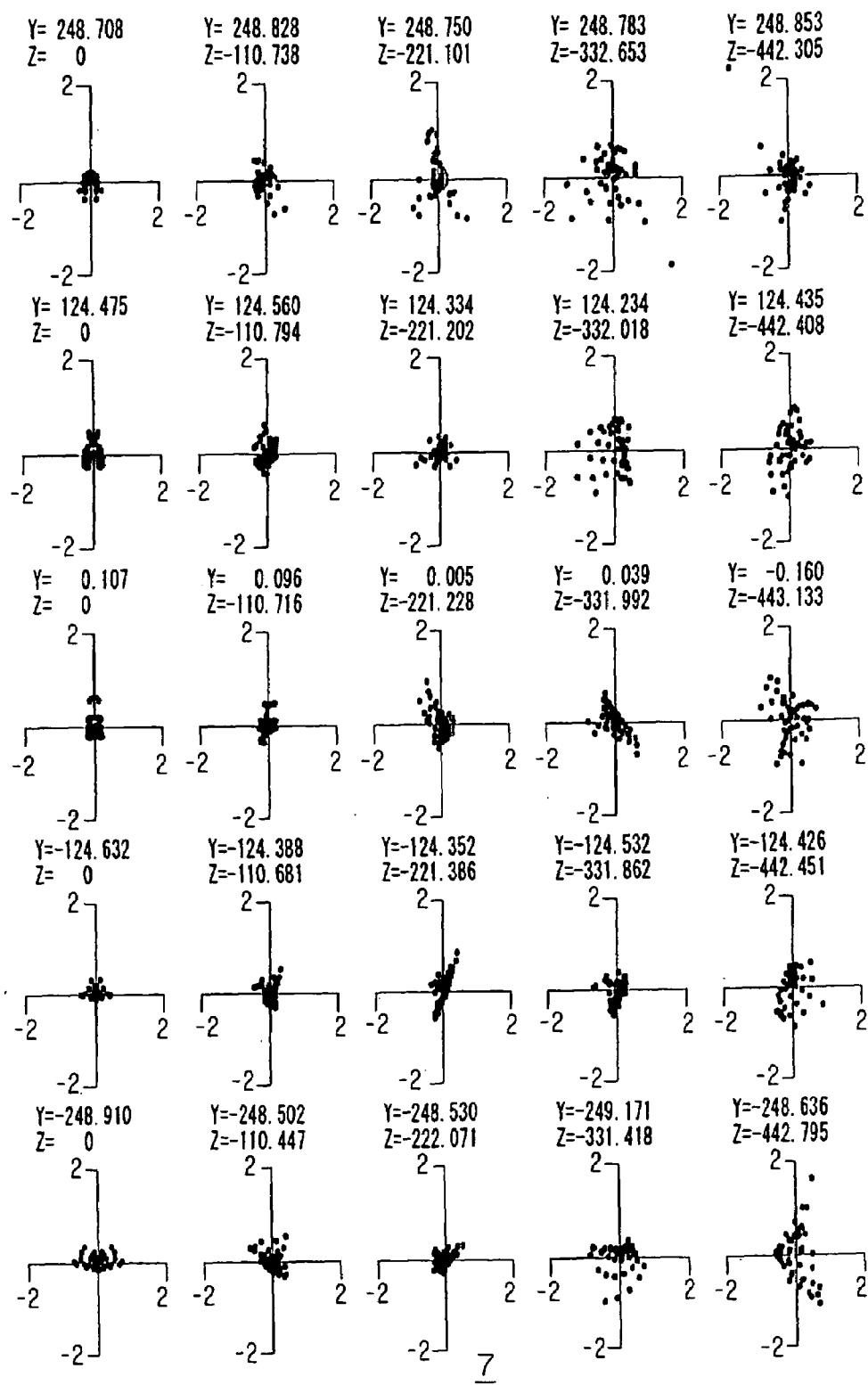
FIG. 38 is a spot diagram obtained on the projection surface of the projection optical system of the seventh embodiment.
Figure 39:
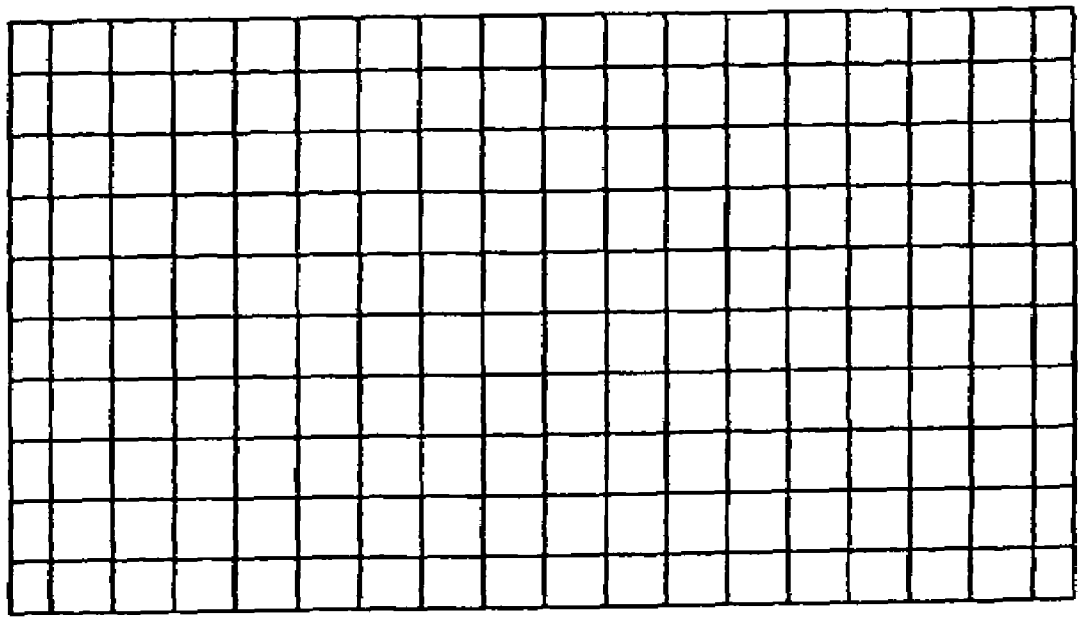
FIG. 39 is a diagram showing the distortion observed on the projection surface of the projection optical system of the seventh embodiment.

FIGS. 35 to 37 show a sectional view, a side view, and a top view, respectively, of the oblique projection optical system 7 of Example 7, and Tables 51 to 58 show the construction data thereof. FIG. 38 shows a spot diagram obtained on the projection surface S6, and FIG. 39 shows the distortion of the image observed on the projection surface S6.

As shown in Table 1, the magnification factors $\beta(Y)$ and $\beta(Z)$ in the height and width directions are 51.24 and 51.27 respectively. Rays are incident on the projection surface S6 at the minimum angle of incidence (36.8°) at the lower end in the height direction at the center in the width direction, at the maximum angle of incidence (69.1°) at the upper end in the height direction at both ends in the width direction, and at an angle of incidence of 58.6° at the center. Thus, the angle of view is 32.2°. The entrance pupil is located at infinity, making the optical system a telecentric optical system.

As shown in Table 2, the f-numbers Fnoy and Fnoz in the height and width directions are both 2.5, and the ratio D/H of the thickness of the optical path to the length in the height direction of the projection surface S6 is 0.31. The four reflecting surfaces S1 to S4 have, from the display surface S0 side, a positive, a negative, a positive, and a negative power. Thus, the reflecting surface S4 closest to the projection surface S6 has a negative power. All these four reflecting surfaces S1 to S4 are free-form curved surfaces.

Whereas the length H in the height direction of the projection surface S6 is about 498 mm, the length in the height direction of the part of the optical system that is located below the lower end of the projection surface S6 is about 233 mm, which is about 32% of the length in the height direction of the optical system as a whole. The distance between the projection surface S6 and the flat-surface reflecting surface S5 is 125 mm, which is about 27 mm less than the thickness D of the optical path. Thus, a lower central portion of the optical system protrudes a little from the projection surface S6. The ratio of the length of the projection surface S6 in the height direction to that in the width direction is about 9:16.

In Examples 1 to 7 described thus far, the display surface S0 and the projection surface S6 are arranged parallel. However, the display surface S0 may be arranged so as to be inclined relative to the projection surface S6. Such arrangement is easy in the oblique projection optical systems 1 to 7 provided with reflecting surfaces having free-form curved surfaces. In these examples, all the powered surfaces are reflecting surfaces. However, part of the powered surfaces may be realized with refractive surfaces. That is, in the oblique projection optical systems 1 to 7, it is possible to use lenses in combination with mirrors, or to use lenses instead of the mirrors having curved or aspherical surfaces.

More than one display surface may be provided; that is, it is possible, by the use of a cross prism or the like, to provide a plurality of display surfaces that are optically equivalent to one another. For example, by arranging a cross dichroic prism between the display surface S0 and the reflecting surface S1, it is possible to arrange two display surfaces equivalent to the display surface S0. Then, by displaying red, green, and blue components of an image on these three display surfaces, and then integrating together the light of these color components with the cross dichroic prism, it is possible to form a color image on the projection surface S6. In any of the oblique projection optical systems 1 to 7, there is sufficient room to arrange such a cross prism in a portion of the space between the reflecting surface S1 and the display surface S0 close to the display surface S0. It is to be noted that, even with a single display surface S0, it is possible to present a color image by displaying red, green, and blue components of an image thereon on a time division basis.

As described above, in the first to seventh embodiments, in an oblique projection optical system that projects a magnified image of an image displayed on a display surface onto a projection surface and that is provided with a plurality of reflecting surfaces having a power, the rays of light from the display surface on which the image is displayed are led to the projection surface in such a way that the ray from the center of the display surface is obliquely incident on the projection surface. At least two of the reflecting surfaces having a power are free-form curved surfaces. Moreover, of the reflecting surfaces having a power, the one closest to the projection surface has a negative power, and at least one of the other reflecting surfaces has a positive power.

This oblique projection optical system, as opposed to conventional projection optical systems built as centered optical systems, adopts free-form curved surfaces as reflecting surfaces. Adopting free-form curved surfaces as reflecting surfaces makes it possible to achieve oblique projection almost free from distortion with a short optical path length without sacrificing imaging performance. By arranging a means for displaying an image on the display surface and a screen on the projection surface, it is possible to obtain a projection apparatus. Having a short optical path length, the projection apparatus thus obtained is not only slim, i.e. has a small dimension in the direction perpendicular to the screen, but has a small dimension also in the direction along the screen. When provided with a flat-surface mirror for turning the optical path, this oblique projection optical system is suitable for use in rear projection apparatus, but it can be used in front projection apparatus as well.

To obtain a sufficiently high magnification factor (projection magnification factor), it is preferable that, of the reflecting surfaces having a power, the one closest to the projection surface have a negative power. Accordingly, to permit the rays from different points on the display surface to converge on one point on the projecting surface, at least one of the other reflecting surfaces having a power needs to have a positive power. Thus, the powers of the reflecting surfaces are determined so as to fulfill these requirements.

The oblique projection optical system described above has four reflecting surfaces having a power, and it is preferable that these reflecting surfaces have a positive, a negative, a positive, and a negative power in order of proximity to the display surface. This makes it easy to shorten the optical path from the display surface to the projection surface, and thus to slim down a projection apparatus incorporating the oblique projection optical system while simultaneously reducing the dimension of the projection apparatus in the direction along the screen.

The oblique projection optical system may be so configured that the display surface has a smaller dimension in the height direction than in the width direction, that the reflecting surfaces having a power each reflect the rays of light from the display surface in such a way as to deflect the rays in the height direction of the display surface, that the pupil plane is located between the one of the reflecting surfaces having a power that is second-closest to the display surface and the display surface, and that the following conditions are fulfilled: $Fnoy \geq Fnoz$, $Fnoy \leq 4.5$, and $Fnoz \leq 4.0$, where $Fnoy$ represents the f-number in the direction corresponding to the height direction of the display surface, and $Fnoz$ represents the f-number in the direction corresponding to the width direction of the display surface. Making each reflecting surface reflect the rays from the display surface in such a way as to deflect the rays in the height direction of the display surface makes it easy to reduce the size of a projection apparatus incorporating the oblique projection optical system in the height direction of the screen. Moreover, setting the position of the pupil plane and the relationship between the f-numbers in this way make it possible to present bright images.

Alternatively, the oblique projection optical system may be so configured that the display surface has a smaller dimension in the height direction than in the width direction, the reflecting surfaces having a power each reflect the rays of light from the display surface in such a way as to deflect the rays of light in the height direction of the display surface, and the following condition is fulfilled: $D/H \leq 0.35$, where H represents the dimension of the projection surface in the direction corresponding to the height direction of the display surface, and D represents the maximum length, in the direction normal to the projection surface, of the space through which the rays of light pass to travel from the display surface to the projection surface. A projection apparatus incorporating this oblique projection optical system is slim relative to the size of the screen.

Here, the following condition may additionally be fulfilled: $30 \leq \beta \leq 100$, where $\beta$ represents the ratio of the size of the projection surface to the size of the display surface. The symbol $\beta$ represents the magnification factor by which the image is magnified by projection. With a magnification factor lower than 30, interference between the reflecting surfaces themselves needs to be avoided by shifting, in the direction perpendicular to the projection surface, reflecting surfaces that are adjacent to each other in space. On the other hand, with a magnification factor over 100, it is necessary to reduce the f-numbers to secure sufficient brightness, and thus it is difficult to obtain higher imaging performance while shortening the optical length. By fulfilling the condition described above, it is possible both to maintain high imaging performance and to slim down and miniaturize a projection apparatus incorporating this oblique projection optical system.

Eighth to Tenth Embodiments

Figure 40:
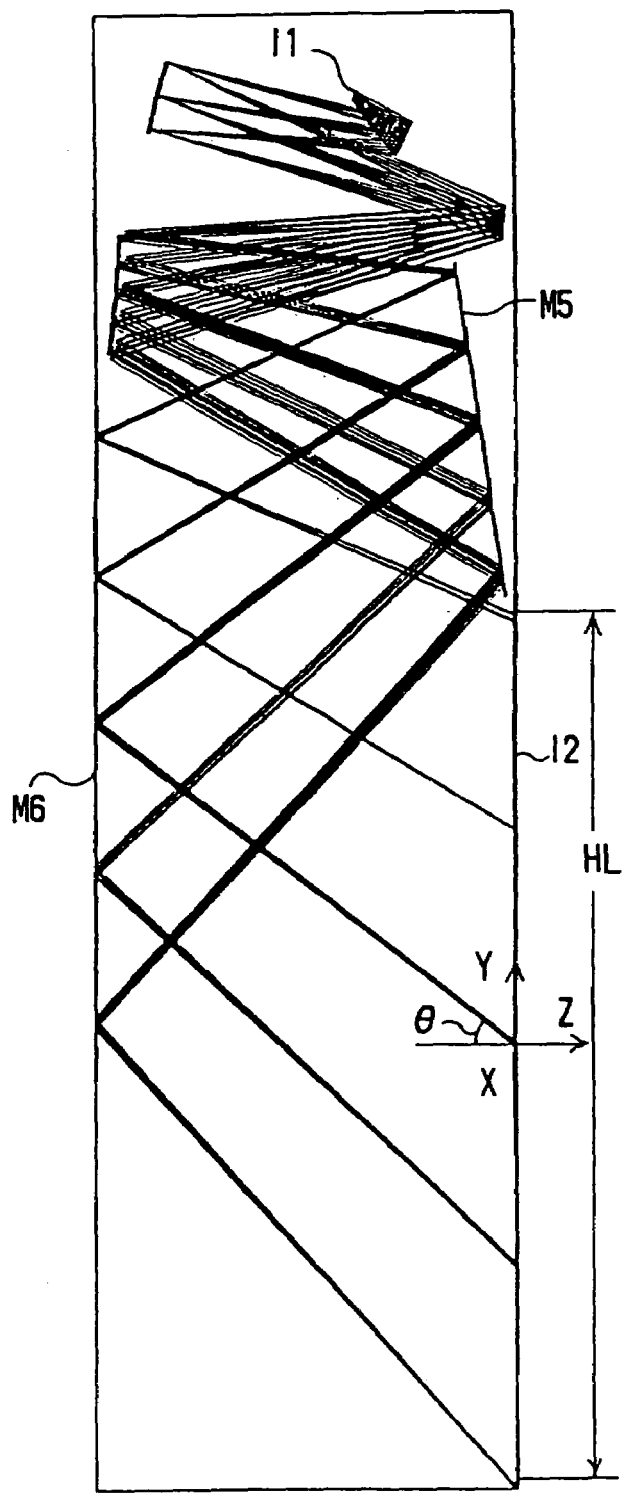
FIG. 40 is an optical path diagram of the rear projection optical system of an eighth embodiment of the invention.
Figure 41:
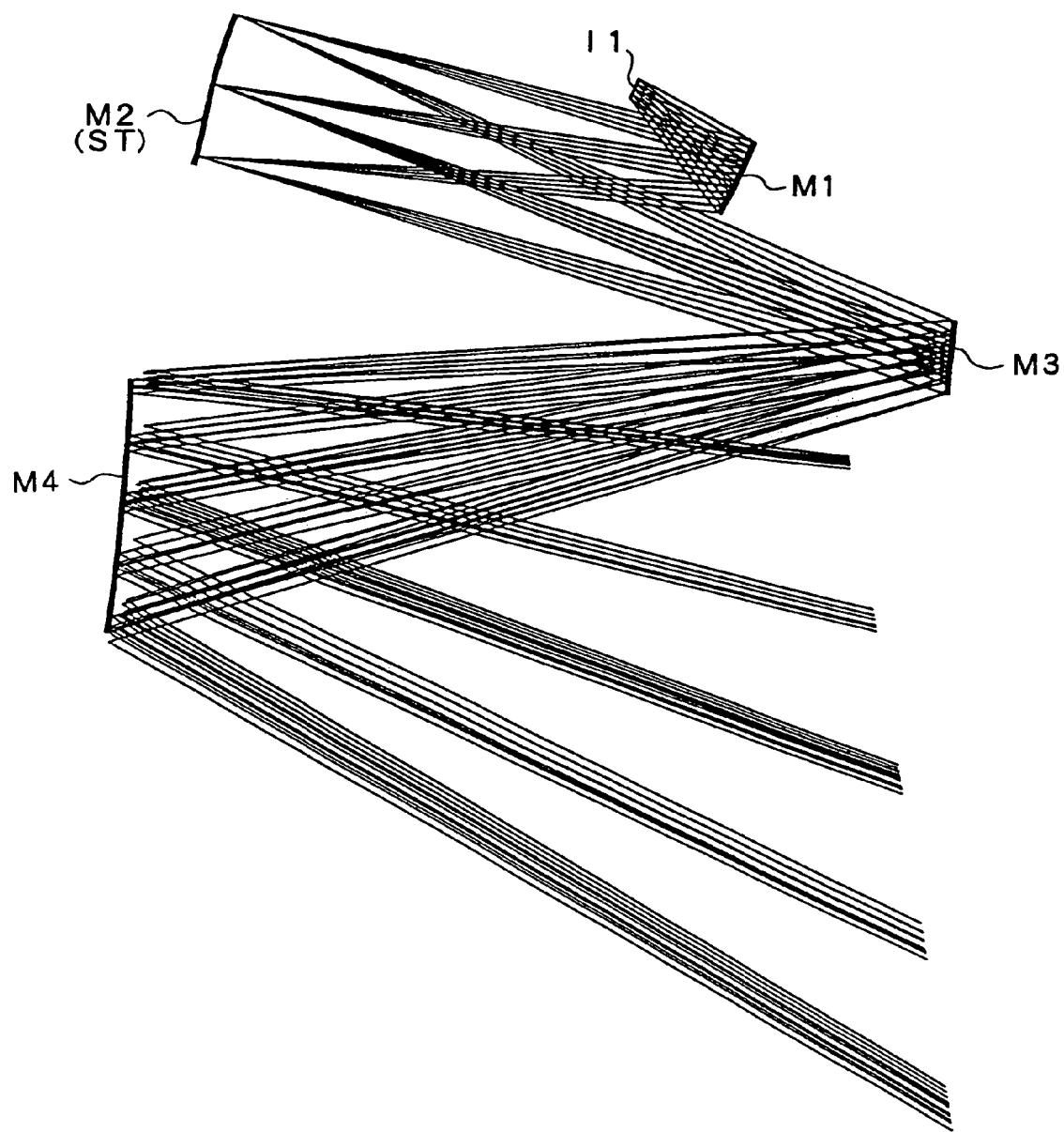
FIG. 41 is a diagram showing the projection optical system constituting the eighth embodiment and a principal portion of the optical path thereof.
Figure 44:
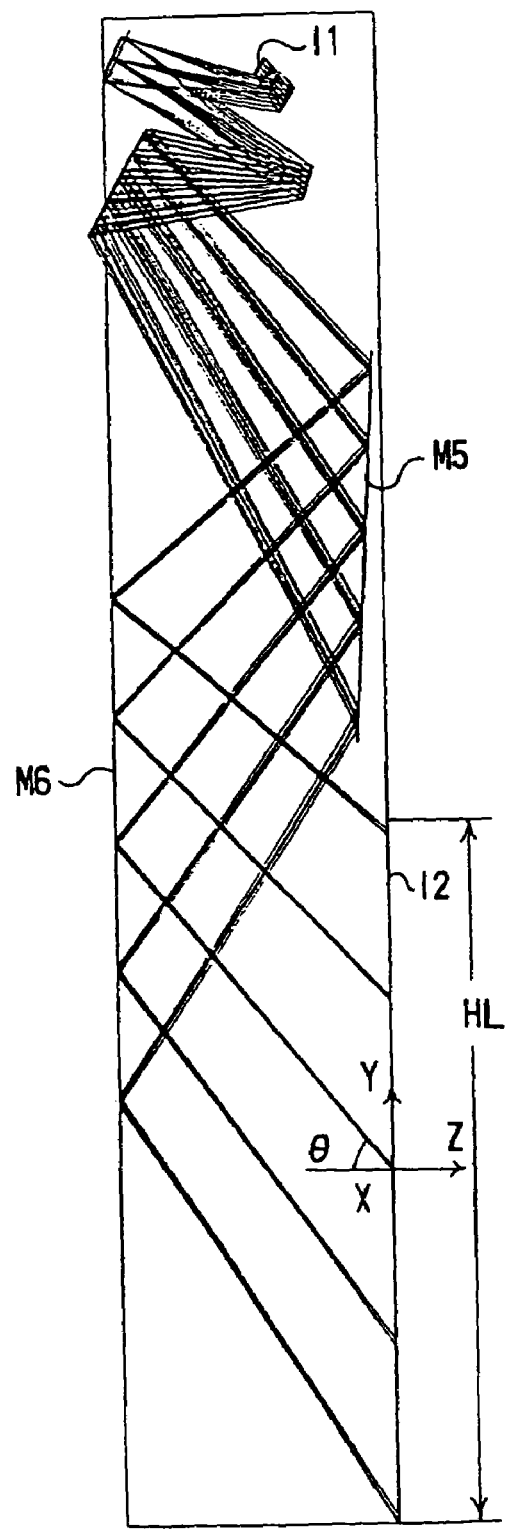
FIG. 44 is an optical path diagram of the rear projection optical system of a ninth embodiment of the invention.
Figure 45:
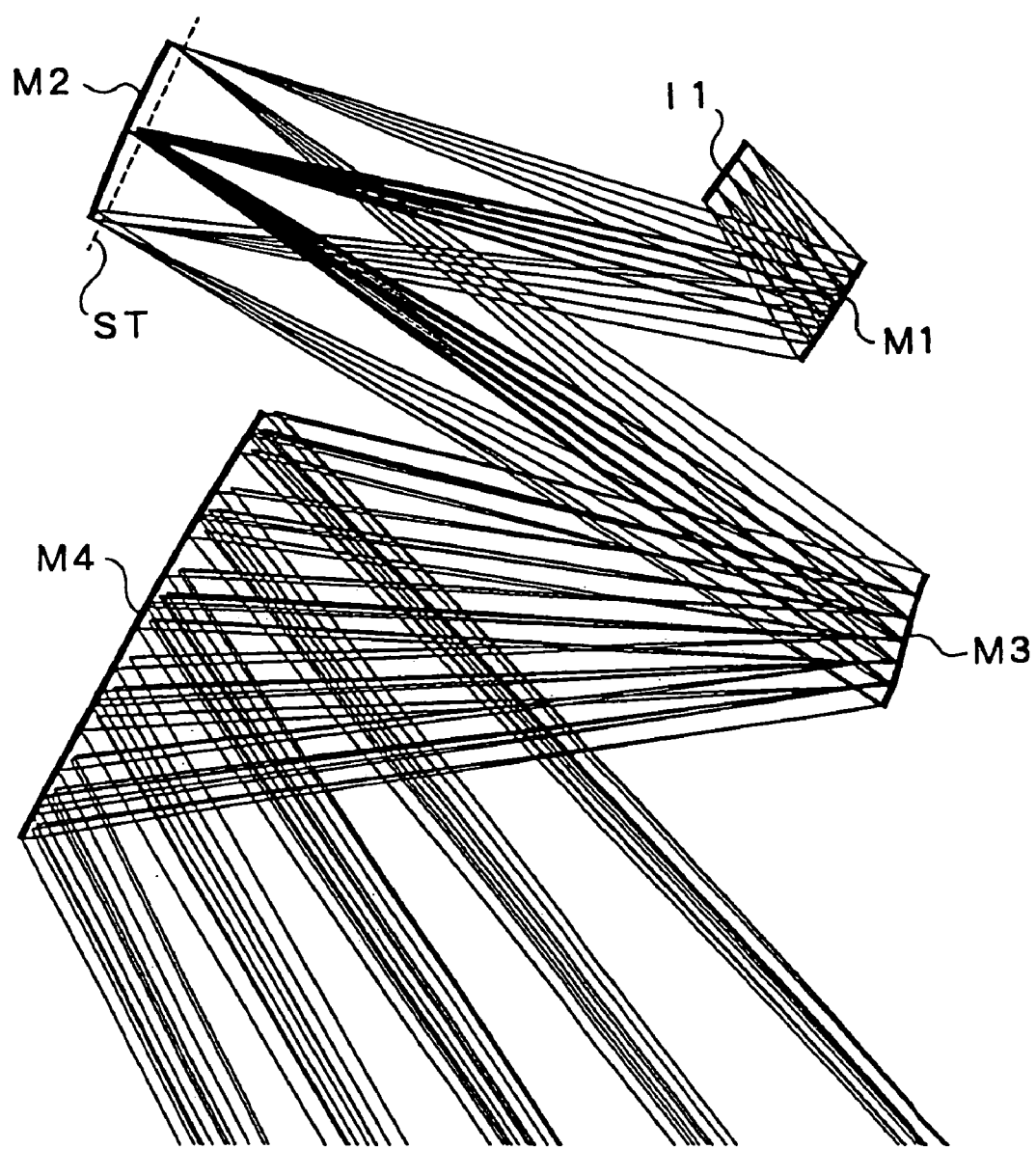
FIG. 45 is a diagram showing the projection optical system constituting the ninth embodiment and a principal portion of the optical path thereof.
Figure 48:
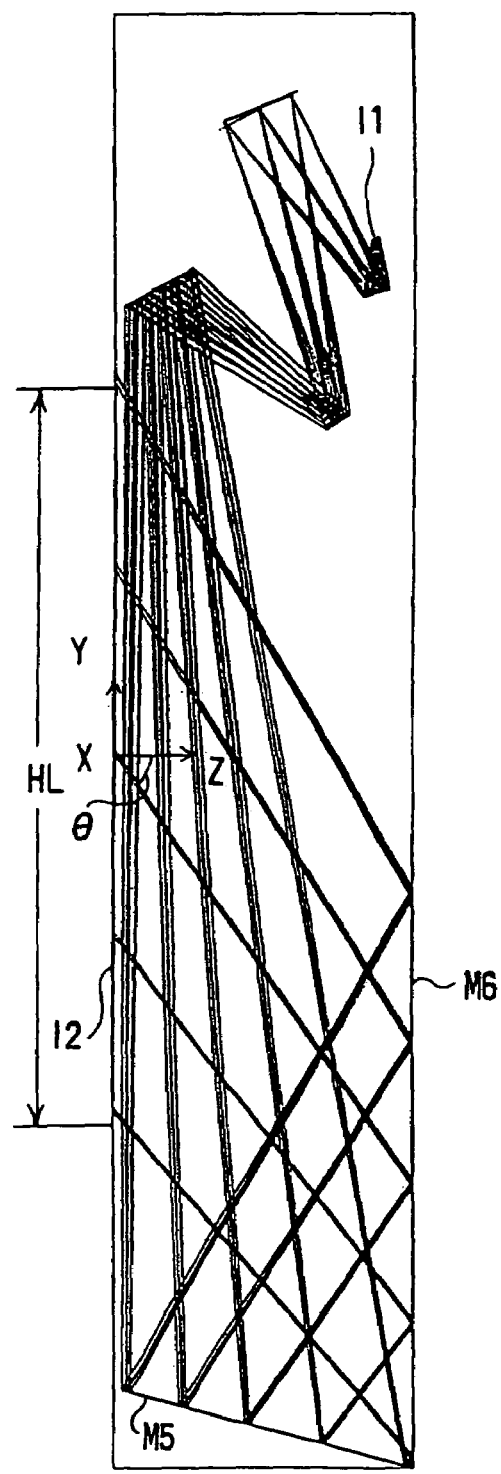
FIG. 48 is an optical path diagram of the rear projection optical system of a tenth embodiment of the invention.
Figure 49:
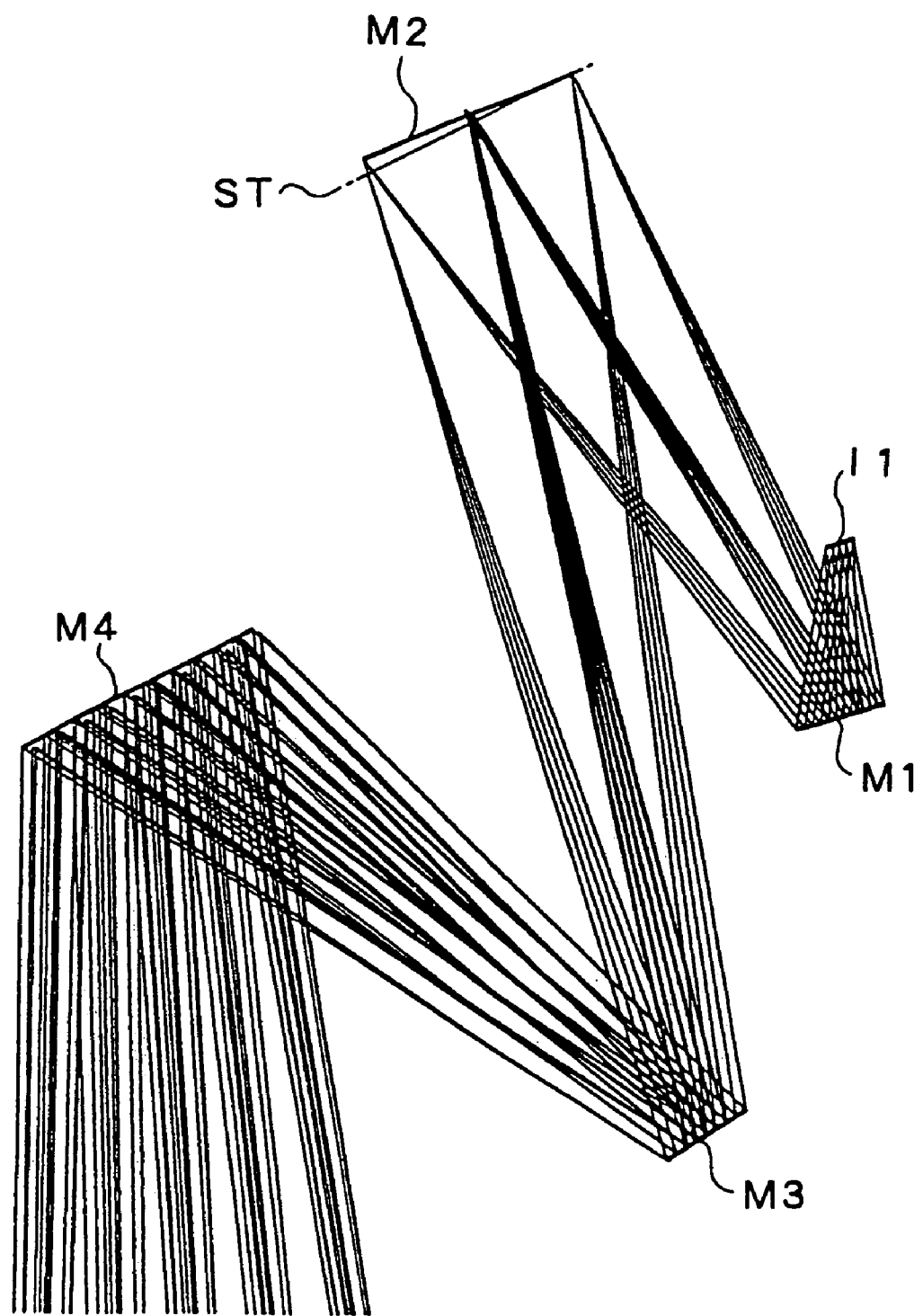
FIG. 49 is a diagram showing the projection optical system constituting the tenth embodiment and a principal portion of the optical path thereof.

Next, the rear projection optical systems of an eighth to a tenth embodiment of the invention will be described. FIGS. 40, 44, and 48 show the entire projection path from a panel display surface I1 to a screen surface I2 in the eighth, ninth, and tenth embodiments, respectively. FIGS. 41, 45, and 49 show, in enlarged views, the projection optical system constituting the eighth, ninth, and tenth embodiments, respectively, and a principal portion of the optical path thereof. These optical path diagrams show optical sections taken along the Y-Z plane of the Cartesian coordinate system (X, Y, and Z) described later. It is to be understood that the rear projection optical systems of these embodiments do not necessarily have to be designed precisely as shown in their respective optical path diagrams, but may be designed upside down; that is, turning their construction upside down to suit actual arrangement does not affect their function in any way.

The eighth to tenth embodiments deal with rear projection optical systems for use in rear-projection-type image projection apparatus (rear projectors). These rear projection optical systems are provided with a projection optical system for projecting a magnified image of a two-dimensional image displayed on a panel display surface I1 (the image display surface of a display panel located on the reduction side) onto a screen surface I2. The display panel is realized with a display device such as a reflective liquid crystal panel, transmissive liquid crystal panel, or DMD (digital micromirror device). The panel display surface I1 is illuminated with illumination light emitted from a lamp (not shown) and passing through an illumination optical system (not shown). As the panel display surface I1 is illuminated, projection light emanates therefrom, which is then led to the screen surface I2 by the projection optical system and other components described later. Projection of a color image is achieved by adopting a three-panel construction in which three display panels are arranged and color integration is achieved by the use of a cross dichroic prism or the like, a single-panel construction in which an image is displayed on a time division basis, or a single-panel construction in which a microlens array is arranged on a display panel.

The rear projection optical systems of the eighth to tenth embodiments include, from the panel display surface I1 side, a projection optical system composed of a first to a fourth mirror M1 to M4 and an optical path turning mirror composed of a fifth and a sixth mirror M5 and M6. In all these embodiments, the mirrors constituting the projection optical system are all curved-surface reflecting mirrors, of which reflecting surfaces are all free-form curved surfaces. Moreover, in all these embodiments, the two mirrors constituting the optical path turning mirror are both flat-surface reflecting mirrors. The projection light emanating from the panel display surface I1 is reflected by the four curved-surface reflecting mirrors constituting the projection optical system, then has its optical path turned twice by the two flat-surface reflecting mirrors, and then reaches the screen surface I2. The symbol ST represents an aperture stop position ST, which corresponds to a virtual aperture stop plane.

In all these embodiments, projection of a color image is achieved, as described above, by arranging a color integrating prism, such as a cross dichroic prism, near the screen surface I2. For example, illumination light is separated into R, G, and B light by an illumination optical system so as to be separately shone on three display panels and then integrated back together by a cross dichroic prism. The cross dichroic prism may be used for both color separation and color integration. When the display panel is of a reflective type, incident and reflected rays may be separated by the use of a beam separating prism, such as a polarization beam splitter (PBS) or TIR (total internal reflection) prism. A condenser lens may be arranged near the panel display surface I1 to make the rear projection optical system telecentric toward the panel display surface I1.

In a case where a display panel, such as a liquid crystal panel, that exhibits different characteristics depending on the angle of incidence thereon is used, it is preferable to make the projection optical system telecentric toward the panel display surface I1. However, to obtain higher optical performance, it is better to make it less telecentric. Thus, in a non-telecentric optical system, a condenser lens may be arranged in front of the panel display surface I1 to make the optical system telecentric with respect to the panel display surface I1. In a case where a reflective display panel is used and beam splitting needs to be achieved without the use of a PBS, to permit incident and reflected rays to be separated on the basis of the difference between their angles, the incident rays need to be inclined relative to the panel display surface I1 at an angle larger than the angle determined by the f-number in the direction in which the optical path is turned. In this case, it is preferable to adopt a so-called oblique telecentric construction (in which rays are incident obliquely on the panel display surface I1, at almost uniform angles of incidence over the entire area thereof). In an oblique telecentric construction, the aforementioned angle characteristics of liquid crystal do not matter. An oblique telecentric construction may be realized by arranging a condenser lens (decentered as required) in front of the panel display surface I1.

An oblique projection optical system can be of one of the following six types:
(i) a transmissive optical system employing part of a centered optical system;
(ii) a non-axis-symmetric transmissive optical system employing a relay;
(iii) a non-axis-symmetric transmissive optical system employing no relay;
(iv) a reflective optical system employing part of a centered optical system;
(v) a non-axis-symmetric reflective optical system; and
(vi) a non-axis-symmetric optical system partly reflective and partly transmissive.

With the type (i), to obtain a large oblique projection angle as in the eighth to tenth embodiments, the original centered optical system needs to have a very wide angle of view. In general, attempting to obtain satisfactory optical performance with a wide-angle lens results in using many lenses and thus in high cost. With the type (ii), i.e. a non-axis-symmetric optical system that employs a relay to eliminate trapezoid distortion, it is necessary to form an intermediary image. This makes the projection optical system very large. With the types (iii) and (vi), oblique projection is achieved by the use of, for example, free-form curved surfaces or the like. However, since transmissive optical components cause dispersion and thus chromatic aberration, it is necessary to use additional optical components to correct it. Thus, even more components need to be used than with the reflective types (iv) and (v). With the type (iv), no chromatic aberration appears, but, as with the type (i), the centered optical system requires a very large number of lenses.

With the type (v), the reflective optical system does not cause chromatic aberration. Moreover, by using free-form curved surfaces that are decentered relative to each other, it is possible to obtain satisfactory optical performance and distortion-free images, which cannot be achieved with a centered optical system. To achieve this, as in the eighth to tenth embodiments, it is preferable that the projection optical system have at least three curved-surface reflecting mirrors, and, for maximum compactness, it is further preferable that the projection optical system form no intermediary image in the optical path from the panel display surface I1 to the screen surface I2. In general, in a reflective optical system, it is necessary to use at least one positive and one negative reflecting mirror to correct for the Petzval sum, and it is necessary to use another free-form curved-surface mirror to correct for distortion; that is, using at least three reflecting mirrors in total makes it possible to realize a projection optical system that offers satisfactory optical performance and that produces almost distortion-free images.

When the projection optical system is composed of three reflecting mirrors, i.e. the least required as described above, it may be possible to obtain satisfactory optical performance, but the projection optical system is then extremely sensitive to errors inevitable in the assembly process when it is manufactured. That is, its optical performance deteriorates greatly by going through the assembly process. To avoid this, it is preferable that, as in the eighth to tenth embodiments, the projection optical system have at least four curved-surface reflecting mirrors. Using at least four curved-surface reflecting mirrors helps alleviate the responsibility of each reflecting surface for the correction of aberrations, and helps disperse the sensitivity to assembly errors. Thus, as compared with a projection optical system composed of the least required number of reflecting mirrors, it is possible to reduce assembly errors By giving at least three of the curved-surface reflecting mirrors a free-form curved surface, it is possible to obtain better optical performance. Therefore, in a reflective optical system, like those of the eighth to tenth embodiments, that has four or more curved-surface reflecting mirrors, it is preferable that at least three of those curved-surface reflecting mirrors have a free-form curved surface. Here, a free-form curved surface denotes a surface that includes a greatly decentered aspherical surface and that does not have an axis of rotation symmetry near the center of its effective area, that is, a surface that is not spherical but has aspherical undulations (freedom). The aspherical undulations of a free-form curved surface can be exploited to control the curvature of a reflecting surface three-dimensionally. This permits non-axis-symmetric aberrations (distortions and the like) resulting from oblique projection to be corrected for easily with surface inclinations that are so set as to vary from point to point on the reflecting surface.

It is further preferable that the free-form curved surfaces used as the reflecting surfaces of the curved-surface reflecting mirrors have no axis of rotation symmetry but one plane of symmetry. In the eighth to tenth embodiments, the Y-Z plane (the plane parallel to the plane of their respective optical path diagrams) is the plane of symmetry of each free-form curved surface. That is, the reflecting surface of each curved-surface reflecting mirror is a free-form curved surface that is symmetric about that plane of symmetry. Free-form curved surfaces like these that are symmetric about a plane are easier to produce and evaluate than those which are not symmetric about a plane.

Moreover, in the eighth to tenth embodiments, the rear projection optical system as a whole is symmetric about the plane (i.e. the Y-Z plane) that runs vertically through the center of the screen. This makes the production of optical components easy, and helps alleviate uneven brightness and uneven distortion between the right and left parts of the screen. However, where compactness matters as in a rear projection television set, the rear projection optical system as a whole can be made smaller by turning the optical path in the width direction (i.e. the X direction). For example, by arranging, between the curved-surface reflecting mirror that serves as the last surface of the projection optical system and the flat-surface reflecting mirror that is the first to reflect the light exiting from the projection optical system, a flat-surface reflecting mirror that turns the optical path in the width direction (the X direction), it is possible to reduce the protrusion in an upper or lower portion of the rear projection television set (i.e. where the display panel and the projection optical system are arranged). Here, the optical path is turned with a flat-surface reflecting mirror, and therefore optical symmetry is not affected.

In the eighth to tenth embodiments, the optical path is turned only in the direction perpendicular to the direction of the longer sides (i.e. the X direction) of the screen surface I2, that is, in the direction parallel to the Y-Z plane. In optical arrangements, like those of these embodiments, where the optical path is turned with a plurality of reflecting mirrors, the optical path needs to be turned so that rays do not overlap. However, from the viewpoint of optical performance, it is not preferable to secure a large margin for the turning of the optical path, because this increases the degree of non-axis symmetry. It is possible to obtain satisfactory optical performance by reducing the cross sectional area of the beam in the direction in which the optical path is turned. The cross sectional area of the beam in the direction in which the optical path is turned is reduced, preferably, by making the aperture stop ST elliptic. That is, the diameter of the aperture stop in the direction in which the optical path is turned (i.e. in the direction parallel to the Y-Z plane) is reduced, and the diameter of the aperture stop in the direction perpendicular thereto (i.e. in the X direction) is increased. Using an elliptic aperture stop like this makes it possible to realize a rear projection optical system that offers satisfactory optical performance (i.e. in which the turning of the optical path causes little non-axis symmetry) without changing the total area (and thus the brightness) of the aperture stop.

Assume that the ray traveling from the center of the panel display surface I1 through the center of the aperture stop ST to the center of the screen surface I2 is called the "screen center ray." Then, it is preferable that conditional formulae (1) and (2) below be fulfilled. In a rear projection optical system, like those of the eighth to tenth embodiments, that includes a projection optical system having at least four curved-surface reflecting mirrors, designing the optical system to fulfill conditional formulae (1) and (2) makes it possible to realize a rear projection optical system that offers satisfactory optical performance with little distortion but is nevertheless advantageous in terms of mass production and cost and that is slim and is composed of compact optical components such as reflecting mirrors.

$$0.5 < DL/HL < 3.5 \tag{1}$$

$$10° < \theta < 70° \tag{2}$$

where

DL represents the optical distance traveled by the screen center ray from the last surface of the projection optical system to the screen surface I2;

HL represents the dimension of the screen surface I2 in the direction parallel to the plane (corresponding to the Y-Z plane in the optical path diagrams) formed at the center of the screen surface I2 by a normal to the screen surface I2 and the screen center ray (that is, this dimension corresponds to the length of the shorter sides of the screen surface I2 in the eighth to tenth embodiments); and θ represents the angle of incidence at which the screen center ray is incident on the screen surface I2.

Conditional formula (1) defines the preferable angle of view as the ratio of the object distance (i.e. the projection distance) DL to the size of the screen surface I2. If the lower limit of conditional formula (1) is transgressed, a wide angle of view is required, and therefore it is difficult to obtain satisfactory optical performance. To obtain satisfactory optical performance, it is necessary to make the projection optical system as a whole longer and use larger reflecting mirrors, or to increase the number of reflective optical components used. However, either remedy leads to higher cost and is thus undesirable. Moreover, in optical arrangements, like those of the eighth to tenth embodiments, that employ two flat-surface reflecting mirrors, it is essential to secure a certain object distance DL to the screen surface I2 to permit the optical path to be turned in a compact form. If conditional formula (1) is fulfilled, the optical path can be turned with the flat-surface reflecting mirror arranged on the screen surface I2 side of the projection optical system. This helps make the optical system as a whole, including the screen surface I2, slim and compact without unduly increasing cost. It is preferable to fulfill conditional formula (1) with its lower limit raised to 2.5. This makes it possible to realize a slim projection optical system that offers better optical performance and that employs inexpensive optical components.

If the upper limit of conditional formula (1) is transgressed, the angle of view is narrow. This is advantageous from the viewpoint of optical performance, but makes the object distance DL to the screen surface I2 unnecessarily long, making the rear projection optical system as a whole large. It is preferable to fulfill conditional formula (1) with its upper limit lowered to 3.2. This makes it possible to realize a more compact rear projection optical system.

Conditional formula (2) defines the preferable oblique projection angle. If the upper limit of conditional formula (2) is transgressed, the oblique projection angle is very large. A large oblique projection angle makes it difficult to obtain satisfactory optical performance. It is preferable to fulfill conditional formula (2) with its upper limit lowered to 63. This makes it possible to obtain better optical performance.

If the lower limit of conditional formula (2) is transgressed, it is easy to obtain satisfactory optical performance. However, rays are then incident on the screen surface I2 from a direction close to perpendicular thereto. This makes it difficult to achieve slimming-down through oblique projection. It is preferable to fulfill conditional formula (2) with its lower limit raised to 30. This makes it possible to realize a slimmer rear projection optical system. It is further preferable to fulfill conditional formula (2) with its lower limit raised to 40. This makes it possible to achieve further slimming-down. It is even further preferable to fulfill conditional formula (2) with its lower limit raised to 45. This makes it possible to achieve even further slimming-down.

Figure 52:
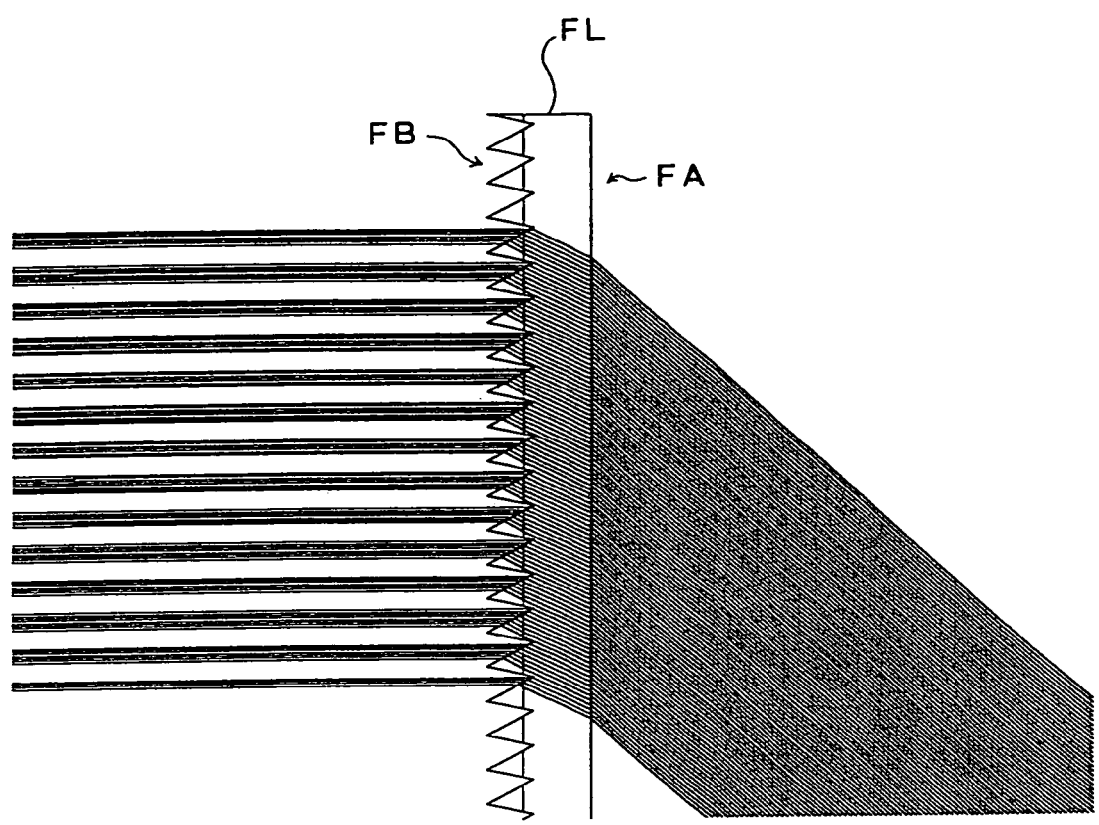
FIG. 52 is a diagram showing the structure of a principal portion of a screen suitable for use in the eighth to tenth embodiments and the optical path therethrough.

Where, as in the eighth to tenth embodiments, an oblique projection optical system is used, it is preferable to use a screen suitable for the particular rear projection optical system used to realize it. Typically, with a rear projection television set or the like is used a screen having a Fresnel lens, a lenticular plate, and a black matrix arranged in this order from the incident side. In oblique projection, a ray is incident at an angle on the center of the screen surface I2, and therefore, as shown in FIG. 52, it is preferable either to use a decentered Fresnel lens FL having a flat-surface portion FA on its side on which the projection light is incident (in the figure, the elements other than the Fresnel lens FL are omitted), or to use a screen composed of a total reflection prism array and an ordinary Fresnel lens combined together. If, contrary to the arrangement shown in FIG. 52, a Fresnel portion (FB) is located on the side on which the projection light is incident, vignetting occurs.

With the arrangement shown in FIG. 52, rays appear discontinuous at intervals equal to the pitch of the Fresnel lens. To alleviate this effect, it is preferable to make the pitch of the Fresnel lens sufficiently finer than the size of the pixels displayed on the screen surface I2. Specifically, it is preferable that the following condition be fulfilled: [the pitch of the Fresnel lens]/[the size of the pixels on the screen]<0.5. It is further preferable that the following condition be fulfilled: [the pitch of the Fresnel lens]/[the size of the pixels on the screen]<0.3. In the eighth to tenth embodiments, the problem described above can be overcome by using, for example, a screen with a pixel size of about 1 mm and a Fresnel lens pitch of about 0.2 mm.

Next, the relationship between the material of the mirrors and the temperature characteristics of the rear projection optical system. Usually, a projector has a heat generating member in the form of a light source, and the individual optical components not only transmit or reflect light but also absorb a slight amount of light. Therefore, after the lamp is turned on, the temperature of those optical components rises. Moreover, the ambient temperature is never constant. Thus, it is desired that a rear projection optical system offer satisfactory optical performance stably against variations in temperature. Moreover, it is generally known that the sensitivity to errors of reflective optical components such as reflecting mirrors is more than twice as high as that of ordinary transmissive optical components. Therefore, in the eighth to tenth embodiments, it is preferable that the curved-surface reflecting mirrors have their substrate made of glass, which exhibits relatively small variations in properties against variations in temperature. It is preferable that the substrate is coated with a reflective coating such as an enhanced reflective coating formed by vapor-depositing aluminum or silver, or a reflective coating formed of dielectric multilayer film. However, aluminum and silver absorb a slight amount of light and thus pose a risk of generating heat. Thus, from the viewpoint of minimizing heat generation, it is preferable to use a reflective coating formed of dielectric multilayer film.

The curved-surface reflecting mirror closest to the screen surface I2 has a relatively weak optical power and thus has low sensitivity to errors. Therefore, this curved-surface reflecting mirror may have its substrate made of plastic, such as PMMA (polymethyl methacrylate, PC (polycarbonate), or polyolefin resin. That is, a reflecting mirror of which the substrate is made of plastic and coated with an enhanced reflective coating formed by vapor-depositing aluminum or silver may be used as the curved-surface reflecting mirror closest to the screen surface I2, because this has little effect on the optical performance obtained. Moreover, using a plastic substrate instead of a glass substrate helps reduce cost. Considering the relationship described above between the material of the mirrors and the temperature characteristics of the rear projection optical system, it is preferable that at least the first and second curved-surface reflecting mirrors as counted from the panel display surface I1 side have their substrate made of glass.

Next, how focusing and zooming are achieved in the rear projection optical system will be described. It is preferable to achieve focusing by moving the display panel along the screen center ray, or by moving the first or second mirror M1 or M2 along it. It is preferable to achieve zooming by moving at least two curved-surface reflecting mirrors. It is to be noted that, in a rear projection television set, the screen surface I2 is kept in a fixed position, and therefore, to adapt the display area to the screen surface I2, it is necessary to adjust the display area within a margin of a few percent by zooming.

EXAMPLES 8 TO 10

Practical examples (Examples 8 to 10) of the eighth to tenth embodiments will be presented in detail below with reference to their construction data, spot diagrams, and other data. Examples 8 to 10 presented below correspond to the eighth to tenth embodiments, respectively, and therefore the figures showing those embodiments also show the construction and optical path of Examples 8 to 10.

Tables 59 to 64, 65 to 70, and 71 to 76 show the construction data of Examples 8 to 10, respectively. Of these tables, Tables 59, 65, and 71 show the size (mm) of the panel display surface I1, the size (mm) of the screen surface I2, and the f-numbers (FNO) in the directions of the longer and shorter sides of the screen (the X and Y directions, respectively). Tables 60, 66, and 72 show the data of the individual surfaces of the respective rear projection optical systems, in order from the reduction side. Tables 61, 67, and 73 show the free-form curved surface data representing the shape of the curved surface of the first mirror (M1). Tables 62, 68, and 74 show the free-form curved surface data representing the shape of the curved surface of the second mirror (M2). Tables 63, 69, and 75 show the free-form curved surface data representing the shape of the curved surface of the third mirror (M3). Tables 64, 70, and 76 show the free-form curved surface data representing the shape of the curved surface of the fourth mirror (M4). The data of each surface is given in coordinates (X, Y, and Z) in a right-handed Cartesian coordinate system. Specifically, the position (X, Y, and Z coordinates) of a surfaces is given as the coordinates (mm) of its vertex in the coordinate of which the origin (0, 0, 0) is located at the center of the screen surface I2, and the inclination (X, Y, and Z rotation) of the surface is given as the rotation angles (°) about the X, Y, and Z axes with respect to its vertex. In the optical path diagrams, the X axis runs vertically to the plane of the diagrams (the direction pointing from the front to back side of the plane of the diagrams as seen from the viewer is the positive direction, and the counter-clockwise rotation on the plane of the diagrams as seen from the viewer is the positive X rotation). The Y axis runs along the intersection line between the screen surface I2 and the plane of the diagrams (the upward direction in the diagrams is the positive direction), and the Z axis runs along the normal to the screen surface I2 (the rightward direction in the diagrams is the positive direction).

The reflecting surface of each curved-surface reflecting mirror is a free-form curved surface, of which the surface shape is defined by formula (FS) below using coordinates (x, y, and z) in the Cartesian coordinate system having its origin at the vertex of the surface. Table 77 lists the values of the conditional formulae and the related data as observed in each example.

$$z = (c \cdot h^2)/[1 + \sqrt{1 - (1+K) \cdot c^2 \cdot h^2}] + \sum_m \sum_n [C(m,n) \cdot x^m \cdot y^n] \quad \text{(FS)}$$

where z represents the displacement from the reference surface along the optical axis at the height of h;

h represents the height in the direction perpendicular to the optical axis ($h^2 = x^2 + y^2$)

c represents the paraxial curvature (=the reciprocal of the radius of curvature);

K represents the conic constant. and

C(m, n) represents the free-form surface coefficients (those which equal zero are omitted).

Figure 42:
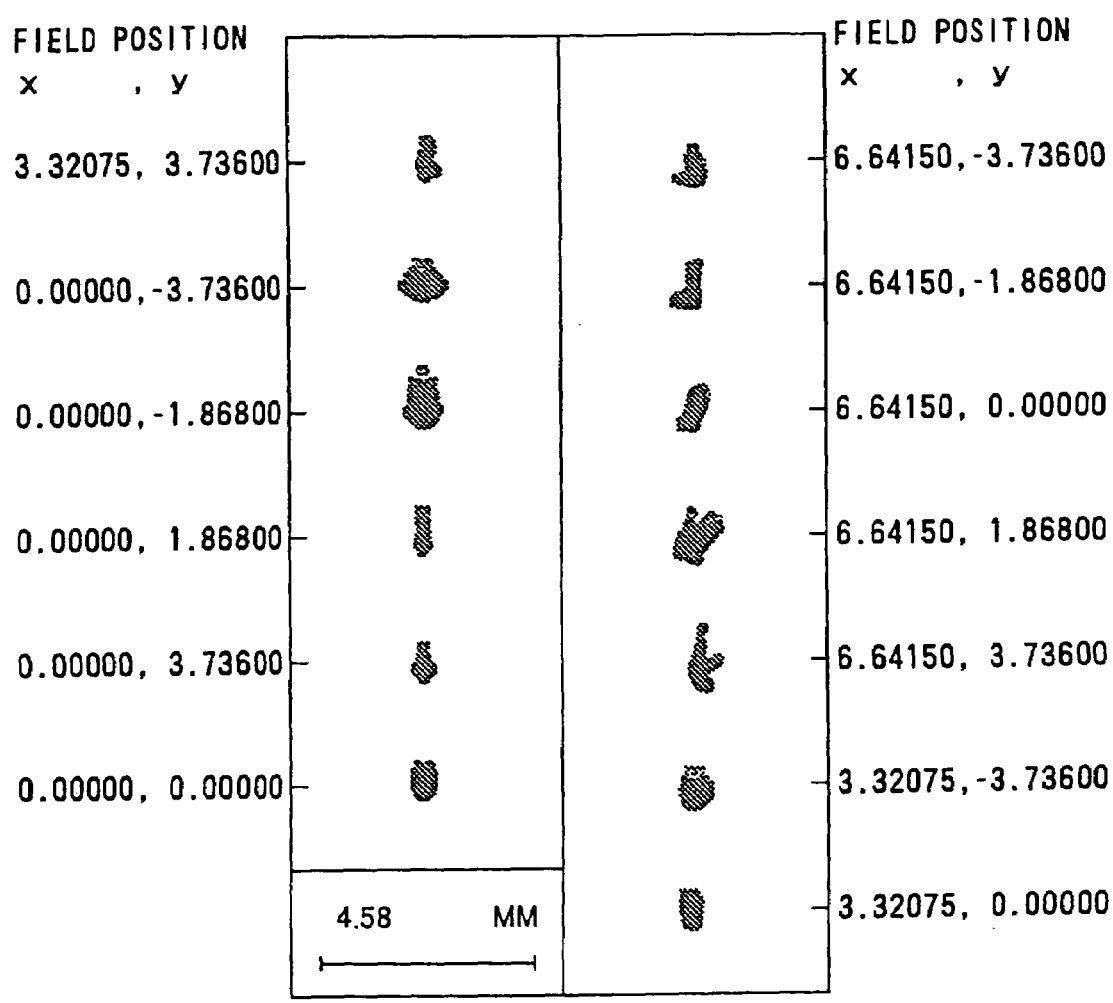
FIG. 42 is a spot diagram of the eighth embodiment.
Figure 43:
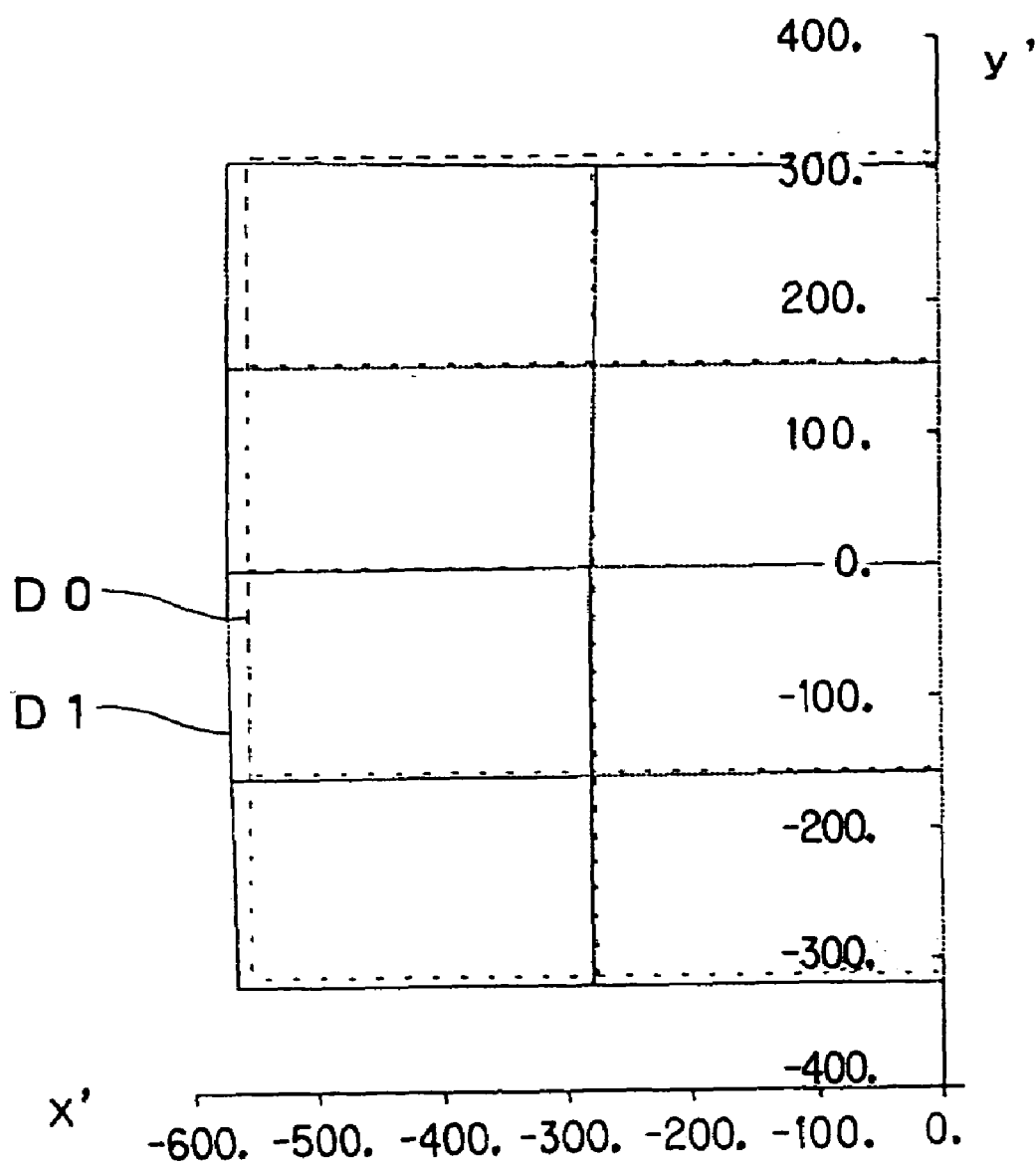
FIG. 43 is a distortion diagram of the eighth embodiment.
Figure 46:
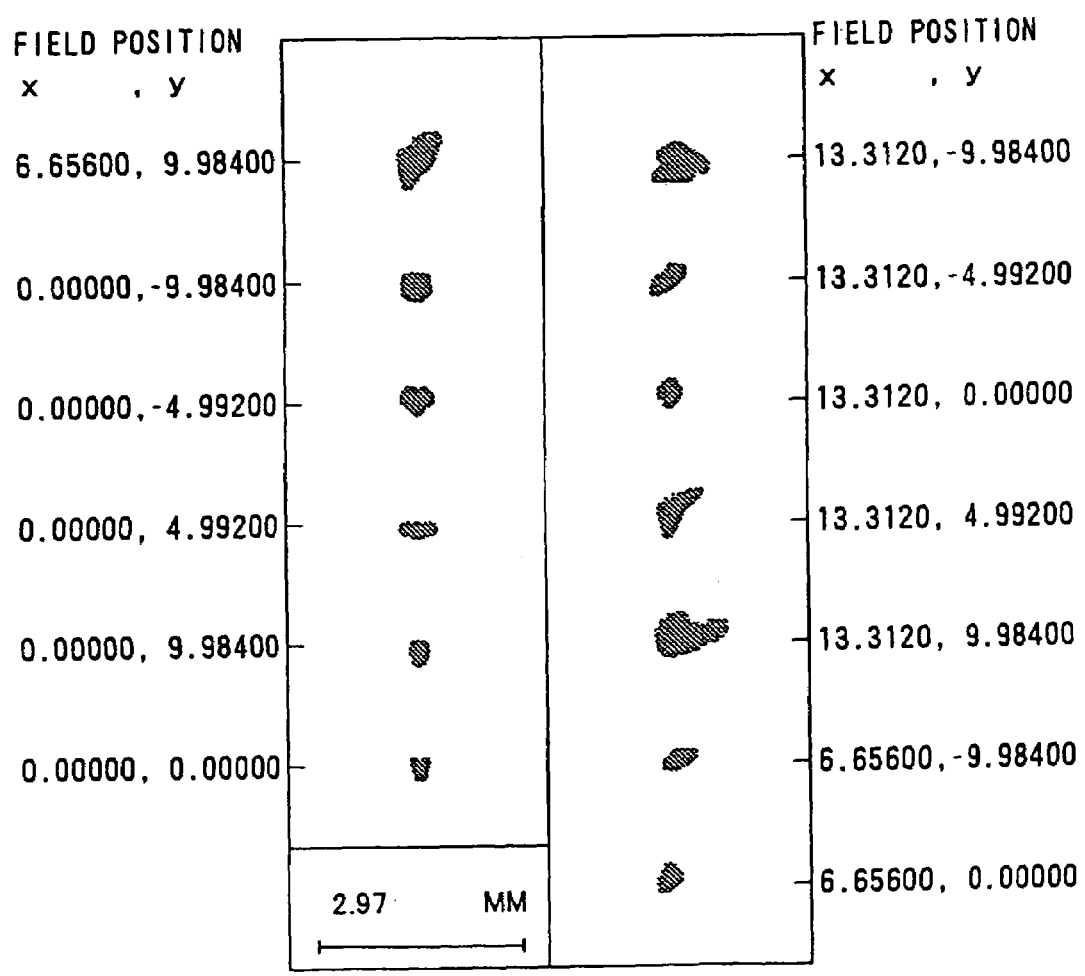
FIG. 46 is a spot diagram of the ninth embodiment.
Figure 47:
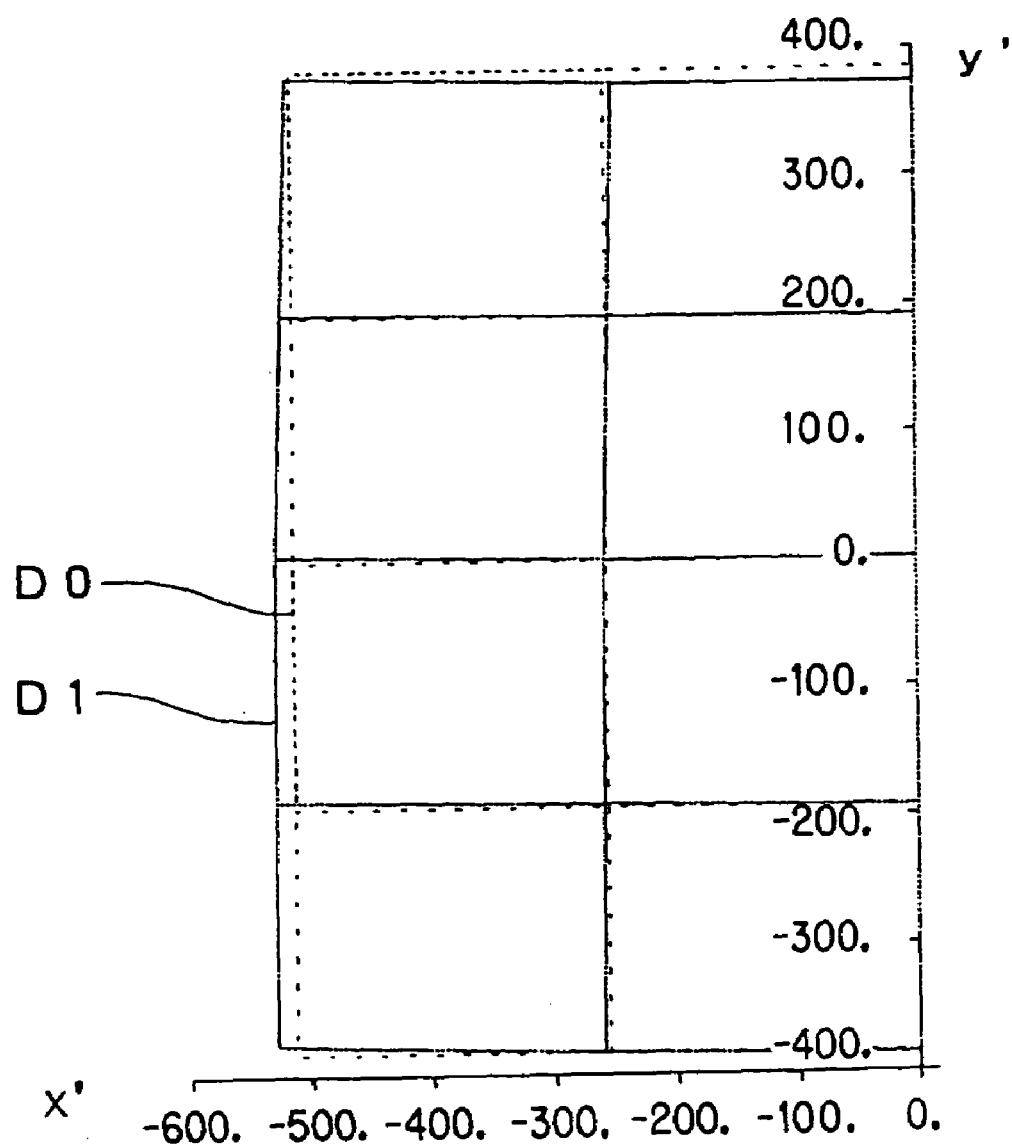
FIG. 47 is a distortion diagram of the ninth embodiment.
Figure 50:
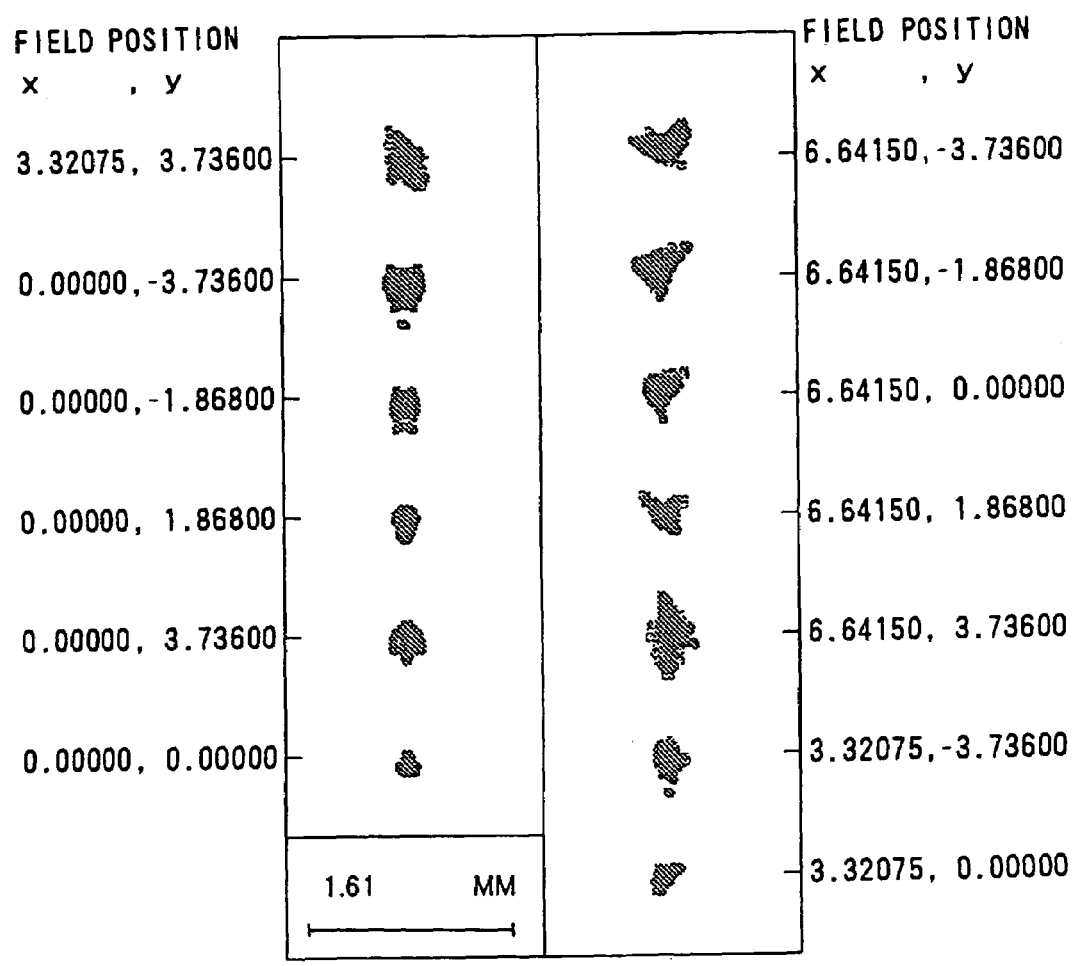
FIG. 50 is a spot diagram of the tenth embodiment.
Figure 51:
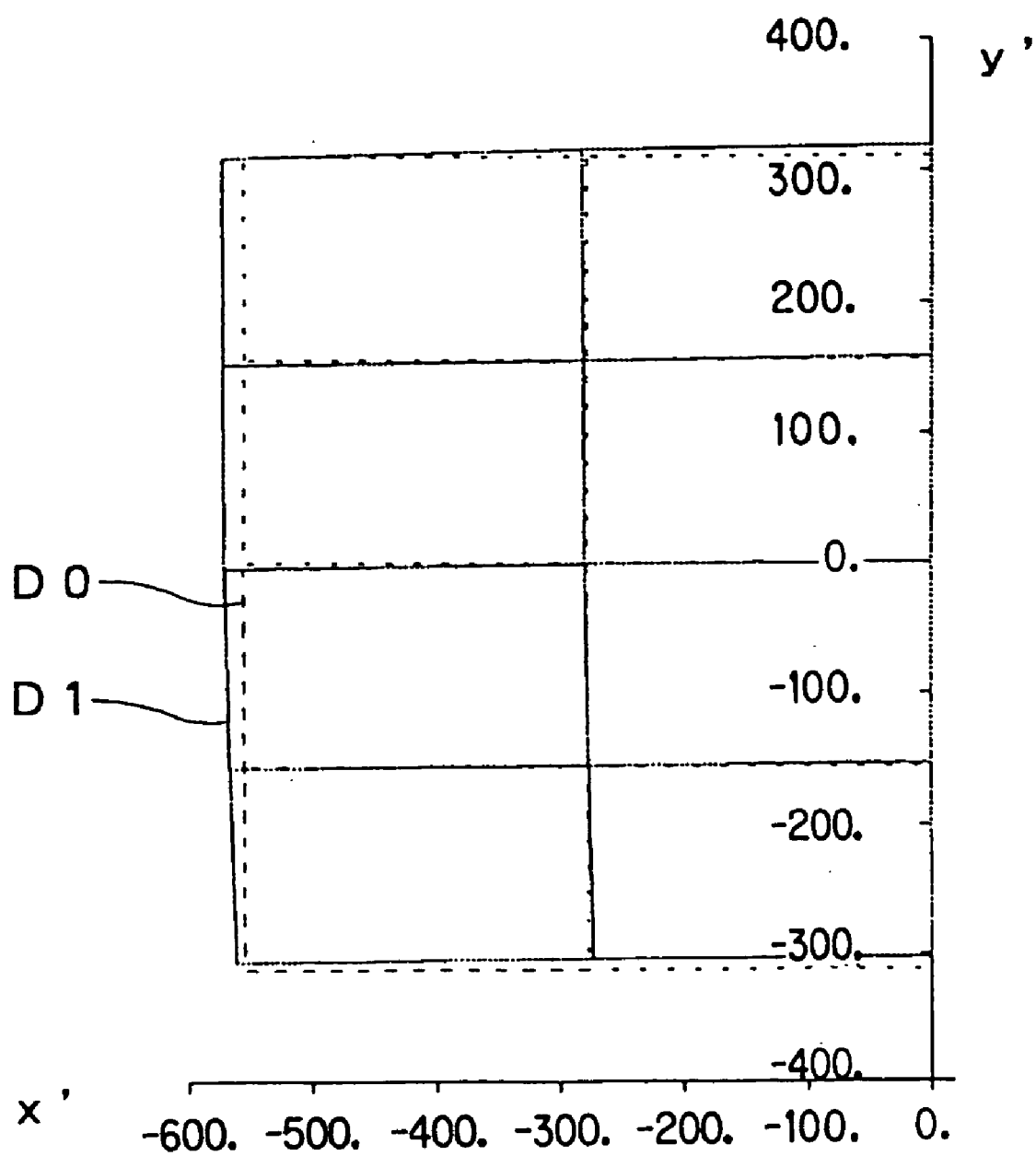
FIG. 51 is a distortion diagram of the tenth embodiment.

The optical performance of Examples 8 to 10 is shown in spot diagrams in FIGS. 42, 46, and 50 and distortion diagrams in FIGS. 43, 47, and 51, respectively. The spot diagrams show the imaging characteristics (mm) observed on the screen surface I2 for light having a wavelength of 550 (nm), and the distortion diagrams show the positions (mm), observed on the screen surface I2, of the rays corresponding to a rectangular grid pattern displayed on the panel display surface I1. In the distortion diagrams, D1 (solid lines) indicates the distortion grid of each example, and D0 (broken lines) indicates the grid of ideal image points (without distortion) calculated in consideration of the anamorphic ratio. The object height (mm) corresponding to each field position is given in coordinates (x, y) in the coordinate system of which the origin is located at the center of the panel display surface I1, of which the x axis runs in the same direction as the X axis, and of which the y axis runs perpendicularly to the x axis and parallel to the panel display surface I1. On the other hand, the image height (mm) corresponding to each field position is given in coordinates (x', y') in the coordinate system of which the origin is located at the center of the screen surface I2, of which the x' axis runs in the same direction as the X axis, and of which the y' axis runs perpendicularly to the x' axis and parallel to the screen surface I2. Thus, the distortion diagrams show the distortion (though only in the x' negative direction) of the image actually projected on the screen surface I2 as observed from the direction perpendicular to the x'-y' plane.

TABLE 1

Examples 1 to 7 Overall (1)

| | Magnification β | Magnification β | Anamo | Size (Half) | | | | Angle of Incidence on Projection Surface | | | Angle of View | Entrance Pupil | |
|---|---|---|---|---|---|---|---|---|---|---|---|---|---|
| | | | | Display Surface S0 | | Projection Surface S6 | | Center Bottom | Diagonal | | | | |
| Example | (Y) | (Z) | (Y/Z) | Height | Width | Height | Width | (Minimum) | (Maximum) | Center | of View | X | Y |
| 1 | 78.57 | −78.56 | −0.02% | 4.36 | 7.75 | 342.4 | 608.8 | 24.0 | 67.3 | 52.1 | 43.3 | ∞ | −9.9° |
| 2 | 71.41 | −71.39 | −0.02% | 4.36 | 7.75 | 311.3 | 553.5 | 24.7 | 65.8 | 50.9 | 41.1 | ∞ | 0.0° |
| 3 | 71.40 | −71.39 | −0.02% | 4.36 | 7.75 | 311.3 | 553.5 | 24.3 | 65.7 | 50.7 | 41.4 | ∞ | −11.3° |
| 4 | 51.23 | −51.27 | 0.08% | 4.86 | 8.63 | 249.1 | 442.8 | 35.9 | 71.4 | 61.3 | 35.5 | 40 | −8 |
| 5 | 51.25 | −51.27 | 0.03% | 4.86 | 8.63 | 249.1 | 442.8 | 34.8 | 69.7 | 59.8 | 34.9 | 80 | −20 |
| 6 | 70.45 | −70.50 | 0.08% | 4.86 | 8.63 | 342.4 | 608.8 | 40.2 | 73.2 | 64.3 | 33.0 | 1400 | −250 |
| 7 | 51.24 | −51.27 | 0.06% | 4.86 | 8.63 | 249.1 | 442.8 | 36.8 | 69.1 | 58.6 | 32.2 | ∞ | 0.0° |

TABLE 2

Examples 1 to 7 Overall (2)

| Example | Fnoy | Fnoz | Optical Path Thickness D | Projection Surface Height H | D/H | Reflecting Surface S1 | Reflecting Surface S2 | Reflecting Surface S3 | Reflecting Surface S4 |
|---|---|---|---|---|---|---|---|---|---|
| 1 | 3.5 | 3.4 | 202.4 | 684.9 | 0.30 | sp(+) | asp(−) | exasp(+) | exasp(−) |
| 1-b | 3.5 | 3.4 | 227.4 | 684.9 | 0.33 | sp(+) | asp(−) | exasp(+) | exasp(−) |
| 1-c | 3.5 | 3.4 | 402.4 | 684.9 | 0.59 | sp(+) | asp(−) | exasp(+) | exasp(−) |
| 2 | 2.5 | 2.5 | 200.0 | 622.6 | 0.32 | asp(+) | asp(−) | exasp(+) | exasp(−) |
| 3 | 2.6 | 2.5 | 200.0 | 622.6 | 0.32 | asp(+) | asp(−) | exasp(+) | exasp(−) |
| 4 | 3.6 | 3.5 | 131.3 | 498.1 | 0.26 | exasp(+) | exasp(−) | exasp(+) | exasp(−) |
| 5 | 3.7 | 3.5 | 120.0 | 498.1 | 0.24 | exasp(+) | exasp(−) | exasp(+) | exasp(−) |
| 6 | 3.4 | 3.3 | 145.0 | 684.9 | 0.21 | exasp(+) | exasp(−) | exasp(+) | exasp(−) |
| 7 | 2.5 | 2.5 | 152.3 | 498.1 | 0.31 | exasp(+) | exasp(−) | exasp(+) | exasp(−) |

TABLE 3

Example 1 Display Surface S0 N0 = N1 = 1

| | | Local Coordinates | | |
|---|---|---|---|---|
| | | x | y | z |
| Position | | 0.0000 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| C0 | 0.000000 | | | |

TABLE 4

Example 1 Reflecting Surface S1 N0 = N1 = 1

| | | Local Coordinates | | |
|---|---|---|---|---|
| | | x | y | z |
| Position | | 85.2186 | 0.4793 | 0.0000 |
| Vector | VX | 0.9965 | 0.0838 | 0.0000 |
| | VY | −0.0838 | 0.9965 | 0.0000 |

TABLE 4-continued

Example 1 Reflecting Surface S1 N0 = N1 = 1

| | | Local Coordinates | | |
|---|---|---|---|---|
| | | x | y | z |
| | VZ | 0.0000 | 0.0000 | 1.0000 |
| C0 | −0.008558 | | | |

TABLE 5

Example 1 Pupil Plane APR N0 = N1 = 1

| | | Local Coordinates | | |
|---|---|---|---|---|
| | | x | y | z |
| Position | | 28.0000 | −19.5000 | 0.0000 |
| Vector | VX | −1.0000 | 0.0000 | 0.0000 |
| | VY | 0.0000 | 1.0000 | 0.0000 |
| | VZ | 0.0000 | 0.0000 | −1.0000 |
| C0 | 0.000000 | | | |
| R | 8.900000 | | | |

TABLE 6

Example 1 Reflecting Surface S2 N0 = N1 = 1

| | | Local Coordinates | | |
|---|---|---|---|---|
| | | x | y | z |
| Position | | −30.7050 | −9.7728 | 0.0000 |
| Vector | VX | −0.9996 | 0.0271 | 0.0000 |
| | VY | 0.0271 | 0.9996 | 0.0000 |
| | VZ | 0.0000 | 0.0000 | −1.0000 |
| C0 | 0.007362 | | | |

| ε | A4 | A6 | A8 | A10 | A12 |
|---|---|---|---|---|---|
| 1.0 | $6.16741 \times 10^{-7}$ | $5.21815 \times 10^{-10}$ | $-1.02686 \times 10^{-12}$ | $2.00142 \times 10^{-15}$ | $-1.17276 \times 10^{-18}$ |

TABLE 7

Example 1 Reflecting Surface S3 N0 = N1 = 1

| | | Local Coordinates | | |
|---|---|---|---|---|
| | | x | y | z |
| Position | | 84.4174 | 3.7185 | 0.0000 |
| Vector | VX | 0.9957 | 0.0926 | 0.0000 |
| | VY | −0.0926 | 0.9957 | 0.0000 |
| | VZ | 0.0000 | 0.0000 | 1.0000 |
| C0 | 0.007444 | | | |

| ε | A4 | A6 | A8 | A10 | A12 |
|---|---|---|---|---|---|
| 1.0 | $7.06885 \times 10^{-8}$ | $-2.37725 \times 10^{-11}$ | $-3.26077 \times 10^{-15}$ | $1.19913 \times 10^{-19}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-7.41333 \times 10^{-3}$ | $-4.06175 \times 10^{-5}$ | $-3.54978 \times 10^{-7}$ |
| k = 2 | $-5.07015 \times 10^{-3}$ | $-8.65237 \times 10^{-6}$ | $-8.90477 \times 10^{-7}$ | $-1.88595 \times 10^{-8}$ | $-2.85271 \times 10^{-10}$ |
| k = 4 | $1.57125 \times 10^{-7}$ | $-2.08221 \times 10^{-9}$ | $-6.76821 \times 10^{-10}$ | $-2.41217 \times 10^{-11}$ | $-3.12921 \times 10^{-13}$ |
| k = 6 | $-3.66527 \times 10^{-10}$ | $-2.29003 \times 10^{-11}$ | $-4.84278 \times 10^{-13}$ | $-4.74385 \times 10^{-15}$ | $-1.79513 \times 10^{-17}$ |
| k = 8 | $3.87171 \times 10^{-15}$ | $8.96657 \times 10^{-17}$ | $-2.99122 \times 10^{-19}$ | | |
| k = 10 | $4.72013 \times 10^{-19}$ | | | | |

| Bjk | j = 5 | j = 6 | j = 7 | j = 8 | j = 9 |
|---|---|---|---|---|---|
| k = 0 | $2.15348 \times 10^{-9}$ | $2.06937 \times 10^{-11}$ | $-1.11585 \times 10^{-12}$ | $-1.32674 \times 10^{-14}$ | $-1.00000 \times 10^{-16}$ |
| k = 2 | $-5.41109 \times 10^{-12}$ | $-4.87903 \times 10^{-14}$ | $-4.14794 \times 10^{-16}$ | $-1.81052 \times 10^{-18}$ | |
| k = 4 | $-2.11459 \times 10^{-15}$ | $-6.34071 \times 10^{-18}$ | | k = 0, j = 10 | $-3.57818 \times 10^{-19}$ |

TABLE 8

Example 1 Reflecting Surface S4 N0 = N1 = 1

| | | Local Coordinates | | |
|---|---|---|---|---|
| | | x | y | z |
| Position | | −74.6145 | 15.5740 | 0.0000 |
| Vector | VX | −0.9322 | 0.3619 | 0.0000 |
| | VY | 0.3619 | 0.9322 | 0.0000 |
| | VZ | 0.0000 | 0.0000 | −1.0000 |
| C0 | −0.005995 | | | |

| ε | A4 | A6 | A8 | A10 | A12 |
|---|---|---|---|---|---|
| 1.0 | $-1.69975 \times 10^{-6}$ | $2.14404 \times 10^{-10}$ | $-1.29314 \times 10^{-15}$ | $-1.08992 \times 10^{-19}$ | $3.57834 \times 10^{-24}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-4.35314 \times 10^{-2}$ | $-1.23693 \times 10^{-3}$ | $-9.02155 \times 10^{-6}$ |
| k = 2 | $6.98217 \times 10^{-3}$ | $-4.70094 \times 10^{-4}$ | $-7.53704 \times 10^{-6}$ | $-4.73627 \times 10^{-8}$ | $9.21703 \times 10^{-13}$ |
| k = 4 | $-2.22242 \times 10^{-6}$ | $-3.08825 \times 10^{-8}$ | $5.63301 \times 10^{-10}$ | $1.42978 \times 10^{-11}$ | $-8.61211 \times 10^{-14}$ |
| k = 6 | $1.35876 \times 10^{-9}$ | $4.88064 \times 10^{-11}$ | $5.67002 \times 10^{-13}$ | $2.57805 \times 10^{-15}$ | $3.29139 \times 10^{-18}$ |

TABLE 8-continued

Example 1 Reflecting Surface S4 N0 = N1 = 1 k = 8   $-7.02524 \times 10^{-14}$   $-1.36769 \times 10^{-15}$   $-7.18941 \times 10^{-18}$
k = 10   $9.65035 \times 10^{-19}$

| Bjk | j = 5 | j = 6 | j = 7 | j = 8 | j = 9 |
|---|---|---|---|---|---|
| k = 0 | $4.57518 \times 10^{-8}$ | $1.44673 \times 10^{-9}$ | $1.23054 \times 10^{-11}$ | $2.13590 \times 10^{-14}$ | $-1.82326 \times 10^{-16}$ |
| k = 2 | $1.20840 \times 10^{-12}$ | $-1.15121 \times 10^{-13}$ | $-1.24718 \times 10^{-15}$ | $-3.74717 \times 10^{-18}$ | |
| k = 4 | $-2.11513 \times 10^{-15}$ | $-8.26515 \times 10^{-18}$ | | k = 0, j = 10 | $-7.11582 \times 10^{-19}$ |

TABLE 9

Example 1 Reflecting Surface S5 N0 = N1 = 1

| | | Local Coordinates | |
|---|---|---|---|
| | x | y | z |
| Position | 90.6219 | 0.0000 | 0.0000 |
| Vector VX | 1.0000 | 0.0000 | 0.0000 |
| VY | 0.0000 | 1.0000 | 0.0000 |
| VZ | 0.0000 | 0.0000 | 1.0000 |
| C0 0.000000 | | | |

TABLE 10

Example 1 Projection Surface S6 N0 = N1 = 1

| | | Local Coordinates | |
|---|---|---|---|
| | x | y | z |
| Position | −109.3781 | −547.8375 | 0.0000 |
| Vector VX | −1.0000 | 0.0000 | 0.0000 |
| VY | 0.0000 | −1.0000 | 0.0000 |
| VZ | 0.0000 | 0.0000 | 1.0000 |
| C0 0.000000 | | | |

TABLE 11

Example 2 Display Surface S0 N0 = N1 = 1

| | | Local Coordinates | |
|---|---|---|---|
| | x | y | z |
| Position | 0.0000 | 0.0000 | 0.0000 |
| Vector VX | 1.0000 | 0.0000 | 0.0000 |
| VY | 0.0000 | 1.0000 | 0.0000 |
| VZ | 0.0000 | 0.0000 | 1.0000 |
| C0 0.000000 | | | |

TABLE 12

Example 2 Reflecting Surface S1 N0 = N1 = 1

| | | Local Coordinates | |
|---|---|---|---|
| | x | y | z |
| Position | 115.4561 | −17.9518 | 0.0000 |
| Vector VX | 1.0000 | 0.0024 | 0.0000 |
| VY | −0.0024 | 1.0000 | 0.0000 |
| VZ | 0.0000 | 0.0000 | 1.0000 |
| C0 −0.007256 | | | |

| ε | A4 | A6 | A8 | A10 | A12 |
|---|---|---|---|---|---|
| 1.0 | $-3.03358 \times 10^{-9}$ | $-1.39052 \times 10^{-12}$ | $6.22246 \times 10^{-16}$ | $-1.50263 \times 10^{-19}$ | $0.00000 \times 10^{0}$ |

TABLE 13

Example 2 Pupil Plane APR N0 = N1 = 1

| | | Local Coordinates | |
|---|---|---|---|
| | x | y | z |
| Position | 48.0000 | −17.7500 | 0.0000 |
| Vector VX | −1.0000 | 0.0000 | 0.0000 |
| VY | 0.0000 | 1.0000 | 0.0000 |
| VZ | 0.0000 | 0.0000 | −1.0000 |
| C0 0.000000 | | | |
| R 14.500000 | | | |

TABLE 14

Example 2 Reflecting Surface S2 N0 = N1 = 1

| | | Local Coordinates | | |
|---|---|---|---|---|
| | | x | y | z |
| Position | | 4.7679 | −14.4679 | 0.0000 |
| Vector | VX | −0.9998 | −0.0206 | 0.0000 |
| | VY | −0.0206 | 0.9998 | 0.0000 |
| | VZ | 0.0000 | 0.0000 | −1.0000 |
| C0 | 0.006847 | | | |

| $\epsilon$ | A4 | A6 | A8 | A10 | A12 |
|---|---|---|---|---|---|
| 1.0 | $4.61969 \times 10^{-7}$ | $-5.13932 \times 10^{-10}$ | $1.06677 \times 10^{-12}$ | $-1.04751 \times 10^{-15}$ | $4.52949 \times 10^{-19}$ |

TABLE 15

Example 2 Reflecting Surface S3 N0 = N1 = 1

| | | Local Coordinates | | |
|---|---|---|---|---|
| | | x | y | z |
| Position | | 112.9764 | −7.6544 | 0.0000 |
| Vector | VX | 0.9995 | −0.0313 | 0.0000 |
| | VY | 0.0313 | 0.9995 | 0.0000 |
| | VZ | 0.0000 | 0.0000 | 1.0000 |
| C0 | 0.007888 | | | |

| $\epsilon$ | A4 | A6 | A8 | A10 | A12 |
|---|---|---|---|---|---|
| 1.0 | $3.40076 \times 10^{-8}$ | $-2.52102 \times 10^{-11}$ | $-3.48433 \times 10^{-15}$ | $1.13295 \times 10^{-19}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-6.77427 \times 10^{-3}$ | $-4.68604 \times 10^{-5}$ | $-4.89629 \times 10^{-7}$ |
| k = 2 | $-2.73509 \times 10^{-3}$ | $5.65785 \times 10^{-5}$ | $-3.30783 \times 10^{-7}$ | $-2.18317 \times 10^{-8}$ | $-3.01333 \times 10^{-10}$ |
| k = 4 | $-6.35040 \times 10^{-7}$ | $-3.94313 \times 10^{-8}$ | $-1.00084 \times 10^{-9}$ | $-2.18172 \times 10^{-11}$ | $-3.02263 \times 10^{-13}$ |
| k = 6 | $-6.48372 \times 10^{-10}$ | $-3.60308 \times 10^{-11}$ | $-6.03649 \times 10^{-13}$ | $-4.89780 \times 10^{-15}$ | $-1.65871 \times 10^{-17}$ |
| k = 8 | $-7.06784 \times 10^{-14}$ | $2.28215 \times 10^{-15}$ | $1.50126 \times 10^{-17}$ | | |
| k = 10 | $5.38948 \times 10^{-17}$ | | | | |

| Bjk | j = 5 | j = 6 | j = 7 | j = 8 | j = 9 |
|---|---|---|---|---|---|
| k = 0 | $1.29013 \times 10^{-9}$ | $2.07728 \times 10^{-11}$ | $-1.18182 \times 10^{-12}$ | $-1.36299 \times 10^{-14}$ | $-1.01150 \times 10^{-16}$ |
| k = 2 | $-5.30638 \times 10^{-12}$ | $-5.02627 \times 10^{-14}$ | $-4.50028 \times 10^{-16}$ | $-1.91401 \times 10^{-18}$ | |
| k = 4 | $-2.62883 \times 10^{-15}$ | $-9.73344 \times 10^{-18}$ | | k = 0, j = 10 | $-3.57759 \times 10^{-19}$ |

TABLE 16

Example 2 Reflecting Surface S4 N0 = N1 = 1

| | | Local Coordinates | | |
|---|---|---|---|---|
| | | x | y | z |
| Position | | −36.5184 | −5.1790 | 0.0000 |
| Vector | VX | −0.9261 | 0.3774 | 0.0000 |
| | VY | 0.3774 | 0.9261 | 0.0000 |
| | VZ | 0.0000 | 0.0000 | −1.0000 |
| C0 | −0.005895 | | | |

| $\epsilon$ | A4 | A6 | A8 | A10 | A12 |
|---|---|---|---|---|---|
| 1.0 | $-1.69630 \times 10^{-6}$ | $2.14389 \times 10^{-10}$ | $-1.30414 \times 10^{-15}$ | $-1.08272 \times 10^{-19}$ | $3.51073 \times 10^{-24}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-4.33336 \times 10^{-2}$ | $-1.23194 \times 10^{-3}$ | $-9.02325 \times 10^{-6}$ |
| k = 2 | $6.90051 \times 10^{-3}$ | $-4.56827 \times 10^{-4}$ | $-7.48434 \times 10^{-6}$ | $-4.77783 \times 10^{-8}$ | $1.08881 \times 10^{-12}$ |
| k = 4 | $-2.44526 \times 10^{-6}$ | $-3.52616 \times 10^{-8}$ | $5.55124 \times 10^{-10}$ | $1.44621 \times 10^{-11}$ | $-8.61666 \times 10^{-14}$ |
| k = 6 | $1.37373 \times 10^{-9}$ | $4.93825 \times 10^{-11}$ | $5.65623 \times 10^{-13}$ | $2.51280 \times 10^{-15}$ | $3.10833 \times 10^{-18}$ |

TABLE 16-continued

Example 2 Reflecting Surface S4 N0 = N1 = 1 k = 8   −6.13527 × 10⁻¹⁴   −1.31218 × 10⁻¹⁵   −7.26368 × 10⁻¹⁸
k = 10   7.45150 × 10⁻¹⁹

| Bjk | j = 5 | j = 6 | j = 7 | j = 8 | j = 9 |
|---|---|---|---|---|---|
| k = 0 | 4.56377 × 10⁻⁸ | 1.44658 × 10⁻⁹ | 1.23067 × 10⁻¹¹ | 2.13398 × 10⁻¹⁴ | −1.82367 × 10⁻¹⁶ |
| k = 2 | 1.23589 × 10⁻¹² | −1.15271 × 10⁻¹³ | −1.24738 × 10⁻¹⁵ | −3.73274 × 10⁻¹⁸ | |
| k = 4 | −2.11987 × 10⁻¹⁵ | −8.25915 × 10⁻¹⁸ | | k = 0, j = 10 | −7.10118 × 10⁻¹⁹ |

TABLE 17

Example 2 Reflecting Surface S5 N0 = N1 = 1

| | Local Coordinates | | |
|---|---|---|---|
| | x | y | z |
| Position | 124.2382 | 0.0000 | 0.0000 |
| Vector VX | 1.0000 | 0.0000 | 0.0000 |
| VY | 0.0000 | 1.0000 | 0.0000 |
| VZ | 0.0000 | 0.0000 | 1.0000 |
| C0  0.000000 | | | |

TABLE 18

Example 2 Projection Surface S6 N0 = N1 = 1

| | Local Coordinates | | |
|---|---|---|---|
| | x | y | z |
| Position | −75.7618 | −540.0081 | 0.0000 |
| Vector VX | −1.0000 | 0.0000 | 0.0000 |
| VY | 0.0000 | −1.0000 | 0.0000 |
| VZ | 0.0000 | 0.0000 | 1.0000 |
| C0  0.000000 | | | |

TABLE 19

Example 3 Display Surface S0 N0 = N1 = 1

| | Local Coordinates | | |
|---|---|---|---|
| | x | y | z |
| Position | 0.0000 | 0.0000 | 0.0000 |
| Vector VX | 1.0000 | 0.0000 | 0.0000 |
| VY | 0.0000 | 1.0000 | 0.0000 |
| VZ | 0.0000 | 0.0000 | 1.0000 |
| C0  0.000000 | | | |

TABLE 20

Example 3 Reflecting Surface S1 N0 = N1 = 1

| | Local Coordinates | | |
|---|---|---|---|
| | x | y | z |
| Position | 101.6282 | −16.6934 | 0.0000 |
| Vector VX | 0.9998 | −0.0195 | 0.0000 |
| VY | 0.0195 | 0.9998 | 0.0000 |
| VZ | 0.0000 | 0.0000 | 1.0000 |
| C0  −0.007814 | | | |

| ε | A4 | A6 | A8 | A10 | A12 |
|---|---|---|---|---|---|
| 1.0 | −4.90903 × 10⁻⁹ | 1.95361 × 10⁻¹² | −4.94963 × 10⁻¹⁵ | 3.52855 × 10⁻¹⁸ | 0.00000 × 10⁰ |

TABLE 21

Example 3 Pupil Plane APR N0 = N1 = 1

| | Local Coordinates | | |
|---|---|---|---|
| | x | y | z |
| Position | 36.0000 | −26.5000 | 0.0000 |
| Vector VX | −1.0000 | 0.0000 | 0.0000 |
| VY | 0.0000 | 1.0000 | 0.0000 |
| VZ | 0.0000 | 0.0000 | −1.0000 |
| C0  0.000000 | | | |
| R   12.800000 | | | |

TABLE 22

Example 3 Reflecting Surface S2 N0 = N1 = 1

| | | Local Coordinates | | |
|---|---|---|---|---|
| | | x | y | z |
| Position | | −6.9522 | −12.2530 | 0.0000 |
| Vector | VX | −0.9999 | 0.0106 | 0.0000 |
| | VY | 0.0106 | 0.9999 | 0.0000 |
| | VZ | 0.0000 | 0.0000 | −1.0000 |
| C0 | 0.006784 | | | |

| ε | A4 | A6 | A8 | A10 | A12 |
|---|---|---|---|---|---|
| 1.0 | $4.94051 \times 10^{-7}$ | $-1.33387 \times 10^{-10}$ | $1.43402 \times 10^{-13}$ | $5.16304 \times 10^{-17}$ | $-3.82708 \times 10^{-20}$ |

TABLE 23

Example 3 Reflecting Surface S3 N0 = N1 = 1

| | | Local Coordinates | | |
|---|---|---|---|---|
| | | x | y | z |
| Position | | 97.7147 | −10.1564 | 0.0000 |
| Vector | VX | 0.9997 | 0.0251 | 0.0000 |
| | VY | −0.0251 | 0.9997 | 0.0000 |
| | VZ | 0.0000 | 0.0000 | 1.0000 |
| C0 | 0.008393 | | | |

| ε | A4 | A6 | A8 | A10 | A12 |
|---|---|---|---|---|---|
| 1.0 | $-3.31188 \times 10^{-8}$ | $-3.07605 \times 10^{-11}$ | $-3.91714 \times 10^{-15}$ | $9.45955 \times 10^{-20}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-7.85975 \times 10^{-3}$ | $-5.59186 \times 10^{-5}$ | $-5.77117 \times 10^{-7}$ |
| k = 2 | $-4.37752 \times 10^{-3}$ | $2.25556 \times 10^{-5}$ | $-4.93592 \times 10^{-7}$ | $-2.36270 \times 10^{-8}$ | $-3.22127 \times 10^{-10}$ |
| k = 4 | $-4.43585 \times 10^{-8}$ | $-2.03477 \times 10^{-8}$ | $-9.41646 \times 10^{-10}$ | $-2.57965 \times 10^{-11}$ | $-3.33737 \times 10^{-13}$ |
| k = 6 | $-5.97881 \times 10^{-10}$ | $-3.82987 \times 10^{-11}$ | $-7.98462 \times 10^{-13}$ | $-7.46051 \times 10^{-15}$ | $-2.63449 \times 10^{-17}$ |
| k = 8 | $-4.13400 \times 10^{-14}$ | $-3.34889 \times 10^{-16}$ | $-1.19825 \times 10^{-18}$ | | |
| k = 10 | $6.82597 \times 10^{-18}$ | | | | |

| Bjk | j = 5 | j = 6 | j = 7 | j = 8 | j = 9 |
|---|---|---|---|---|---|
| k = 0 | $-5.12096 \times 10^{-10}$ | $1.34529 \times 10^{-11}$ | $-1.26912 \times 10^{-12}$ | $-1.42047 \times 10^{-14}$ | $-1.08131 \times 10^{-16}$ |
| k = 2 | $-5.54710 \times 10^{-12}$ | $-5.20931 \times 10^{-14}$ | $-5.25768 \times 10^{-16}$ | $-2.30273 \times 10^{-18}$ | |
| k = 4 | $-2.58191 \times 10^{-15}$ | $-8.83935 \times 10^{-18}$ | | k = 0, j = 10 | $-3.70085 \times 10^{-19}$ |

TABLE 24

Example 3 Reflecting Surface S4 N0 = N1 = 1

| | | Local Coordinates | | |
|---|---|---|---|---|
| | | x | y | z |
| Position | | −49.4975 | −0.7471 | 0.0000 |
| Vector | VX | −0.9339 | 0.3576 | 0.0000 |
| | VY | 0.3576 | 0.9339 | 0.0000 |
| | VZ | 0.0000 | 0.0000 | −1.0000 |
| C0 | −0.005880 | | | |

| ε | A4 | A6 | A8 | A10 | A12 |
|---|---|---|---|---|---|
| 1.0 | $-1.69296 \times 10^{-6}$ | $2.14551 \times 10^{-10}$ | $-1.31939 \times 10^{-15}$ | $-1.07605 \times 10^{-19}$ | $3.47888 \times 10^{-24}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-4.28053 \times 10^{-2}$ | $-1.22611 \times 10^{-3}$ | $-9.01279 \times 10^{-6}$ |
| k = 2 | $6.94508 \times 10^{-3}$ | $-4.59022 \times 10^{-4}$ | $-7.53319 \times 10^{-6}$ | $-4.80275 \times 10^{-8}$ | $1.76668 \times 10^{-12}$ |
| k = 4 | $-2.36282 \times 10^{-6}$ | $-3.18743 \times 10^{-8}$ | $5.97328 \times 10^{-10}$ | $1.45260 \times 10^{-11}$ | $-8.80551 \times 10^{-14}$ |
| k = 6 | $1.38150 \times 10^{-9}$ | $4.92942 \times 10^{-11}$ | $5.59369 \times 10^{-13}$ | $2.44035 \times 10^{-15}$ | $2.82812 \times 10^{-18}$ |

TABLE 24-continued

Example 3 Reflecting Surface S4 N0 = N1 = 1 k = 8   $-6.44115 \times 10^{-14}$   $-1.37089 \times 10^{-15}$   $-7.33570 \times 10^{-18}$
k = 10   $3.26076 \times 10^{-19}$

| Bjk | j = 5 | j = 6 | j = 7 | j = 8 | j = 9 |
|---|---|---|---|---|---|
| k = 0 | $4.55202 \times 10^{-8}$ | $1.44670 \times 10^{-9}$ | $1.23094 \times 10^{-11}$ | $2.13073 \times 10^{-14}$ | $-1.82245 \times 10^{-16}$ |
| k = 2 | $1.24503 \times 10^{-12}$ | $-1.15306 \times 10^{-13}$ | $-1.24783 \times 10^{-15}$ | $-3.73197 \times 10^{-18}$ | |
| k = 4 | $-2.12332 \times 10^{-15}$ | $-8.21184 \times 10^{-18}$ | | k = 0, j = 10 | $-7.07774 \times 10^{-19}$ |

TABLE 25

Example 3 Reflecting Surface S5 N0 = N1 = 1

| | | Local Coordinates | | |
|---|---|---|---|---|
| | | x | y | z |
| Position | | 111.5073 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| C0 | 0.000000 | | | |

TABLE 26

Example 3 Projection Surface S6 N0 = N1 = 1

| | | Local Coordinates | | |
|---|---|---|---|---|
| | | x | y | z |
| Position | | −88.4927 | −532.1060 | 0.0000 |
| Vector | VX | −1.0000 | 0.0000 | 0.0000 |
| | VY | 0.0000 | −1.0000 | 0.0000 |
| | VZ | 0.0000 | 0.0000 | 1.0000 |
| C0 | 0.000000 | | | |

TABLE 27

Example 4 Display Surface S0 N0 = N1 = 1

| | | Local Coordinates | | |
|---|---|---|---|---|
| | | x | y | z |
| Position | | 0.0000 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| C0 | 0.000000 | | | |

TABLE 28

Example 4 Pupil Plane APR N0 = N1 = 1

| | | Local Coordinates | | |
|---|---|---|---|---|
| | | x | y | z |
| Position | | 40.0000 | −8.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| C0 | 0.000000 | | | |
| R | 6.750000 | | | |

TABLE 29

Example 4 Reflecting Surface S1 N0 = N1 = 1

| | | Local Coordinates | | |
|---|---|---|---|---|
| | | x | y | z |
| Position | | 101.8029 | −20.3753 | 0.0000 |
| Vector | VX | 1.0000 | 0.0053 | 0.0000 |
| | VY | −0.0053 | 1.0000 | 0.0000 |
| | VZ | 0.0000 | 0.0000 | 1.0000 |
| C0 | −0.012573 | | | |

| ε | A4 | A6 | A8 | A10 | A12 |
|---|---|---|---|---|---|
| 1.0 | $3.93713 \times 10^{-7}$ | $1.49159 \times 10^{-9}$ | $9.71942 \times 10^{-15}$ | $-4.32620 \times 10^{-18}$ | $0.00000 \times 10^{0}$ |

TABLE 29-continued

Example 4 Reflecting Surface S1 N0 = N1 = 1

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $2.00884 \times 10^{-3}$ | $1.91578 \times 10^{-6}$ | $-2.40364 \times 10^{-7}$ |
| k = 2 | $1.59252 \times 10^{-3}$ | $1.65260 \times 10^{-6}$ | $-5.04336 \times 10^{-7}$ | $4.76042 \times 10^{-11}$ | $-4.40812 \times 10^{-9}$ |
| k = 4 | $-2.70902 \times 10^{-7}$ | $-3.30009 \times 10^{-10}$ | $-4.42708 \times 10^{-9}$ | $0.00000 \times 10^0$ | $0.00000 \times 10^0$ |
| k = 6 | $-1.47575 \times 10^{-9}$ | $0.00000 \times 10^0$ | $0.00000 \times 10^0$ | $0.00000 \times 10^0$ | $0.00000 \times 10^0$ |
| k = 8 | $0.00000 \times 10^0$ | $0.00000 \times 10^0$ | $0.00000 \times 10^0$ | | |
| k = 10 | $0.00000 \times 10^0$ | | | | |

| Bjk | j = 5 | j = 6 | j = 7 | j = 8 | j = 9 |
|---|---|---|---|---|---|
| k = 0 | $2.20863 \times 10^{-10}$ | $-1.47127 \times 10^{-9}$ | $0.00000 \times 10^0$ | $0.00000 \times 10^0$ | $0.00000 \times 10^0$ |
| k = 2 | $0.00000 \times 10^0$ | $0.00000 \times 10^0$ | $0.00000 \times 10^0$ | $0.00000 \times 10^0$ | |
| k = 4 | $0.00000 \times 10^0$ | $0.00000 \times 10^0$ | | k = 0, j = 10 | $0.00000 \times 10^0$ |

TABLE 30

Example 4 Reflecting Surface S2 N0 = N1 = 1

| | Local Coordinates | | |
|---|---|---|---|
| | x | y | z |
| Position | 12.5841 | −39.2297 | 0.0000 |
| Vector VX | −0.9952 | 0.0978 | 0.0000 |
| VY | 0.0978 | 0.9952 | 0.0000 |
| VZ | 0.0000 | 0.0000 | −1.0000 |
| C0 0.044024 | | | |

| ε | A4 | A6 | A8 | A10 | A12 |
|---|---|---|---|---|---|
| 1.0 | $-4.87501 \times 10^{-4}$ | $-4.32896 \times 10^{-6}$ | $-6.34246 \times 10^{-11}$ | $1.11218 \times 10^{-13}$ | $-2.01234 \times 10^{-16}$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $-1.42523 \times 10^{-2}$ | $-1.32737 \times 10^{-4}$ | $4.81629 \times 10^{-4}$ |
| k = 2 | $-9.49763 \times 10^{-3}$ | $-2.41389 \times 10^{-4}$ | $9.64792 \times 10^{-4}$ | $-9.61107 \times 10^{-7}$ | $1.30127 \times 10^{-5}$ |
| k = 4 | $4.84935 \times 10^{-4}$ | $-6.98502 \times 10^{-7}$ | $1.30266 \times 10^{-5}$ | $0.00000 \times 10^0$ | $0.00000 \times 10^0$ |
| k = 6 | $4.34057 \times 10^{-6}$ | $0.00000 \times 10^0$ | $0.00000 \times 10^0$ | $0.00000 \times 10^0$ | $0.00000 \times 10^0$ |
| k = 8 | $0.00000 \times 10^0$ | $0.00000 \times 10^0$ | $0.00000 \times 10^0$ | | |
| k = 10 | $0.00000 \times 10^0$ | | | | |

| Bjk | j = 5 | j = 6 | j = 7 | j = 8 | j = 9 |
|---|---|---|---|---|---|
| k = 0 | $-3.44610 \times 10^{-7}$ | $4.33854 \times 10^{-6}$ | $0.00000 \times 10^0$ | $0.00000 \times 10^0$ | $0.00000 \times 10^0$ |
| k = 2 | $0.00000 \times 10^0$ | $0.00000 \times 10^0$ | $0.00000 \times 10^0$ | $0.00000 \times 10^0$ | |
| k = 4 | $0.00000 \times 10^0$ | $0.00000 \times 10^0$ | | k = 0, j = 10 | $0.00000 \times 10^0$ |

TABLE 31

Example 4 Reflecting Surface S3 N0 = N1 = 1

| | Local Coordinates | | |
|---|---|---|---|
| | x | y | z |
| Position | 101.8026 | −77.3632 | 0.0000 |
| Vector VX | 0.9951 | −0.0986 | 0.0000 |
| VY | 0.0986 | 0.9951 | 0.0000 |
| VZ | 0.0000 | 0.0000 | 1.0000 |
| C0 0.008620 | | | |

| ε | A4 | A6 | A8 | A10 | A12 |
|---|---|---|---|---|---|
| 1.0 | $2.14466 \times 10^{-7}$ | $-4.67228 \times 10^{-11}$ | $-4.63566 \times 10^{-15}$ | $4.77752 \times 10^{-18}$ | $0.00000 \times 10^0$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $-6.61267 \times 10^{-3}$ | $-6.62783 \times 10^{-6}$ | $-3.40700 \times 10^{-7}$ |
| k = 2 | $-6.95327 \times 10^{-3}$ | $-1.54197 \times 10^{-6}$ | $-5.76526 \times 10^{-7}$ | $5.19801 \times 10^{-9}$ | $1.74131 \times 10^{-10}$ |

TABLE 31-continued

Example 4 Reflecting Surface S3 N0 = N1 = 1

| | | | | | |
|---|---|---|---|---|---|
| k = 4 | $-2.81046 \times 10^{-7}$ | $1.87703 \times 10^{-9}$ | $1.34552 \times 10^{-10}$ | $-6.69182 \times 10^{-13}$ | $2.12931 \times 10^{-14}$ |
| k = 6 | $3.99774 \times 10^{-11}$ | $-2.38038 \times 10^{-13}$ | $1.84027 \times 10^{-14}$ | $5.42145 \times 10^{-18}$ | $-4.90278 \times 10^{-17}$ |
| k = 8 | $4.38169 \times 10^{-15}$ | $1.52645 \times 10^{-17}$ | $-2.38690 \times 10^{-17}$ | | |
| k = 10 | $-4.74121 \times 10^{-18}$ | | | | |

| Bjk | j = 5 | j = 6 | j = 7 | j = 8 | j = 9 |
|---|---|---|---|---|---|
| k = 0 | $3.39988 \times 10^{-9}$ | $5.21016 \times 10^{-11}$ | $-8.25123 \times 10^{-13}$ | $-2.45323 \times 10^{-15}$ | $-2.47599 \times 10^{-18}$ |
| k = 2 | $-1.62011 \times 10^{-12}$ | $1.72914 \times 10^{-14}$ | $5.21144 \times 10^{-16}$ | $-2.41525 \times 10^{-17}$ | |
| k = 4 | $2.58344 \times 10^{-16}$ | $-4.16200 \times 10^{-17}$ | | k = 0, j = 10 | $-2.65756 \times 10^{-18}$ |

TABLE 32

Example 4 Reflecting Surface S4 N0 = N1 = 1

| | | Local Coordinates | | |
|---|---|---|---|---|
| | | x | y | z |
| Position | | 6.3346 | -97.3170 | 0.0000 |
| Vector | VX | -0.9085 | 0.4179 | 0.0000 |
| | VY | 0.4179 | 0.9085 | 0.0000 |
| | VZ | 0.0000 | 0.0000 | -1.0000 |
| C0 | -0.001672 | | | |

| ε | A4 | A6 | A8 | A10 | A12 |
|---|---|---|---|---|---|
| 1.0 | $1.93910 \times 10^{-7}$ | $4.40895 \times 10^{-11}$ | $-4.60538 \times 10^{-15}$ | $-6.66318 \times 10^{-18}$ | $-1.04921 \times 10^{-22}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $3.63408 \times 10^{-3}$ | $5.60033 \times 10^{-5}$ | $1.09617 \times 10^{-6}$ |
| k = 2 | $7.85586 \times 10^{-3}$ | $1.30899 \times 10^{-4}$ | $2.58152 \times 10^{-6}$ | $5.89453 \times 10^{-8}$ | $8.20095 \times 10^{-10}$ |
| k = 4 | $-3.89420 \times 10^{-7}$ | $-1.63610 \times 10^{-8}$ | $-1.04482 \times 10^{-9}$ | $-3.48702 \times 10^{-11}$ | $-6.89304 \times 10^{-13}$ |
| k = 6 | $-4.95414 \times 10^{-11}$ | $3.81251 \times 10^{-14}$ | $1.25618 \times 10^{-13}$ | $6.66734 \times 10^{-15}$ | $1.79935 \times 10^{-16}$ |
| k = 8 | $3.06365 \times 10^{-15}$ | $1.70276 \times 10^{-16}$ | $3.83915 \times 10^{-17}$ | | |
| k = 10 | $8.08880 \times 10^{-18}$ | | | | |

| Bjk | j = 5 | j = 6 | j = 7 | j = 8 | J = 9 |
|---|---|---|---|---|---|
| k = 0 | $4.09506 \times 10^{-8}$ | $9.02998 \times 10^{-10}$ | $-4.18456 \times 10^{-12}$ | $-4.82726 \times 10^{-13}$ | $-6.37146 \times 10^{-15}$ |
| k = 2 | $-2.47675 \times 10^{-12}$ | $-7.18032 \times 10^{-13}$ | $-1.31925 \times 10^{-14}$ | $9.14530 \times 10^{-18}$ | |
| k = 4 | $-1.05752 \times 10^{-14}$ | $-5.63936 \times 10^{-17}$ | | k = 0, j = 10 | $-2.80979 \times 10^{-17}$ |

TABLE 33

Example 4 Reflecting Surface S5 N0 = N1 = 1

| | | Local Coordinates | | |
|---|---|---|---|---|
| | | x | y | z |
| Position | | 101.8029 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| C0 | 0.000000 | | | |

TABLE 34

Example 4 Projection Surface S6 N0 = N1 = 1

| | | Local Coordinates | | |
|---|---|---|---|---|
| | | x | y | z |
| Position | | -8.1971 | -472.0624 | 0.0000 |
| Vector | VX | -1.0000 | 0.0000 | 0.0000 |
| | VY | 0.0000 | -1.0000 | 0.0000 |
| | VZ | 0.0000 | 0.0000 | 1.0000 |
| C0 | 0.000000 | | | |

TABLE 35

Example 5 Display Surface S0 N0 = N1 = 1

| | | Local Coordinates | | |
|---|---|---|---|---|
| | | x | y | z |
| Position | | 0.0000 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| C0 | 0.000000 | | | |

TABLE 36

Example 5 Reflecting Surface S1 N0 = N1 = 1

| | | Local Coordinates | | |
|---|---|---|---|---|
| | | x | y | z |
| Position | | 63.5704 | −15.8836 | 0.0000 |
| Vector | VX | 0.9989 | −0.0460 | 0.0000 |
| | VY | 0.0460 | 0.9989 | 0.0000 |
| | VZ | 0.0000 | 0.0000 | 1.0000 |
| C0 | −0.010935 | | | |

| ϵ | A4 | A6 | A8 | A10 | A12 |
|---|---|---|---|---|---|
| 1.0 | $1.25724 \times 10^{-5}$ | $1.86170 \times 10^{-7}$ | $-4.05135 \times 10^{-12}$ | $3.01351 \times 10^{-14}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-4.43584 \times 10^{-4}$ | $2.31983 \times 10^{-6}$ | $-1.26143 \times 10^{-5}$ |
| k = 2 | $-1.34491 \times 10^{-3}$ | $1.89361 \times 10^{-6}$ | $-2.53874 \times 10^{-5}$ | $1.79014 \times 10^{-9}$ | $-5.57511 \times 10^{-7}$ |
| k = 4 | $-1.27249 \times 10^{-5}$ | $-7.53181 \times 10^{-10}$ | $-5.57968 \times 10^{-7}$ | $0.00000 \times 10^{0}$ | $0.00000 \times 10^{0}$ |
| k = 6 | $-1.86192 \times 10^{-7}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $1.23098 \times 10^{-9}$ | $-1.86105 \times 10^{-7}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 37

Example 5 Pupil Plane APR N0 = N1 = 1

| | | Local Coordinates | | |
|---|---|---|---|---|
| | | x | y | z |
| Position | | 50.0000 | −17.0000 | 0.0000 |
| Vector | VX | −1.0000 | 0.0000 | 0.0000 |
| | VY | 0.0000 | 1.0000 | 0.0000 |
| | VZ | 0.0000 | 0.0000 | −1.0000 |
| C0 | 0.000000 | | | |
| R | 8.700000 | | | |

TABLE 38

Example 5 Reflecting Surface S2 N0 = N1 = 1

| | | Local Coordinates | | |
|---|---|---|---|---|
| | | x | y | z |
| Position | | −1.4357 | −25.9385 | 0.0000 |
| Vector | VX | −0.9926 | 0.1216 | 0.0000 |
| | VY | 0.1216 | 0.9926 | 0.0000 |
| | VZ | 0.0000 | 0.0000 | −1.0000 |
| C0 | 0.043194 | | | |

| ϵ | A4 | A6 | A8 | A10 | A12 |
|---|---|---|---|---|---|
| 1.0 | $-4.52966 \times 10^{-4}$ | $-4.18988 \times 10^{-6}$ | $7.40925 \times 10^{-11}$ | $-7.60897 \times 10^{-13}$ | $1.94262 \times 10^{-15}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-1.66596 \times 10^{-2}$ | $-9.46800 \times 10^{-5}$ | $4.45974 \times 10^{-4}$ |
| k = 2 | $-9.69251 \times 10^{-3}$ | $-2.44519 \times 10^{-4}$ | $8.96345 \times 10^{-4}$ | $-5.70625 \times 10^{-7}$ | $1.25560 \times 10^{-5}$ |
| k = 4 | $4.55105 \times 10^{-4}$ | $-4.81406 \times 10^{-7}$ | $1.25666 \times 10^{-5}$ | $0.00000 \times 10^{0}$ | $0.00000 \times 10^{0}$ |
| k = 6 | $4.18834 \times 10^{-6}$ | $0.00000 \times 10^{0}$ | $0.00000 \times 10^{0}$ | $0.00000 \times 10^{0}$ | $0.00000 \times 10^{0}$ |

TABLE 38-continued

Example 5 Reflecting Surface S2 N0 = N1 = 1

| | | | |
|---|---|---|---|
| k = 8 | $0.00000 \times 10^0$ | $0.00000 \times 10^0$ | $0.00000 \times 10^0$ |
| k = 10 | $0.00000 \times 10^0$ | | |

| Bjk | j = 5 | j = 6 | j = 7 | j = 8 | j = 9 |
|---|---|---|---|---|---|
| k = 0 | $-1.35981 \times 10^{-7}$ | $4.17880 \times 10^{-6}$ | $0.00000 \times 10^0$ | $0.00000 \times 10^0$ | $0.00000 \times 10^0$ |
| k = 2 | $0.00000 \times 10^0$ | $0.00000 \times 10^0$ | $0.00000 \times 10^0$ | $0.00000 \times 10^0$ | |
| k = 4 | $0.00000 \times 10^0$ | $0.00000 \times 10^0$ | | k = 0, j = 10 | $0.00000 \times 10^0$ |

TABLE 39

Example 5 Reflecting Surface S3 N0 = N1 = 1

| | Local Coordinates | | |
|---|---|---|---|
| | x | y | z |
| Position | 100.3365 | −68.4122 | 0.0000 |
| Vector VX | 0.9925 | 0.1224 | 0.0000 |
| VY | −0.1224 | 0.9925 | 0.0000 |
| VZ | 0.0000 | 0.0000 | 1.0000 |
| C0  0.00634 | | | |

| ϵ | A4 | A6 | A8 | A10 | A12 |
|---|---|---|---|---|---|
| 1.0 | $2.28056 \times 10^{-7}$ | $-4.57134 \times 10^{-11}$ | $-4.50292 \times 10^{-15}$ | $4.78237 \times 10^{-18}$ | $0.00000 \times 10^0$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $-3.89379 \times 10^{-3}$ | $-6.30657 \times 10^{-6}$ | $-3.77568 \times 10^{-7}$ |
| k = 2 | $-4.45623 \times 10^{-3}$ | $9.38273 \times 10^{-6}$ | $-4.65719 \times 10^{-7}$ | $2.03768 \times 10^{-9}$ | $1.63626 \times 10^{-10}$ |
| k = 4 | $-3.03236 \times 10^{-7}$ | $-5.64446 \times 10^{-10}$ | $1.27401 \times 10^{-10}$ | $-6.31578 \times 10^{-14}$ | $2.56344 \times 10^{-14}$ |
| k = 6 | $4.54551 \times 10^{-11}$ | $-1.90082 \times 10^{-14}$ | $1.86998 \times 10^{-14}$ | $-4.24892 \times 10^{-18}$ | $-4.78662 \times 10^{-17}$ |
| k = 8 | $4.45436 \times 10^{-15}$ | $5.48344 \times 10^{-18}$ | $-2.39022 \times 10^{-17}$ | | |
| k = 10 | $-4.77522 \times 10^{-18}$ | | | | |

| Bjk | j = 5 | j = 6 | j = 7 | j = 8 | j = 9 |
|---|---|---|---|---|---|
| k = 0 | $5.53503 \times 10^{-10}$ | $6.99868 \times 10^{-11}$ | $8.59898 \times 10^{-13}$ | $4.36970 \times 10^{-14}$ | $1.30934 \times 10^{-15}$ |
| k = 2 | $-3.30206 \times 10^{-14}$ | $1.85583 \times 10^{-14}$ | $-2.97697 \times 10^{-16}$ | $-2.94138 \times 10^{-17}$ | |
| k = 4 | $7.08908 \times 10^{-17}$ | $-4.68875 \times 10^{-17}$ | | k = 0, j = 10 | $1.05237 \times 10^{-17}$ |

TABLE 40

Example 5 Reflecting Surface S4 N0 = N1 = 1

| | Local Coordinates | | |
|---|---|---|---|
| | x | y | z |
| Position | 19.9467 | −128.3830 | 0.0000 |
| Vector VX | −0.9798 | 0.2000 | 0.0000 |
| VY | 0.2000 | 0.9798 | 0.0000 |
| VZ | 0.0000 | 0.0000 | −1.0000 |
| C0  −0.004794 | | | |

| ϵ | A4 | A6 | A8 | A10 | A12 |
|---|---|---|---|---|---|
| 1.0 | $-1.81730 \times 10^{-8}$ | $6.89428 \times 10^{-11}$ | $5.19899 \times 10^{-15}$ | $-7.40999 \times 10^{-18}$ | $-2.99449 \times 10^{-25}$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $3.09395 \times 10^{-3}$ | $1.11583 \times 10^{-5}$ | $1.03114 \times 10^{-7}$ |
| k = 2 | $5.05181 \times 10^{-3}$ | $2.55058 \times 10^{-5}$ | $4.10929 \times 10^{-7}$ | $4.51142 \times 10^{-9}$ | $-1.86926 \times 10^{-10}$ |
| k = 4 | $-3.04900 \times 10^{-9}$ | $-1.36475 \times 10^{-9}$ | $-2.42120 \times 10^{-10}$ | $-8.74626 \times 10^{-13}$ | $-3.84016 \times 10^{-14}$ |
| k = 6 | $-6.57427 \times 10^{-11}$ | $5.94997 \times 10^{-14}$ | $-1.98078 \times 10^{-14}$ | $4.55095 \times 10^{-17}$ | $7.45904 \times 10^{-17}$ |
| k = 8 | $-5.36094 \times 10^{-15}$ | $-2.64065 \times 10^{-18}$ | $3.70927 \times 10^{-17}$ | | |
| k = 10 | $7.41820 \times 10^{-18}$ | | | | |

TABLE 40-continued

Example 5 Reflecting Surface S4 N0 = N1 = 1

| Bjk | j = 5 | j = 6 | j = 7 | j = 8 | j = 9 |
|---|---|---|---|---|---|
| k = 0 | $5.43111 \times 10^{-9}$ | $1.88009 \times 10^{-10}$ | $1.91127 \times 10^{-12}$ | $-8.48082 \times 10^{-14}$ | $-1.57209 \times 10^{-15}$ |
| k = 2 | $-7.19401 \times 10^{-13}$ | $-3.38507 \times 10^{-14}$ | $-7.93454 \times 10^{-17}$ | $3.69191 \times 10^{-17}$ | |
| k = 4 | $1.77316 \times 10^{-17}$ | $7.44125 \times 10^{-17}$ | | k = 0, j = 10 | $-7.22437 \times 10^{-19}$ |

TABLE 41

Example 5 Reflecting Surface S5 N0 = N1 = 1

|  |  | Local Coordinates |  |  |
|---|---|---|---|---|
|  |  | x | y | z |
| Position |  | 103.5699 | 0.0000 | 0.0000 |
| Vector | VX | 1.0000 | 0.0000 | 0.0000 |
|  | VY | 0.0000 | 1.0000 | 0.0000 |
|  | VZ | 0.0000 | 0.0000 | 1.0000 |
| C0 | 0.000000 | | | |

TABLE 42

Example 5 Projection Surface S6 N0 = N1 = 1

|  |  | Local Coordinates |  |  |
|---|---|---|---|---|
|  |  | x | y | z |
| Position |  | -16.4301 | -478.3923 | 0.0000 |
| Vector | VX | -1.0000 | 0.0000 | 0.0000 |

TABLE 42-continued

Example 5 Projection Surface S6 N0 = N1 = 1

|  |  | Local Coordinates |  |  |
|---|---|---|---|---|
|  |  | x | y | z |
|  | VY | 0.0000 | -1.0000 | 0.0000 |
|  | VZ | 0.0000 | 0.0000 | 1.0000 |
| C0 | 0.000000 | | | |

TABLE 43

Example 6 Display Surface S0 N0 = N1 = 1

|  |  | Local Coordinates |  |  |
|---|---|---|---|---|
|  |  | x | y | z |
| Position |  | 0.0000 | 0.0000 | 0.0000 |
| Vector | VX | 1.0000 | 0.0000 | 0.0000 |
|  | VY | 0.0000 | 1.0000 | 0.0000 |
|  | VZ | 0.0000 | 0.0000 | 1.0000 |
| C0 | 0.000000 | | | |

TABLE 44

Example 6 Reflecting Surface S1 N0 = N1 = 1

|  |  | Local Coordinates |  |  |
|---|---|---|---|---|
|  |  | x | y | z |
| Position |  | 62.4807 | -11.1468 | 0.0000 |
| Vector | VX | 0.9999 | -0.0152 | 0.0000 |
|  | VY | 0.0152 | 0.9999 | 0.0000 |
|  | VZ | 0.0000 | 0.0000 | 1.0000 |
| C0 | -0.008352 | | | |

| ε | A4 | A6 | A8 | A10 | A12 |
|---|---|---|---|---|---|
| 1.0 | $1.95222 \times 10^{-5}$ | $1.95773 \times 10^{-7}$ | $-3.59070 \times 10^{-13}$ | $3.89395 \times 10^{-16}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-2.00942 \times 10^{-3}$ | $2.13947 \times 10^{-6}$ | $-1.97120 \times 10^{-5}$ |
| k = 2 | $-2.74651 \times 10^{-3}$ | $1.56985 \times 10^{-3}$ | $-3.94978 \times 10^{-5}$ | $7.56232 \times 10^{-10}$ | $-5.86884 \times 10^{-7}$ |
| k = 4 | $-1.97985 \times 10^{-5}$ | $-1.18174 \times 10^{-9}$ | $-5.87120 \times 10^{-7}$ | $0.00000 \times 10^{0}$ | $0.00000 \times 10^{0}$ |
| k = 6 | $-1.95698 \times 10^{-7}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

TABLE 44-continued

Example 6 Reflecting Surface S1 N0 = N1 = 1

| Bjk | j = 5 | j = 6 | j = 7 | j = 8 | j = 9 |
|---|---|---|---|---|---|
| k = 0 | $1.03253 \times 10^{-9}$ | $-1.95633 \times 10^{-7}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, J = 10 | $0.00000 \times 10^{0}$ |

TABLE 45

Example 6 Pupil Plane APR N0 = N1 = 1

| | | Local Coordinates | | |
|---|---|---|---|---|
| | | x | y | z |
| Position | | 24.0000 | −17.0000 | 0.0000 |
| Vector | VX | −1.0000 | 0.0000 | 0.0000 |
| | VY | 0.0000 | 1.0000 | 0.0000 |
| | VZ | 0.0000 | 0.0000 | −1.0000 |
| C0 | 0.000000 | | | |
| R | 6.250000 | | | |

TABLE 46

Example 6 Reflecting Surface S2 N0 = N1 = 1

| | | Local Coordinates | | |
|---|---|---|---|---|
| | | x | y | z |
| Position | | −2.5314 | −20.8218 | 0.0000 |
| Vector | VX | −0.9934 | 0.1144 | 0.0000 |
| | VY | 0.1144 | 0.9934 | 0.0000 |
| | VZ | 0.0000 | 0.0000 | −1.0000 |
| C0 | 0.027834 | | | |

| ε | A4 | A6 | A8 | A10 | A12 |
|---|---|---|---|---|---|
| 1.0 | $-1.79016 \times 10^{-4}$ | $-1.67583 \times 10^{-6}$ | $1.28774 \times 10^{-10}$ | $-1.95483 \times 10^{-12}$ | $7.65360 \times 10^{-15}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-7.66855 \times 10^{-3}$ | $-1.05589 \times 10^{-4}$ | $1.80094 \times 10^{-4}$ |
| k = 2 | $-1.34309 \times 10^{-3}$ | $-2.47669 \times 10^{-4}$ | $3.64061 \times 10^{-4}$ | $-6.77025 \times 10^{-7}$ | $5.06258 \times 10^{-6}$ |
| k = 4 | $1.89105 \times 10^{-4}$ | $-4.18413 \times 10^{-7}$ | $5.07642 \times 10^{-6}$ | $0.00000 \times 10^{0}$ | $0.00000 \times 10^{0}$ |
| k = 6 | $1.69143 \times 10^{-6}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $-2.20048 \times 10^{-7}$ | $1.68175 \times 10^{-6}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 47

Example 6 Reflecting Surface S3 N0 = N1 = 1

| | | Local Coordinates | | |
|---|---|---|---|---|
| | | x | y | z |
| Position | | 120.1083 | −68.6501 | 0.0000 |
| Vector | VX | 0.9946 | 0.1034 | 0.0000 |
| | VY | −0.1034 | 0.9946 | 0.0000 |
| | VZ | 0.0000 | 0.0000 | 1.0000 |
| C0 | 0.004000 | | | |

TABLE 47-continued

Example 6 Reflecting Surface S3 N0 = N1 = 1

| ϵ | A4 | A6 | A8 | A10 | A12 |
|---|---|---|---|---|---|
| 1.0 | $2.42154 \times 10^{-7}$ | $-4.54612 \times 10^{-11}$ | $-4.53196 \times 10^{-15}$ | $4.78069 \times 10^{-18}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-3.19555 \times 10^{-3}$ | $-4.89598 \times 10^{-6}$ | $-3.50217 \times 10^{-7}$ |
| k = 2 | $-3.47325 \times 10^{-3}$ | $3.83920 \times 10^{-6}$ | $-4.65460 \times 10^{-7}$ | $1.42488 \times 10^{-9}$ | $1.44970 \times 10^{-10}$ |
| k = 4 | $-2.68538 \times 10^{-7}$ | $-6.36563 \times 10^{-11}$ | $1.32216 \times 10^{-10}$ | $-1.10135 \times 10^{-13}$ | $2.68177 \times 10^{-14}$ |
| k = 6 | $4.52265 \times 10^{-11}$ | $-1.11849 \times 10^{-14}$ | $1.82407 \times 10^{-14}$ | $1.71914 \times 10^{-18}$ | $-4.77890 \times 10^{-17}$ |
| k = 8 | $4.51594 \times 10^{-15}$ | $7.81835 \times 10^{-19}$ | $-2.39021 \times 10^{-17}$ | | |
| k = 10 | $-4.77948 \times 10^{-18}$ | | | | |

| Bjk | j = 5 | j = 6 | j = 7 | j = 8 | j = 9 |
|---|---|---|---|---|---|
| k = 0 | $-6.21325 \times 10^{-10}$ | $9.66229 \times 10^{-11}$ | $1.21715 \times 10^{-12}$ | $-2.21158 \times 10^{-16}$ | $-2.25333 \times 10^{-16}$ |
| k = 2 | $-1.49391 \times 10^{-13}$ | $1.59084 \times 10^{-14}$ | $-8.78533 \times 10^{-17}$ | $-2.49975 \times 10^{-17}$ | |
| k = 4 | $3.41538 \times 10^{-17}$ | $-4.74824 \times 10^{-17}$ | | k = 0, j = 10 | $-5.45701 \times 10^{-18}$ |

TABLE 48

Example 6 Reflecting Surface S4 N0 = N1 = 1

| | | Local Coordinates | | |
|---|---|---|---|---|
| | | x | y | z |
| Position | | 31.6335 | −126.5920 | 0.0000 |
| Vector | VX | −0.9635 | 0.2677 | 0.0000 |
| | VY | 0.2677 | 0.9635 | 0.0000 |
| | VZ | 0.0000 | 0.0000 | −1.0000 |
| C0 | −0.004044 | | | |

| ϵ | A4 | A6 | A8 | A10 | A12 |
|---|---|---|---|---|---|
| 1.0 | $-1.46748 \times 10^{-8}$ | $6.91335 \times 10^{-11}$ | $5.22720 \times 10^{-15}$ | $-7.41421 \times 10^{-18}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $2.83030 \times 10^{-3}$ | $9.52598 \times 10^{-6}$ | $1.08858 \times 10^{-7}$ |
| k = 2 | $5.08913 \times 10^{-3}$ | $2.79153 \times 10^{-5}$ | $3.96142 \times 10^{-7}$ | $4.57770 \times 10^{-9}$ | $-1.53563 \times 10^{-10}$ |
| k = 4 | $-3.26504 \times 10^{-9}$ | $-1.04841 \times 10^{-9}$ | $-2.34139 \times 10^{-10}$ | $-6.24686 \times 10^{-13}$ | $-3.88274 \times 10^{-14}$ |
| k = 6 | $-6.75734 \times 10^{-11}$ | $1.67018 \times 10^{-14}$ | $-2.01313 \times 10^{-14}$ | $2.54704 \times 10^{-17}$ | $7.43461 \times 10^{-17}$ |
| k = 8 | $-5.29126 \times 10^{-15}$ | $-1.89384 \times 10^{-19}$ | $3.70810 \times 10^{-17}$ | | |
| k = 10 | $7.41814 \times 10^{-18}$ | | | | |

| Bjk | j = 5 | j = 6 | j = 7 | j = 8 | j = 9 |
|---|---|---|---|---|---|
| k = 0 | $4.29336 \times 10^{-9}$ | $8.77554 \times 10^{-11}$ | $1.03950 \times 10^{-12}$ | $-4.68539 \times 10^{-14}$ | $-7.83833 \times 10^{-16}$ |
| k = 2 | $6.92191 \times 10^{-14}$ | $-3.08646 \times 10^{-14}$ | $-1.39727 \times 10^{-16}$ | $3.64635 \times 10^{-17}$ | |
| k = 4 | $-4.94681 \times 10^{-17}$ | $7.39562 \times 10^{-17}$ | | k = 0, j = 10 | $3.50804 \times 10^{-18}$ |

TABLE 49

Example 6 Reflecting Surface S5 N0 = N1 = 1

| | | Local Coordinates | | |
|---|---|---|---|---|
| | | x | y | z |
| Position | | 127.4805 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| C0 | 0.000000 | | | |

TABLE 50

Example 6 Projection Surface S6 N0 = N1 = 1

| | | Local Coordinates | | |
|---|---|---|---|---|
| | | x | y | z |
| Position | | −17.5195 | −626.5924 | 0.0000 |
| Vector | VX | −1.0000 | 0.0000 | 0.0000 |
| | VY | 0.0000 | −1.0000 | 0.0000 |
| | VZ | 0.0000 | 0.0000 | 1.0000 |
| C0 | 0.000000 | | | |

TABLE 51

Example 7 Display Surface S0 N0 = N1 = 1

| | | Local Coordinates | | |
|---|---|---|---|---|
| | | x | y | z |
| Position | | 0.0000 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| C0 | 0.000000 | | | |

TABLE 53

Example 7 Pupil Plane APR N0 = N1 = 1

| | | Local Coordinates | | |
|---|---|---|---|---|
| | | x | y | z |
| Position | | 32.6886 | −17.5000 | 0.0000 |
| Vector | VX | −1.0000 | 0.0000 | 0.0000 |
| | VY | 0.0000 | 1.0000 | 0.0000 |
| | VZ | 0.0000 | 0.0000 | −1.0000 |
| C0 | 0.000000 | | | |
| R | 9.500000 | | | |

TABLE 52

Example 7 Reflecting Surface S1 N0 = N1 = 1

| | | Local Coordinates | | |
|---|---|---|---|---|
| | | x | y | z |
| Position | | 75.4182 | 13.4971 | 0.0000 |
| Vector | VX | 0.9475 | 0.3196 | 0.0000 |
| | VY | −0.3196 | 0.9475 | 0.0000 |
| | VZ | 0.0000 | 0.0000 | 1.0000 |
| C0 | −0.017525 | | | |

| $\epsilon$ | A4 | A6 | A8 | A10 | A12 |
|---|---|---|---|---|---|
| 1.0 | $-1.66382 \times 10^{-7}$ | $2.82609 \times 10^{-10}$ | $4.81274 \times 10^{-15}$ | $1.10802 \times 10^{-17}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $3.73857 \times 10^{-3}$ | $-5.01341 \times 10^{-7}$ | $6.80585 \times 10^{-7}$ |
| k = 2 | $3.21110 \times 10^{-3}$ | $-1.35376 \times 10^{-6}$ | $1.40081 \times 10^{-6}$ | $3.23581 \times 10^{-9}$ | $-4.59668 \times 10^{-10}$ |
| k = 4 | $6.55625 \times 10^{-7}$ | $1.80319 \times 10^{-10}$ | $-5.12242 \times 10^{-10}$ | $0.00000 \times 10^{0}$ | $0.00000 \times 10^{0}$ |
| k = 6 | $-1.79598 \times 10^{-10}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $2.63039 \times 10^{-11}$ | $-1.67688 \times 10^{-10}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 54

Example 7 Reflecting Surface S2 N0 = N1 = 1

| | | Local Coordinates | | |
|---|---|---|---|---|
| | | x | y | z |
| Position | | 3.2516 | −26.2261 | 0.0000 |
| Vector | VX | −1.0000 | −0.0021 | 0.0000 |
| | VY | −0.0021 | 1.0000 | 0.0000 |
| | VZ | 0.0000 | 0.0000 | −1.0000 |
| C0 | 0.029943 | | | |

| ε | A4 | A6 | A8 | A10 | A12 |
|---|---|---|---|---|---|
| 1.0 | $-6.67190 \times 10^{-4}$ | $-5.76813 \times 10^{-6}$ | $8.17928 \times 10^{-11}$ | $-3.16719 \times 10^{-13}$ | $3.23298 \times 10^{-16}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-1.01265 \times 10^{-2}$ | $-5.73887 \times 10^{-5}$ | $6.65231 \times 10^{-4}$ |
| k = 2 | $-4.67729 \times 10^{-3}$ | $-8.88926 \times 10^{-5}$ | $1.33180 \times 10^{-3}$ | $-2.21354 \times 10^{-7}$ | $1.72808 \times 10^{-5}$ |
| k = 4 | $6.68079 \times 10^{-4}$ | $-1.51675 \times 10^{-7}$ | $1.72872 \times 10^{-5}$ | $0.00000 \times 10^{0}$ | $0.00000 \times 10^{0}$ |
| k = 6 | $5.76484 \times 10^{-6}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $-5.43254 \times 10^{-8}$ | $5.75950 \times 10^{-6}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 55

Example 7 Reflecting Surface S3 N0 = N1 = 1

| | | Local Coordinates | | |
|---|---|---|---|---|
| | | x | y | z |
| Position | | 82.8882 | −23.7811 | 0.0000 |
| Vector | VX | 0.9984 | −0.0558 | 0.0000 |
| | VY | 0.0558 | 0.9984 | 0.0000 |
| | VZ | 0.0000 | 0.0000 | 1.0000 |
| C0 | 0.008884 | | | |

| ε | A4 | A6 | A8 | A10 | A12 |
|---|---|---|---|---|---|
| 1.0 | $6.42863 \times 10^{-7}$ | $-1.57431 \times 10^{-10}$ | $-3.38299 \times 10^{-14}$ | $2.89096 \times 10^{-18}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-3.97653 \times 10^{-3}$ | $8.09710 \times 10^{-5}$ | $7.40631 \times 10^{-7}$ |
| k = 2 | $-6.38754 \times 10^{-3}$ | $5.32223 \times 10^{-5}$ | $9.56721 \times 10^{-7}$ | $3.69191 \times 10^{-8}$ | $-3.55872 \times 10^{-10}$ |
| k = 4 | $-6.26197 \times 10^{-7}$ | $-7.40298 \times 10^{-9}$ | $-5.66599 \times 10^{-10}$ | $-4.49197 \times 10^{-11}$ | $-7.08572 \times 10^{-13}$ |
| k = 6 | $1.00306 \times 10^{-10}$ | $-6.82284 \times 10^{-12}$ | $-1.45392 \times 10^{-13}$ | | |
| k = 8 | $2.74914 \times 10^{-14}$ | $-2.83504 \times 10^{-16}$ | $-1.72951 \times 10^{-17}$ | $-4.51260 \times 10^{-15}$ | $-5.41853 \times 10^{-17}$ |
| k = 10 | $-3.15292 \times 10^{-18}$ | | | | |

| Bjk | j = 5 | j = 6 | j = 7 | j = 8 | j = 9 |
|---|---|---|---|---|---|
| k = 0 | $-4.93872 \times 10^{-9}$ | $-6.96493 \times 10^{-10}$ | $-1.86322 \times 10^{-11}$ | $-1.57288 \times 10^{-13}$ | $-8.97245 \times 10^{-16}$ |
| k = 2 | $-4.62424 \times 10^{-11}$ | $-6.99855 \times 10^{-13}$ | $-6.99205 \times 10^{-15}$ | $-3.75748 \times 10^{-17}$ | |
| k = 4 | $-8.61053 \times 10^{-15}$ | $-5.95656 \times 10^{-17}$ | | k = 0, j = 10 | $-4.20010 \times 10^{-18}$ |

TABLE 56

Example 7 Reflecting Surface S4 N0 = N1 = 1

| | | Local Coordinates | | |
|---|---|---|---|---|
| | | x | y | z |
| Position | | −32.1140 | 6.8008 | 0.0000 |
| Vector | VX | −0.9873 | 0.1586 | 0.0000 |
| | VY | 0.1586 | 0.9873 | 0.0000 |
| | VZ | 0.0000 | 0.0000 | −1.0000 |
| C0 | −0.004801 | | | |

| ε | A4 | A6 | A8 | A10 | A12 |
|---|---|---|---|---|---|
| 1.0 | $-1.75892 \times 10^{-6}$ | $2.16761 \times 10^{-10}$ | $-1.41979 \times 10^{-15}$ | $-1.02102 \times 10^{-19}$ | $3.17334 \times 10^{-24}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-3.85943 \times 10^{-2}$ | $-1.19159 \times 10^{-3}$ | $-8.95224 \times 10^{-6}$ |
| k = 2 | $4.61352 \times 10^{-3}$ | $-5.56763 \times 10^{-4}$ | $-9.06592 \times 10^{-6}$ | $-5.55578 \times 10^{-8}$ | $4.86524 \times 10^{-11}$ |
| k = 4 | $-2.66903 \times 10^{-6}$ | $-4.63010 \times 10^{-8}$ | $3.94905 \times 10^{-10}$ | $1.39005 \times 10^{-11}$ | $-8.17065 \times 10^{-14}$ |
| k = 6 | $1.21750 \times 10^{-9}$ | $4.54096 \times 10^{-11}$ | $5.40143 \times 10^{-13}$ | $2.52351 \times 10^{-15}$ | $3.52067 \times 10^{-18}$ |
| k = 8 | $-4.64097 \times 10^{-14}$ | $-9.49010 \times 10^{-16}$ | $-5.28855 \times 10^{-18}$ | | |
| k = 10 | $5.83933 \times 10^{-19}$ | | | | |

| Bjk | j = 5 | j = 6 | j = 7 | j = 8 | j = 9 |
|---|---|---|---|---|---|
| k = 0 | $4.47919 \times 10^{-8}$ | $1.44747 \times 10^{-9}$ | $1.23245 \times 10^{-11}$ | $2.11007 \times 10^{-14}$ | $-1.81745 \times 10^{-16}$ |
| k = 2 | $1.58714 \times 10^{-12}$ | $-1.17115 \times 10^{-13}$ | $-1.25183 \times 10^{-15}$ | $-3.66024 \times 10^{-18}$ | |
| k = 4 | $-2.06989 \times 10^{-15}$ | $-8.04925 \times 10^{-18}$ | | k = 0, j = 10 | $-6.94914 \times 10^{-19}$ |

TABLE 57

Example 7 Reflecting Surface S5 N0 = N1 = 1

| | | Local Coordinates | | |
|---|---|---|---|---|
| | | x | y | z |
| Position | | 83.9399 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| C0 | 0.000000 | | | |

TABLE 58

Example 7 Projection Surface S6 N0 = N1 = 1

| | | Local Coordinates | | |
|---|---|---|---|---|
| | | x | y | z |
| Position | | −41.0601 | −477.3845 | 0.0000 |
| Vector | VX | −1.0000 | 0.0000 | 0.0000 |
| | VY | 0.0000 | −1.0000 | 0.0000 |
| | VZ | 0.0000 | 0.0000 | 1.0000 |
| C0 | 0.000000 | | | |

TABLE 59

Example 8 Overall

Size of Panel Display Surface I1 (mm): 13.283 × 7.472
Size of Screen Surface I2 (mm): 1106 × 622
FNO in Direction of Longer Sides of Screen = 3.1
FNO in Direction of Shorter Sides of Screen = 3.1

TABLE 60

Example 8 Surface Position and Rotation

| Surface | | X Coordinate | Y Coordinate | Z Coordinate | X Rotation | Y, Z Rotation | Medium |
|---|---|---|---|---|---|---|---|
| Panel Display Surface I1 | | 0.000 | 680.462 | −114.126 | −24.938 | 0.000 | |
| | | | | | | | Air |
| First Mirror M1 | Curved | 0.000 | 665.860 | −73.268 | −11.118 | 0.000 | |
| | | | | | | | Air |
| Second Mirror M2 | Curved | 0.000 | 682.460 | −254.319 | −12.824 | 0.000 | |
| | | | | | | | Air |

TABLE 60-continued

Example 8 Surface Position and Rotation

| Surface | | X Coordinate | Y Coordinate | Z Coordinate | X Rotation | Y, Z Rotation | Medium |
|---|---|---|---|---|---|---|---|
| Third Mirror M3 | Curved | 0.000 | 616.446 | −4.826 | −10.840 | 0.000 | |
| | | | | | | | Air |
| Fourth Mirror M4 | Curved | 0.000 | 341.827 | −302.935 | −55.262 | 0.000 | |
| | | | | | | | Air |
| Fifth Mirror M5 | Flat | 0.000 | 217.746 | 8.580 | 8.596 | 0.000 | |
| | | | | | | | Air |
| Sixth Mirror M6 | Flat | 0.000 | 1.802 | −300.000 | 0.000 | 0.000 | |
| | | | | | | | Air |
| Screen Surface (I2) | | 0.000 | 0.000 | 0.000 | 0.000 | 0.000 | |

TABLE 61

Example 8 Curved Surface Shape of First Mirror (M1)
Radius of Curvature (mm) = 106377.218

$K = -9.439 \times 10^4$
$C(0, 1) = 1.684 \times 10^{-1}$, $C(2, 0) = -2.258 \times 10^{-3}$, $C(0, 2) = -2.369 \times 10^{-3}$
$C(2, 1) = -9.083 \times 10^{-6}$, $C(0, 3) = 1.096 \times 10^{-5}$, $C(4, 0) = 8.012 \times 10^{-9}$
$C(2, 2) = -4.285 \times 10^{-8}$, $C(0, 4) = 2.231 \times 10^{-8}$

TABLE 62

Example 8 Curved Surface Shape of Second Mirror (M2)
Radius of Curvature (mm) = 267.910

$K = -4.304 \times 10^{-1}$
$C(0, 1) = 4.674 \times 10^{-2}$, $C(2, 0) = -1.645 \times 10^{-4}$, $C(0, 2) = -1.742 \times 10^{-4}$
$C(2, 1) = 6.569 \times 10^{-8}$, $C(0, 3) = 1.008 \times 10^{-6}$, $C(4, 0) = 7.508 \times 10^{-10}$
$C(2, 2) = -2.565 \times 10^{-10}$, $C(0, 4) = -2.336 \times 10^{-9}$

TABLE 63

Example 8 Curved Surface Shape of Third Mirror (M3)
Radius of Curvature (mm) = 570.148

$K = -3.109 \times 10^2$
$C(0, 1) = 7.535 \times 10^{-2}$, $C(2, 0) = 5.066 \times 10^{-4}$, $C(0, 2) = 1.925 \times 10^{-3}$

TABLE 63-continued

Example 8 Curved Surface Shape of Third Mirror (M3)
Radius of Curvature (mm) = 570.148

$C(2, 1) = -1.293 \times 10^{-5}$, $C(0, 3) = -6.269 \times 10^{-6}$, $C(4, 0) = 2.246 \times 10^{-7}$
$C(2, 2) = 4.088 \times 10^{-7}$, $C(0, 4) = 5.380 \times 10^{-8}$

TABLE 64

Example 8 Curved Surface Shape of Fourth Mirror (M4)
Radius of Curvature (mm) = −993.286

$K = 2.645 \times 10$
$C(0, 1) = -1.238$, $C(2, 0) = -1.032 \times 10^{-3}$, $C(0, 2) = 1.167 \times 10^{-3}$
$C(2, 1) = 1.086 \times 10^{-5}$, $C(0, 3) = 6.456 \times 10^{-6}$, $C(4, 0) = 1.133 \times 10^{-9}$
$C(2, 2) = -1.795 \times 10^{-7}$, $C(0, 4) = -4.084 \times 10^{-8}$

TABLE 65

Example 9 Overall

Size of Panel Display Surface I1 (mm): 26.624 × 19.968
Size of Screen Surface I2 (mm): 1024 × 768
FNO in Direction of Longer Sides of Screen = 3.0
FNO in Direction of Shorter Sides of Screen = 4.5

TABLE 66

Example 9 Surface Position and Rotation

| Surface | | X Coordinate | Y Coordinate | Z Coordinate | X Rotation | Y, Z Rotation | Medium |
|---|---|---|---|---|---|---|---|
| Panel Display Surface I1 | | 0.000 | 1225.125 | −127.470 | −34.830 | 0.000 | |
| | | | | | | | Air |
| First Mirror M1 | Curved | 0.000 | 1168.810 | −111.456 | −24.720 | 0.000 | |
| | | | | | | | Air |
| Aperture Stop ST | | 0.000 | 1235.920 | −285.524 | −25.369 | 0.000 | |
| | | | | | | | Air |
| Second Mirror M2 | Curved | 0.000 | 1242.861 | −287.234 | −26.051 | 0.000 | |
| | | | | | | | Air |
| Third Mirror M3 | Curved | 0.000 | 1136.690 | −60.687 | −24.388 | 0.000 | |
| | | | | | | | Air |
| Fourth Mirror M4 | Curved | 0.000 | 817.349 | −408.232 | −81.766 | 0.000 | |
| | | | | | | | Air |

TABLE 66-continued

Example 9 Surface Position and Rotation

| Surface | | X Coordinate | Y Coordinate | Z Coordinate | X Rotation | Y, Z Rotation | Medium |
|---|---|---|---|---|---|---|---|
| Fifth Mirror M5 | Flat | 0.000 | 256.510 | −42.517 | −2.937 | 0.000 | Air |
| Sixth Mirror M6 | Flat | 0.000 | −5.416 | −300.000 | 0.000 | 0.000 | Air |
| Screen Surface (I2) | | 0.000 | 0.000 | 0.000 | 0.000 | 0.000 | |

TABLE 67

Example 9 Curved Surface Shape of First Mirror (M1)
Radius of Curvature (mm) = 47670.865

$K = -6.434 \times 10^4$
$C(0, 1) = 2.113 \times 10^{-1}$, $C(2, 0) = -9.706 \times 10^{-4}$, $C(0, 2) = -1.863 \times 10^{-3}$
$C(2, 1) = 7.277 \times 10^{-6}$, $C(0, 3) = 5.779 \times 10^{-6}$, $C(4, 0) = 1.856 \times 10^{-8}$
$C(2, 2) = 1.133 \times 10^{-7}$, $C(0, 4) = 9.931 \times 10^{-8}$

TABLE 68

Example 9 Curved Surface Shape of Second Mirror (M2)
Radius of Curvature (mm) = 266.862

$K = -9.462 \times 10^{-1}$
$C(0, 1) = -1.537 \times 10^{-2}$, $C(2, 0) = -1.508 \times 10^{-4}$, $C(0, 2) = -1.841 \times 10^{-4}$
$C(2, 1) = 7.947 \times 10^{-8}$, $C(0, 3) = 2.548 \times 10^{-7}$, $C(4, 0) = 5.091 \times 10^{-9}$
$C(2, 2) = 9.101 \times 10^{-9}$, $C(0, 4) = 3.779 \times 10^{-9}$

TABLE 69

Example 9 Curved Surface Shape of Third Mirror (M3)
Radius of Curvature (mm) = 511.833

$K = -1.186 \times 10^2$
$C(0, 1) = 1.197 \times 10^{-1}$, $C(2, 0) = 6.380 \times 10^{-4}$, $C(0, 2) = 1.251 \times 10^{-3}$
$C(2, 1) = -4.052 \times 10^{-6}$, $C(0, 3) = -3.980 \times 10^{-6}$, $C(4, 0) = 1.494 \times 10^{-7}$
$C(2, 2) = 2.385 \times 10^{-7}$, $C(0, 4) = 6.638 \times 10^{-8}$

TABLE 70

Example 9 Curved Surface Shape of Fourth Mirror (M4)
Radius of Curvature (mm) = 0.000

$K = -1.879 \times 10^2$
$C(0, 1) = -2.058$, $C(2, 0) = -8.631 \times 10^{-4}$, $C(0, 2) = 1.908 \times 10^{-3}$
$C(2, 1) = 5.097 \times 10^{-6}$, $C(0, 3) = 6.368 \times 10^{-6}$, $C(4, 0) = 2.201 \times 10^{-9}$
$C(2, 2) = -5.440 \times 10^{-8}$, $C(0, 4) = -2.417 \times 10^{-8}$

TABLE 71

Example 10 Overall

Size of Panel Display Surface I1 (mm): 13.283 × 7.472
Size of Screen Surface I2 (mm): 1106 × 622
FNO in Direction of Longer Sides of Screen = 3.1
FNO in Direction of Shorter Sides of Screen = 3.1

TABLE 72

Example 10 Surface Position and Rotation

| Surface | | X Coordinate | Y Coordinate | Z Coordinate | X Rotation | Y, Z Rotation | Medium |
|---|---|---|---|---|---|---|---|
| Panel Display Surface I1 | | 0.000 | 429.000 | 217.364 | −72.761 | 0.000 | Air |
| First Mirror M1 | Curved | 0.000 | 379.122 | 202.375 | −61.047 | 0.000 | Air |
| Second Mirror M2 | Curved | 0.000 | 529.372 | 98.361 | −62.009 | 0.000 | Air |
| Aperture Stop ST | | 0.000 | 535.873 | 120.360 | −63.273 | 0.000 | Air |
| Third Mirror M3 | Curved | 0.000 | 290.291 | 211.413 | −61.724 | 0.000 | Air |
| Fourth Mirror M4 | Curved | 0.000 | 297.822 | −109.328 | −105.696 | 0.000 | Air |
| Fifth Mirror M5 | Flat | 0.000 | −451.659 | −322.158 | −105.109 | 0.000 | Air |
| Sixth Mirror M6 | Flat | 0.000 | −715.000 | 250.000 | 0.000 | 0.000 | Air |
| Screen Surface (I2) | | 0.000 | 0.000 | 0.000 | 0.000 | 0.000 | |

TABLE 73

Example 10 Curved Surface Shape of First Mirror (M1)
Radius of Curvature (mm) = 55105.558

$K = -9.416 \times 10^4$
$C(0, 1) = 2.665 \times 10^{-1}$, $\quad C(2, 0) = -1.488 \times 10^{-3}$, $\quad C(0, 2) = -2.314 \times 10^{-3}$
$C(2, 1) = 7.735 \times 10^{-6}$, $\quad C(0, 3) = 1.046 \times 10^{-5}$, $\quad C(4, 0) = 8.701 \times 10^{-9}$
$C(2, 2) = 1.657 \times 10^{-7}$, $\quad C(0, 4) = 8.682 \times 10^{-8}$

TABLE 74

Example 10 Curved Surface Shape of Second Mirror (M2)
Radius of Curvature (mm) = 266.893

$K = 5.482 \times 10^{-1}$
$C(0, 1) = 3.794 \times 10^{-4}$, $\quad C(2, 0) = -1.355 \times 10^{-4}$, $\quad C(0, 2) = -1.900 \times 10^{-4}$
$C(2, 1) = 3.553 \times 10^{-7}$, $\quad C(0, 3) = 6.314 \times 10^{-7}$, $\quad C(4, 0) = -5.225 \times 10^{-9}$
$C(2, 2) = -1.127 \times 10^{-8}$, $\quad C(0, 4) = -6.737 \times 10^{-9}$

TABLE 75

Example 10 Curved Surface Shape of Third Mirror (M3)
Radius of Curvature (mm) = 669.724

$K = -3.507 \times 10^2$
$C(0, 1) = 9.594 \times 10^{-2}$, $\quad C(2, 0) = 9.897 \times 10^{-4}$, $\quad C(0, 2) = 1.845 \times 10^{-3}$
$C(2, 1) = -3.058 \times 10^{-6}$, $\quad C(0, 3) = -6.449 \times 10^{-6}$, $\quad C(4, 0) = 2.237 \times 10^{-7}$
$C(2, 2) = 4.923 \times 10^{-7}$, $\quad C(0, 4) = 1.248 \times 10^{-7}$

TABLE 76

Example 10 Curved Surface Shape of Fourth Mirror (M4)
Radius of Curvature (mm) = −1508.718

$K = 6.332 \times 10$
$C(0, 1) = -1.224$, $\quad C(2, 0) = -4.739 \times 10^{-4}$, $\quad C(0, 2) = 1.439 \times 10^{-3}$
$C(2, 1) = -3.909 \times 10^{-7}$, $\quad C(0, 3) = 4.994 \times 10^{-6}$, $\quad C(4, 0) = -2.171 \times 10^{-8}$
$C(2, 2) = -1.135 \times 10^{-7}$, $\quad C(0, 4) = -2.627 \times 10^{-8}$

TABLE 77

Examples 8 to 10 Values of Conditional Formulae, etc.

|  | DL | HL | DL/HL | θ |
|---|---|---|---|---|
| Example 8 | 1000 | 622 | 1.61 | 38.07 |
| Example 9 | 1394 | 768 | 1.82 | 50.85 |
| Example 10 | 1650 | 622 | 2.65 | 55.68 |

What is claimed is:

1. An image projection apparatus comprising a projection optical system for projecting an image displayed on a display surface onto a screen, the projection optical system including at least four curved reflecting surfaces,
   wherein the projection optical system does not form an intermediate real image of the display surface between the display surface and the screen, and
   wherein, assuming that a ray of light that travels from a center of the display surface through a center of an aperture stop to a center of the screen surface is called a screen center ray, the following conditions are fulfilled:

$0.5 < DL/HL < 3.5$, $10 < \theta < 70$, $Fnoy \leq 3.5$, and $Fnoz \leq 3.4$, where
   DL represents an optical distance traveled by the screen center ray from a last surface of the projection optical system to the screen surface,
   HL represents a dimension of the screen surface in a direction parallel to a plane formed at the center of the screen surface by a normal to the screen surface and the screen center ray,
   θ represents an angle of incidence at which the screen center ray is incident on the screen surface,
   Fnoy represents an f-number in a direction corresponding to the height direction of the display surface, and
   Fnoz represents an f-number in a direction corresponding to the width direction of the display surface.

2. An image projection apparatus as claimed in claim 1, wherein the following condition is fulfilled:

$Fnoy \geq Fnoz$.

3. An image projection apparatus as claimed in claim 1, wherein the following condition is fulfilled:

$0.81 < DL/HL < 3.5$.

4. An image projection apparatus as claimed in claim 1, wherein the following condition is fulfilled:

$0.858 < DL/HL < 3.5$.

5. An image projection apparatus as claimed in claim 1, wherein the following condition is fulfilled:

$0.879 < DL/HL < 3.5$.

6. An image projection apparatus as claimed in claim 1, wherein the following condition is fulfilled:

$0.925 < DL/HL < 3.5$.

7. An image projection apparatus as claimed in claim 1, wherein the following condition is fulfilled:

$0.941 < DL/HL < 3.5$.

8. An image projection apparatus as claimed in claim 1, wherein the following condition is fulfilled:

$Fnoy \geq 3.4$, and $Fnoz \geq 3.3$.

9. An image projection apparatus as claimed in claim 1, wherein the following condition is fulfilled:

$Fnoy \geq 3.1$, and $Fnoz \geq 3.1$.

10. An image projection apparatus as claimed in claim 6, wherein the following condition is fulfilled:

$Fnoy \geq 3.4$, and $Fnoz \geq 3.3$.

11. An image projection apparatus as claimed in claim 6, wherein the following condition is fulfilled:

$Fnoy \geq 3.1$, and $Fnoz \geq 3.1$.

12. An image projection apparatus as claimed in claim 1, further comprising the screen, the screen including an optical member, the optical member having a Fresnel portion,
wherein the Fresnel portion fulfills the following condition:

[a pitch of the Fresnel portion]/[a size of a pixel of a projected image on the screen]<0.5.

13. An image projection apparatus as claimed in claim 12, wherein the optical member is a Fresnel lens.

14. An image projection apparatus as claimed in claim 13, wherein the Fresnel lens has a flat surface on a side thereof on which projection light is incident.

15. An image projection apparatus as claimed in claim 12, wherein the optical member is a total reflection prism array.

16. An image projection apparatus as claimed in claim 9, further comprising the screen, the screen including an optical member, the optical member having a Fresnel portion,
wherein the Fresnel portion fulfills the following condition:

[a pitch of the Fresnel portion]/[a size of a pixel of a projected image on the screen]<0.5.

17. An image projection apparatus as claimed in claim 11, further comprising the screen, the screen including an optical member, the optical member having a Fresnel portion,
wherein the Fresnel portion fulfills the following condition:

[a pitch of the Fresnel portion]/[a size of a pixel of a projected image on the screen]<0.5.

18. An image projection apparatus as claimed in claim 1, wherein a second curved reflecting surface as counted from a display surface side is disposed on a side of the display surface opposite to a first curved reflecting surface as counted from the display surface.

19. An image projection apparatus as claimed in claim 18, wherein the projection optical system has no optical axis that holds throughout the optical system.

20. An image projection apparatus as claimed in claim 1, wherein a portion of the projection optical system protrudes from the screen.

21. An image projection apparatus as claimed in claim 11, wherein the projection optical system has a free-form curved reflecting surface.

22. An image projection apparatus as claimed in claim 1, wherein the image projection apparatus is a front projection apparatus.

23. An image projection apparatus as claimed in claim 1, wherein the image projection apparatus is a rear projection apparatus.

24. An image projection apparatus as claimed in claim 1, wherein the projection optical system has a pupil plane positioned between the display surface and the curved reflecting surface closest to the display surface.

25. An image projection apparatus comprising:
a reflective display panel for displaying a two-dimensional image on a panel display surface thereof; and
an oblique projection optical system for projecting the image on the panel display surface to a projection surface in such a way that a ray of light from a center of the panel display surface is obliquely incident on the projection surface, the oblique projection optical system being a substantially oblique telecentric optical system having an entrance pupil located substantially at infinity and inclined relative to an axis parallel to a height direction of the panel display surface, wherein the oblique projection optical system includes at least four curved reflecting surfaces.

26. An image projection apparatus as claimed in claim 25, wherein the following conditions are fulfilled:

$Fnoy \geq 3.5$, and $Fnoz \geq 3.4$, where
Fnoy represents an f-number of the oblique projection optical system in a direction corresponding to the height direction of the panel display surface, and
Fnoz represents an f-number of the oblique projection optical system in a direction corresponding to the width direction of the panel display surface.

27. An image projection apparatus as claimed in claim 25, wherein the following conditions are fulfilled:

$Fnoy \geq 3.4$, and $Fnoz \geq 3.3$, where
Fnoy represents an f-number of the oblique projection optical system in a direction corresponding to the height direction of the panel display surface, and
Fnoz represents an f-number of the oblique projection optical system in a direction corresponding to the width direction of the panel display surface.

28. An image projection apparatus as claimed in claim 25, wherein the image projection apparatus is a front projection apparatus.

29. An image projection apparatus as claimed in claim 25, wherein the image projection apparatus is a rear projection apparatus.

30. An image projection apparatus comprising:
a reflective display panel for displaying a two-dimensional image on a panel display surface thereof; and
an oblique projection optical system for projecting the image on the panel display surface to a projection surface in such a way that a ray of light from a center of the panel display surface is obliquely incident on the projection surface, the oblique projection optical system being a substantially oblique telecentric optical system having an entrance pupil located substantially at infinity and inclined relative to an axis parallel to a height direction of the panel display surface, further comprising a screen located at the projection surface, the screen including an optical member, the optical member having a Fresnel portion,
wherein the Fresnel portion fulfills the following condition:

[a pitch of the Fresnel portion]/[a size of a pixel of a projected image on the screen]<0.5.

31. An image projection apparatus as claimed in claim 30, wherein the optical member is a Fresnel lens.

32. An image projection apparatus as claimed in claim 31, wherein the Fresnel lens has a flat surface on a side thereof on which projection light is incident.

33. An image projection apparatus as claimed in claim 30, wherein the optical member is a total reflection prism array.

34. An image projection apparatus as claimed in claim 30, wherein the image projection apparatus is a rear projection apparatus.

35. An image projection apparatus as claimed in claim 30, further comprising a screen located at the projection surface, wherein a portion of the oblique projection optical system protrudes from the screen.

36. An image projection apparatus as claimed in claim 25, wherein a second curved mirror as counted from a display surface side is disposed on a side of the panel display surface opposite to a first curved mirror as counted from the panel display surface.

37. An image projection apparatus as claimed in claim 26, wherein assuming that a ray of light that travels from a center of the panel display surface through a center of an aperture stop to a center of a screen surface is called a screen center ray, the following condition is fulfilled:

$$0.879 < DL/HL < 3.5,$$

where
- DL represents an optical distance traveled by the screen center ray from a last surface of the projection optical system to the screen surface, and
- HL represents a dimension of the screen surface in a direction parallel to a plane formed at the center of the projection surface by a normal to the screen surface and the screen center ray.

38. An image projection apparatus as claimed in claim 26, wherein assuming that a ray of light that travels from a center of the panel display surface through a center of an aperture stop to a center of a screen surface is called a screen center ray, the following condition is fulfilled:

$$0.925 < DL/HL < 3.5,$$

where
- DL represents an optical distance traveled by the screen center ray from a last surface of the projection optical system to the screen surface, and
- HL represents a dimension of the screen surface in a direction parallel to a plane formed at the center of the projection surface by a normal to the screen surface and the screen center ray.

* * * * *

UNITED STATES PATENT AND TRADEMARK OFFICE
CERTIFICATE OF CORRECTION

PATENT NO. : 7,178,921 B2  Page 1 of 1
APPLICATION NO. : 11/233049
DATED : February 20, 2007
INVENTOR(S) : Kenji Konno, Soh Ohzawa and Jun Ishihara It is certified that error appears in the above-identified patent and that said Letters Patent is hereby corrected as shown below:

Column 64:
Lines 49-50, delete "Fnoy ≥ 3.4, and Fnoz ≥ 3.3." and inset -- Fnoy ≤ 3.4, and Fnoz ≤ 3.3. --.
Lines 54-56, delete "Fnoy ≥ 3.1, and Fnoz ≥ 3.1." and inset -- Fnoy ≤ 3.1, and Fnoz ≤ 3.1. --.
Lines 59-61, delete "Fnoy ≥ 3.4, and Fnoz ≥ 3.3." and inset -- Fnoy ≤ 3.4, and Fnoz ≤ 3.3. --.
Lines 65-66, delete "Fnoy ≥ 3.1, and Fnoz ≥ 3.1." and inset -- Fnoy ≤ 3.1, and Fnoz ≤ 3.1. --.

Column 66:
Lines 4-5, delete "Fnoy ≥ 3.5, and Fnoz ≥ 3.4." and inset -- Fnoy ≤ 3.5, and Fnoz ≤ 3.4, --.
Lines 15-16, delete "Fnoy ≥ 3.4, and Fnoz ≥ 3.3," and inset -- Fnoy ≤ 3.4, and Fnoz ≤ 3.3, --.
Line 34, delete "oblique proiection optical" and insert -- oblique projection optical --.

Signed and Sealed this

Seventeenth Day of April, 2007

JON W. DUDAS
*Director of the United States Patent and Trademark Office*